(12) United States Patent
Robertson et al.

(10) Patent No.: US 7,194,543 B2
(45) Date of Patent: Mar. 20, 2007

(54) SYSTEM AND METHOD FOR CREATING AND MANAGING SURVIVABLE, SERVICE HOSTING NETWORKS

(75) Inventors: James A. Robertson, The Woodlands, TX (US); William Sprott Greene, Fairview, TX (US); Chris Stillwell, Plano, TX (US); Matthew C. Pierret, Plano, TX (US)

(73) Assignee: MCI, LLC, Basking Ridge, NJ (US)

( * ) Notice: Subject to any disclaimer, the term of this patent is extended or adjusted under 35 U.S.C. 154(b) by 872 days.

(21) Appl. No.: 10/292,256

(22) Filed: Nov. 12, 2002

(65) Prior Publication Data

US 2003/0144894 A1  Jul. 31, 2003

Related U.S. Application Data

(60) Provisional application No. 60/344,956, filed on Nov. 12, 2001.

(51) Int. Cl.
*G06F 15/173* (2006.01)

(52) U.S. Cl. ............... 709/226; 709/223; 709/224; 709/230; 714/4; 714/13; 714/39; 714/41; 714/47

(58) Field of Classification Search .............. 709/226, 709/223, 224, 230; 714/4, 41, 47, 13, 39
See application file for complete search history.

(56) References Cited

U.S. PATENT DOCUMENTS

| 6,374,295 | B2 * | 4/2002 | Farrow et al. | 709/223 |
| 6,718,486 | B1 * | 4/2004 | Roselli et al. | 714/41 |
| 2001/0049713 | A1 * | 12/2001 | Arnold et al. | 709/105 |
| 2003/0120829 | A1 * | 6/2003 | Avvari et al. | 709/330 |

* cited by examiner

*Primary Examiner*—Yves Dalencourt

(57) ABSTRACT

The present invention is directed to a system, method and software product for balancing resource services are always available to match the desired work to be done through the use of "sticky services.". Sticky services are defined as services that you know you want to have available as resources and as such they need to be present in the environment of cooperative applications; it may be that you want these always present or it may be that you want them present whenever certain conditions occur (see NewWave policy service). The general assumption of distributed systems is to not count on the environment you want being present, or put another way assume failure will occur. Therefore distributed environments like Jini assume all services are transient and will be garbage collected when not in active use. For the inside out approach to work, a mechanism should exist that, when desired, counters the transit design assumptions. This implies that two things are needed: (1) a mechanism for providing services as needed; (2) a mechanism for insuring the correct balance of resource services are always available to match the desired work to be done.

20 Claims, 29 Drawing Sheets

Re-homing of Failed Service

Re-homing of Failed Service

Self-healing Proxy Reference

FIG. 5
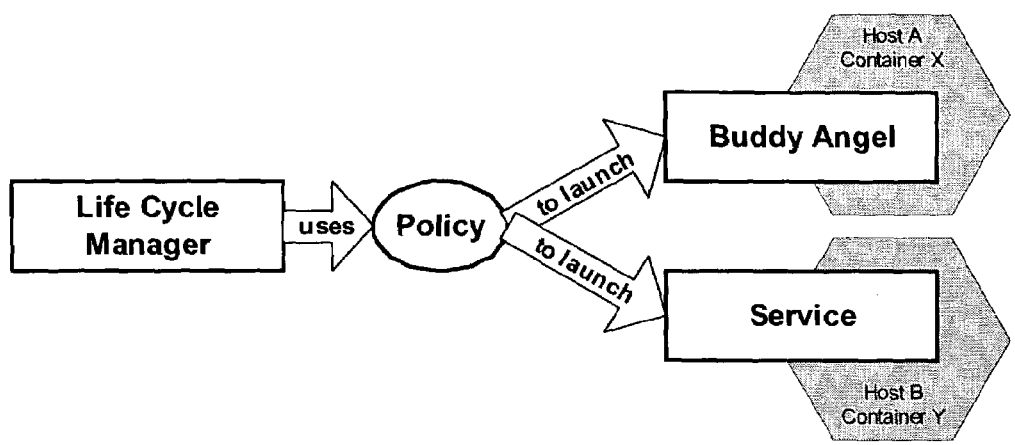
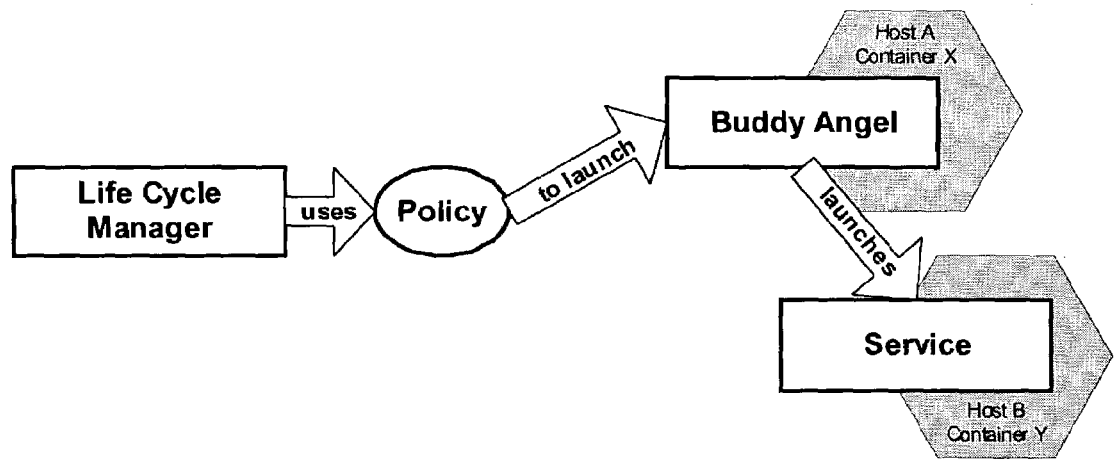
FIG. 6

Jini Services and Clients in a Local Environment

SYSTEM AND METHOD FOR CREATING AND MANAGING SURVIVABLE, SERVICE HOSTING NETWORKS

CROSS REFERENCES TO RELATED APPLICATIONS

The present application is related to and claims priority from co-pending U.S. Provisional Patent Application 60/344,956 filed on Nov. 12, 2001, and entitled "System And Method For Creating And Managing Survivable, Service Hosting Networks." The above-identified application is incorporated in its entirety herein by reference.

The present application is also related to co-pending U.S. Non-Provisional patent application Ser. No. 09/863,456 entitled "METHOD AND SYSTEM FOR MANAGING PARTITIONED DATA RESOURCES," filed on May 22, 2001, which claims priority from U.S. Provisional Application 60/206,564 and filed on May 22, 2000. The above-identified applications are incorporated by reference in their entirety.

BACKGROUND OF THE INVENTION

Field of the Invention

The present invention relates to network and information technology. More particularly, the present invention relates to creating a globally dispersed network of services and infrastructure which can dynamically combine into applications. Survivability of any network is paramount in today's climate. To achieve this, the invention describes a system, method and software program product for balancing resources such that these are always available to match the desired work to be done.

SUMMARY OF THE INVENTION

The present invention is directed to a system, method and software product for balancing resources to ensure that services are always available to match the desired work to be done through the use of "sticky services". Sticky services are defined as services that you know you want to have available as resources and as such they need to be present in the environment of cooperative applications; it may be that you want these always present or it may be that you want them present whenever certain conditions occur. The general assumption of distributed systems is to not count on the environment you want being present, or put another way assume failure will occur. Therefore distributed environments like Jini assume all services are transient and will be garbage collected when not in active use. Considerable reuse of development effort and of run-time resources are achieved with the "inside out" approach to application building. This approach decomposes traditional applications into small service components that utilize common infrastructure services. As such an application makes assumptions on what will be available as resources in the environment where it deploys. For the "inside out" approach to work, a mechanism should exist that, when desired, counters the transient design assumptions. This implies that two things are needed: (1) a mechanism for providing services as needed; (2) a mechanism for insuring the correct balance of resource services are always available to match the desired work to be done.

BRIEF DESCRIPTION OF THE DRAWINGS

The novel features believed characteristic of the present invention are set forth in the appended claims. The invention itself, however, as well as a preferred mode of use, further objectives and advantages thereof, will be best understood by reference to the following detailed description of an illustrative embodiment when read in conjunction with the accompanying drawings wherein:

FIG. 5 is one process flow showing the launch of Buddy angel services n accordance with one exemplary embodiment of the present invention FIG. 6 is another process flow showing the launch of Buddy angel services n accordance with another exemplary embodiment of the present invention;

Figure 1:
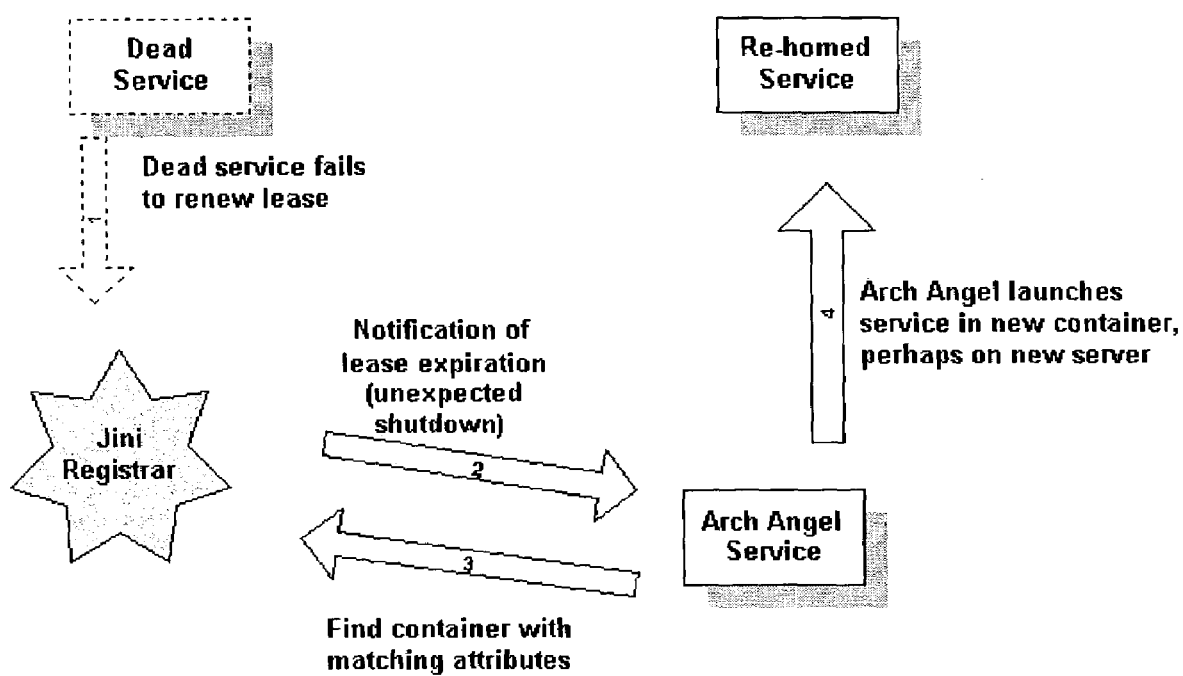
FIG. 1 is a process flow of re-homing a service to a new container.

Other features of the present invention will be apparent from the accompanying drawings and from the following detailed description.

DETAILED DESCRIPTION OF THE INVENTION

Distributed systems and the NewWave infrastructure in particular, can be made up of thousands of services running on hundreds of computers. NewWave itself is designed to scale many orders of magnitude larger than existing systems. Further, using the 'inside-out methodology' of application building, as described in co-pending U.S. patent application Ser. No. 09/863,456 entitled "METHOD AND SYSTEM FOR MANAGING PARTITIONED DATA RESOURCES," filed on May 22, 2001, systems are decomposed into many cooperating smaller services. This increases service number. In order to provide for reuse of programming and also of runtime resource usage, some of the services in the inside-out approach are infrastructure services. Infrastructure services are, by nature, services and resources used by many different applications. For the large applications to be broken up into a number of shared or co-operative independent services, the application user should rely on the replacement architecture of independent services to always be available. This makes the overall distributed system very complex as well as very large. Some mechanism should exist for insuring the constant resource pool of shared services.

Slicky services are defined as services that you know you want to have available as resources and as such they need to be present in the environment of cooperative applications; it may be that you want these always present or it may be that you want them present whenever certain conditions occur (see NewWave policy service). The general assumption of distributed systems is to not count on the environment you want being present, or put another way assume failure will occur. Therefore distributed environments like Jini assume all services are transient and will be garbage collected when not in active use. For the inside out approach to work, a mechanism should exist that, when desired, counters the transient design assumptions. This implies that two things are needed: (1) a mechanism for providing services as needed; (2) a mechanism for insuring the correct balance of resource services are always available to match the desired work to be done.

There is a basic problem of how you make network based services and their applications survivable; survivable here means resistant to piece part destruction or failure of the infrastructure of the distributed applications. For instance the IP network and routing provide for a network connectivity infrastructure that survives individual link failure. A similar mechanism is needed to insure that services are not absolutely dependent on the host server in which they run. Hosts will always fail and using economical hosts means failure is more likely. Thus there is a problem in providing and using sticky services in survivable application networks. A survivable application network should continue functioning even when host servers are failing or being isolated via network failures. If sufficient reserve overhead capacity and sufficient distance of distributed systems and domains is maintained, the overall system will continue to function against extreme attacks to the host network. In this era of increased capacity and demonstrated desire of individuals to disrupt communication and application services, survivable networks become the only responsible type to build. Indeed the business goal is to make distributed applications asymptotically approach the reliability of the underlying IP communications network.

Deploying angels with services allows angels to keep a steady state of services in a distributed domain. We have a rich approach to solving a problem of making a service sticky. We have developed several service archetypes and deployment patterns to meet the needs addressed above. Specifically we have developed managing agent patterns inside a highly distributed service domain, which we call Angels. Basically, an Angel is responsible for the life cycle of a service. This means the angel creates the service or is created contemporaneously with the service. An angel monitors the service and/or the system in which the service runs. The angel recreates the service when the service (temporarily) ceases to exist or function properly. Generally an Angel is not in the same container as the service it watches; often it is on a different host. The exact displacement (network distance) of the angel from the service is a matter of Policy (which in NewWave is itself a service the angel/service creator can use.)

Three archetype angel patterns are described. These build on and enhance the "Responsible Agent Pattern" as described in the prior disclosure. These patterns are named Archangels, Guardian Angels, and Buddy Angels. Also within these patterns two separate approaches are taken. One approach is to have a direct communications link between the Angel and the Service(s) it is managing: the Responsible Agent Pattern follows this approach. Guardian and Buddy angels use the direct approach. Another approach is to have an indirect communication of status between the Angel and the service(s). Archangels follow this indirect approach. An example of this approach is the registration with the Jini lookup service for events about a service's registration, renewal, and lack of renewal of the Jini lease; then these notifications are used to deduce the surviving status of the watched service.

Generally the Archangel watches groups of services. The Buddy and the Guardian Angel watch only one service instance. The Guardian and Buddy angel know specific details about the service they watch; general details in the case of the Guardian angel and specific state & health information in the case of the Buddy angel. The Archangel knows little to nothing about the services it manages. The Archangel imposes no specific burden on the service and the service does not know of the agent angel. The Guardian Angel, likewise, generally does not impose greatly upon the service it manages, beyond possible periodic polling or query to assess the health of the service.

There are costs in the deployment of Angels as these use system wide resources to function. In general the pattern will be chosen which best supplies degree of survivability assurance desired with the lowest overall cost of extra network/server resources. This can vary greatly by deployment and business goals. Therefore a mix of approaches assures achievement of business goals at a low overall cost. assess the health of the service. When building actual services and architectures of cooperative services, characteristics of these patterns are merged to produce the resulting stable, survivable applications.

TABLE I

| Type | Cardinality of agent to to service(s) | Connectedness to service & configuration | Knowledge of service |
|---|---|---|---|
| Archangel | One to many | Direct to configuration but Indirect or proxy to service | No specific beyond existence |
| Guardian Angel | One to one to service; One to one to Manager MasterRecord | Direct to service and configuration | Configuration information, existence & health info |
| Buddy Angel | One to one; symmetric | Indirect to configuration but direct to service; Service agent are symmetric | State & health information |

Each pattern will be described. Then an exemplary application (NewWave Phoenix) will be described which realizes life cycle survivable management within NewWave multi-level management domains. Phoenix draws from parts of all these patterns showing how a survivable system is built and managed. Another exemplary implementation is the NewWave dSS: Distributed Intelligent Agent [DIA] Support Service.

Also it is should also be noted that the deployment of these follows the general principles of the NewWave architecture. Configuration information is non-resident with deployment; in an exemplary embodiment it is held in Lightweight Directory Access Protocol directory service (referred to herein as LDAP), but could also be in a database such as Oracle. Policy can be used to adapt to local environmental and temporal circumstances; for instance a policy service could (and generally would) determine how many copies of a transaction service are maintained in a specific Jini management domain.

At least one Angel will always be running in a NewWave environment. Generally an environment/ecosystem of New-Wave services is launched by administratively starting a single Angel. In the Phoenix exemplary implementation, the launch of the topmost Phoenix service, where the LDAP service containing the environment's configuration is already up and running, launches everything else in the entire ecosystem. Thus thousands of services are launched globally, and then maintain themselves autonomously, from a single administrative command.

All the Angel patterns are declarative, "do what I mean and not what I say". The system is declarative because an administrative user does not explicitly launch a service or supply every detail of where they want it to be launched. The administrative entity (e.g. a console) that initiates the service launch activity rather declares what it wishes run. There's a level of indirection. Instead, the admin submits what can be thought of as a service requisition (configuration information). When a new service requisition is entered into the inventory of what is supposed to be running, the agent senses that and carry's out the bidding to make that happen.

The administrative entity instigates the service launch by posting a request to a life cycle service. This request can be indirect, in that a data entry can be made which an angel pattern will instantiate. Because some angels are always running in a NewWave environment, and these agent patterns monitor their environment and data/configuration, data entries can evoke the launch of services. Angels carry out the request. The Angel will typically make the determination of exactly what host and service container are used to home the new service instance. In this declarative approach, the administrative entity just states what it wants to happen, not how it happens or precisely where (i.e. on which host) it happens.

Archangel Method and System

Archangels are a specialized sub-grouping of angels and a specific template for forming responsible management agents. There are a number of different implementation methods available for each.

Archangels are indirect management agents. Like its namesake, the archangel can monitor and manage a large number of services; they are generally looking at more than one service instance. There are limitations to the specific management functions an Archangel can perform most usually either creating or destroying a service. There are also limitations to the information an Archangel gets and understands about the services in its domain, usually limited to near-real-time status on the existence or nonexistence of the service within a specific scope of hosts (e.g. a specific Jini Lookup Service).

An Archangel is democratic, performing the same limited functions for all elements in its domain: usually create or destroy. An archangel has limited ability to distinguish between elements in its domain and to treat them differently. Notable differences are the ability to understand and identify: other management agents, infrastructures such as Jini, and containers, such as the NewWave container, a Jini augmented Java Virtual Machine (JVM). But all NewWave generic services would be treated identically by the archangel, according to the instructions provided to the archangel.

Archangels get instructions by changes to configurations in persistent storage, said configurations containing the desired deployment of services in a specific domain (and sub-domains). In Phoenix this is realized by adding an eXtensible Markup Language (XML) entry to the LDAP persisted configuration tree. Archangels can also get instructions via an administrative interface. This would be an authorized user command to perform an orderly shutdown of a specific management domain.

In is simplest realization an Archangel works vis-à-vis the lookup and registration methods of Jini or some other infrastructure embodiment of the NewWave Operational Support System (OSS) architecture. They monitor the lookup service for the coming and going of events. Archangels have passive and active method patterns.

The Passive Archangel Method:

The passive Archangel pattern basically says that any service that registers in the lookup service that is not explicitly shut down should be recreated, i.e., remain up, as depicted in FIG. 1. So, if a lease expires that was not associated with a revocation of the service it will recreate the service. So this keeps the monitored local environment going with whatever set of services were dynamically deployed. The passive method is a simple and sure, birth to death mechanism for insuring a sticky service.

The Active Archangel Method:

There also is the active configuration Archangel. It says "I understand from externalized configuration information that these services should be available in this specific domain", and it registers the lookups for that domain and then it recreates or destroys service instances to match the pattern that it is supposed to have in the configuration, mollified by any policy issues. The active pattern is a life-cycle, time-line "conception, to gestation, to birth, to grave" management pattern.

For example, if it is told that it is to have 50 transaction threads available in the Texas domain and if there are not 50 transactions threads registered in the lookup services it participates within the Texas domain, it will create some somewhere to satisfy the policy requirements. Policy statements generally determine where it's done and the limits to maintain.

Figure 2:
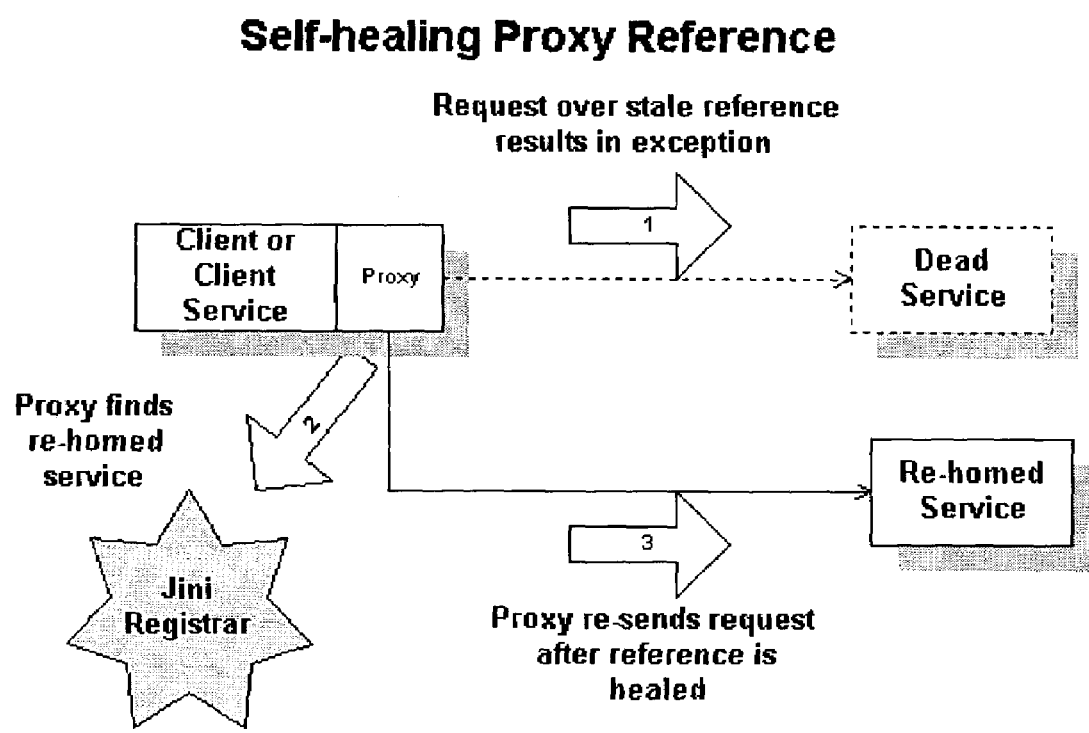
FIG. 2 is a process flow for reattaching a client to a re-homed service.

Clients:

Once a service is recreated in a new home [host & container] as depicted in FIG. 1. The clients will all find and reconnect to the service using a fail-over smart-proxy pattern as depicted in FIG. 2. This client finding & reconnection occurs independent of any direct knowledge or action of the Archangel service. This insures the interaction of the overall applications network continues as a set of location independent, cooperating sub-units.

Gabriel Archangel Method and System:

The Gabriel Archangel is basically a widespread creation and a destruction agent. It can create an entire service environment from scratch, bootstrapping everything necessary to bring it from initiation to steady state. Phoenix is an exemplary embodiment for NewWave services that can bring up the entire global ecosystem of services, including Jini on the hosts it uses and containers on all the hosts.

Conversely the Gabriel pattern can destroys an entire environment, takings it all down to nothing (as when the biblical Gabriel will blow its trumpet at the end of time.) An implementation example would be the revocation of authentication of a branch of a security tree of service certifications, which causes all the authorized branches of that relative root to be stopped and purged from the ecosystem.

Gabriel understands how to launch/destroy the whole system, or just a specific sub-part of it.

Gabriel patterns are especially useful in test and development environments where management domains are created and destroyed often.

The destructive Gabriel pattern is quite necessary when sticky services are instated with management agents. When a service is to be forced down, the Gabriel angel agent kills the service and insures that all service notifications for the orderly retirement of the service are given to all the lookups and responsible angels, so that some other agent angel will not just automatically recreate the service. In this case, Gabriel acting as the Grim Reaper, can take down a specific service type or even a specific service.

Guardian Angel Method and System

The Guardian Angel watches only one thing, a service instance, and thus follows the responsible agent model and pattern of action. The Guardian angel is used when it is so needed, time wise, to keep a service up that you have to respond immediately to the loss of that service. When you use it, it is mostly a time response issue, but it is also somewhat of an importance issue as well.

Guardian Angel Approach to Service Management

The next sections give an overview and high-level design sketch of the Guardian Angel system for managing a large number of software service instances in an operational environment. We refer to the approach as the "Guardian Angel" design pattern. The goal is to produce a system where management of an extremely large number of software service instances is tenable, and where any part of the system (including managed services, agents managing the services, and central information stores) can fail, and the system will return to a stable, healthy state. The heart of the invention is in accommodating failure of either the service, the Angel, or both, and still be able to recover and bring the system back to normal operation. The NewWave projects have explored two variations on the direct, one-to-one approach to service management. Both approaches share the feature that responsible agents are paired with services which they manage. In one variation, the relation between angel and service instance is highly symmetric—a sort of buddy system—where angel and service can re-start each other; what we call "Buddy Angels". The other variation is very asymmetrical between Guardian Angel and managed service, with a very different strategy (namely a leasing strategy) applied to assuring that there is always a healthy Angel paired with each service instance. The present sections discusses the latter, asymmetrical approach.

Overview of Guardian Angels:

In this Guardian Angels section, we describe an approach to managing a large number of software service instances in an operational environment. Such software services might be either standalone processes or realized as threads within service container processes. The present approach could also be adapted to the management of other resources in an operational environment besides software services. We however focus our attention in this document on the task of managing software services that are deployed out to generic service container processes in the style of the WorldCom NewWave service architecture and the service hosting platform that is built upon Java, Remote Method Invocation (RMI), Jini and a number of other technologies, for instance those pioneered by the WorldCom Group of Clinton, Miss. Despite this focus on these concrete implementation technologies, the principles embodied in the present approach to systems management can be adapted to other implementation technologies.

Figure 3:
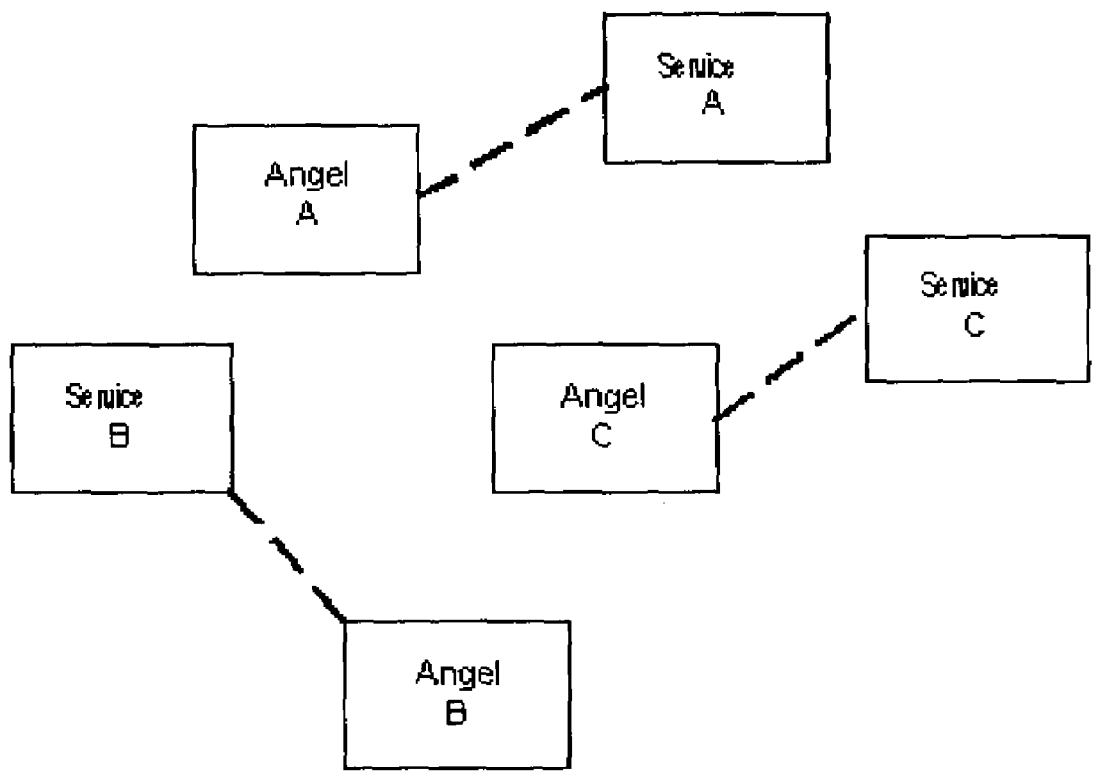
FIG. 3 is a diagram showing how services and angels are paired 1 to 1 in accordance with an exemplary embodiment of the present invention.

A principle feature of the Guardian Angel approach is that each instance of a service in deployment is paired with an instance of a Guardian Angel object whose job is to manage that particular service instance. The relationship between Angel and service instance is thus one-to-one, as suggested in the FIG. 3.

NOTE: The one-to-one relationship is not, however, strictly in force at all times due to the fact that components can fail. At transient times, an Angel or the service for which it is responsible may fail, during which time a component may be without a "partner" for a short interval. Also, during the service launch process, there will be a short time when the Angel exists, but the service hasn't been launched yet. The one-to-one relationship between angel and service is, thus, the ideal state that the system strives to maintain. We describe the angel-service relationship as "one-to-one" to stress the fact that a given angel instance does not manage several service instances.

The angel instances can be considered to be management agents who oversee the entire lifecycle of deployed software services. The angel will typically oversee the initial launch of the service, monitor the service's health, kill service instances that are failing, launch a new service instance to replace a failed service, and perhaps even initiate actions that result in the launch of redundant copies of a service that is presently reaching capacity in order to effect load-balancing and scaling. In short, the Guardian Angel has responsibility for any and all aspects of the care and feeding of a particular deployed service instance. The exact nature of how a particular Guardian Angel oversees the life of the service that it manages is outside of the scope of the Guardian Angel pattern per se. The object class that implements a Guardian Angel for a particular class of service may be of a custom design, or it might utilize a generic design that is found to be useful for typical situations. We allow flexibility for a given type of Guardian Angel to do whatever is appropriate to the management of the particular service type that it watches over. The emphasis of the present design is in creating a system that ensures that every service in deployment will have a Guardian Angel watching over it at all times. The details of what the Angel does are left to the service designers. However, one should bear in mind that typical Guardian Angels will be designed to assess the health of the services they watch via mechanisms such as polling, monitoring heartbeat signals emitted by the service, or more detailed query to assess more complex problems with the service, such as whether the service is running out of resources. The details are up to the designer.

As mentioned above, the Guardian Angel oversees the entire lifecycle of a given service instance. This includes the action of originally launching the service. One could alternatively imagine an approach where a service is launched through some other agency, and then a Guardian Angel is enlisted into the picture, after the fact, to oversee the subsequent health of the service. But in such as approach, the Guardian Angel would probably need to do re-launches of a failed service, even if it did not do the initial launch. This design seems a little awkward. It seems much cleaner and simpler to just make the Angel responsible for the entire lifecycle, both initial launch and any subsequent re-launches.

There are many management approaches in existence that adopt a quite similar strategy of pairing management agents with resources that such agents manage. The idea of having management entities overseeing the health of managed resources is nothing new. In any such management agent approach, one faces the question, "If the agents are overseeing the health of the resources, then who is overseeing the health of the agents?" One approach that has been adopted by some is to deploy a second tier of agents to oversee the health of the first agent tier. That approach invites the question of who oversees the health of the second tier, and so on. In practice, one avoids an infinite regress by simply truncating the scheme and considering a few tiers of agents to be "good enough".

The approach adopted in the Guardian Angel design attempts to find a cleaner closure to this problem of "who is watching the agents that are watching the resources", while avoiding the infinite regress. The approach we take is to do something that is a little weaker than "ensuring the health of the agents." We simply maintain an awareness of whether a responsible agent (Angel) is alive, using a leasing formalism. If an Angel is missing in action (detected by the Angel's failure to renew its lease on time), no attempt is made to try to diagnose the problem or restore the Angel to health. On the contrary, a replacement Angel is enlisted to take over for the Angel that is missing in action. Should the original Angel recover and attempt to renew its lease after having been replaced, it will be informed that it is now "off the case". The Angel that is thus replaced simply terminates itself.

In this approach it is not always necessary to take the time to create/load the angel from scratch. Unpaired angels can be in resources pools waiting to be associated with a service. This can save considerable response time on the failure of an angel assigned a specific service.

The concept of leasing is utilized by the Jini suite of components available from Sun Microsystems, Inc. in Palo Alto, Calif. (particularly the Jini Lookup Service and the JavaSpaces shared tuple space engine). In these familiar usages of leasing, an external entity establishes and maintains a lease with a service in order to express the wish for a stored resource to be maintained on that external entity's behalf. If lease-renewal does not happen on time, the service stewarding the leased resource will automatically clean up (discard) the leased resource. In the case of the present Guardian Angel approach to service management, the thing that is being leased (at least in an abstract sense) is the affiliation between a specific service instance and a specific Guardian Angel instance that is managing that service instance. Whenever this leased affiliation is allowed to expire (for whatever reason), a replacement Angel will be enlisted to take over. The details of how this happens are covered in more depth below.

In order to manage the leasing mechanism described above, we create a service, that we'll call the MasterRecord, which actively handles the lease bookkeeping. The MasterRecord also maintains the definitive record of what services are expected to be running in the operational environment at any given time. Each record that describes a service instance that should be running contains complete information on the service as well as the Guardian Angel management agent that is to oversee the lifecycle of the service. By complete information, we mean everything required—URL of class codebase, name of class, initialization parameters—necessary to specify what is to be launched.

We assume that the operational environment is divided into logical management domains. There may typically be one or more management domains within an operations center. A given management domain would generally not span multiple operations centers. We assume that there will be exactly one instance of the MasterRecord service for each management domain, plus possibly one or more additional standbys ready to take over, should the primary Master-Record fail. The MasterRecord contains the complete picture of all the service instances expected to be running within a given management domain. It is an off-board store of service network configuration. Since the MasterRecord is potentially a single point of failure and holds mission-critical data, its storage needs to be persistent within a reliable, enterprise-class database, such as Oracle or IBM's DB2. We use very traditional database fault tolerance and recovery approaches, such as replication to a mirror database, to ensure that we can recover in the event of a database failure. We also need to ensure that the MasterRecord service remains available and that failover occurs, should this service go down. Technically speaking, we haven't absolutely solved the dilemma of infinite regress described above, since we need to ensure that the MasterRecord service stays healthy using very traditional techniques (perhaps including alarms to a console). However, we've vastly reduced the scope of the management problem to a much more tractable problem of maintaining the health of this one service. The rest of the system—encompassing possibly thousands of services and Guardian Angel agents deployed on hundreds of processors—is largely self-healing and can recover automatically regardless of which components fail.

At first glance, the present approach may seem similar to buddy systems, in the sense that Angel instances are paired with service instances. However, the Guardian Angel approach, as described in this section, is not a buddy system, since there is an asymmetry between the Angel and the managed service. A buddy system (or other Angel pattern) could be used to insure the survivability of the Master-Record service, but this would be independent of the operation of the Guardian Angel in managing other services. Similarly, the existence of agent hosting containers, pools and/or the number of unsubscribed angels in the available pool could be controlled through an Archangel service.

One adjective that may be used to describe the current system is the term declarative. The Guardian Angel system is declarative in the sense that an administrative entity does not explicitly launch a service or supply every detail of where they want it to be launched (typically). The administrative entity (e.g. a console) that initiates the service launch activity rather declares what it wishes to be run. The administrative entity instigates the service launch by posting a sort of service requisition to the MasterRecord service. The MasterRecord and Guardian Angel then see to it that this wish is carried out. The Guardian Angel will typically make the determination of exactly what host and service container are used to home the new service instance. In this declarative approach, the administrative entity just states what it wants to happen, not how it happens or precisely where (i.e. on which CPU) it happens.

Figure 4:
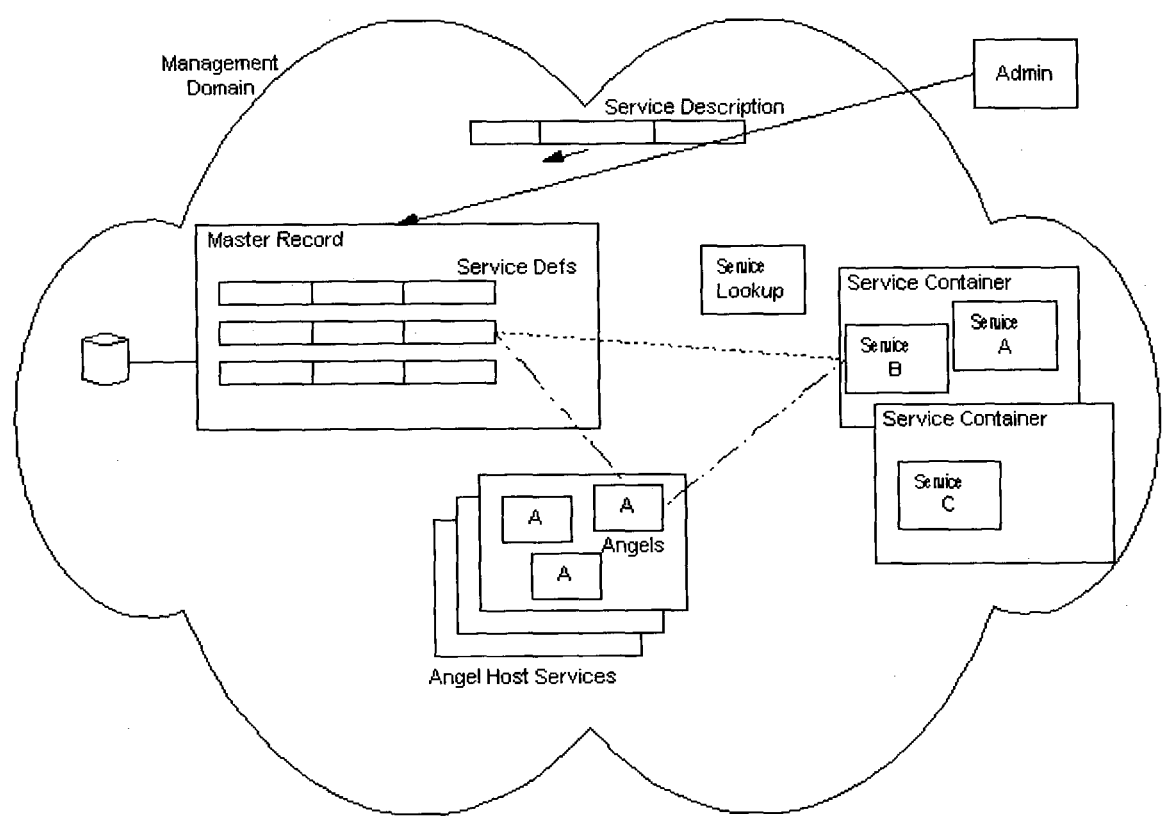
FIG. 4 is an illustration of the major components involved in the Guardian Angel management approach and indicates the triplet of angel, managed service and service definition record in the MasterRecord for every deployed service in accordance with an exemplary embodiment of the present invention.

Components:

FIG. 4 illustrates the components involved with the Guardian Angel management approach.

In the following, we describe the various major components comprising the Guardian Angel service management approach:

Management Domain:

In the figure, the "cloud" surrounding most of the other components is the Management Domain. The management domain is somewhat abstract in that it is not a specific piece of hardware or software process. It is rather embodied as an entire set of software and hardware resources that have been grouped together into a logical unit in order to facilitate management. The management domain is a construct for breaking an enterprise's system management challenge into tractably sized units. A management domain will typically be scoped to a single operations center. A large operations center may well contain several management domains. Every host CPU, service container, MasterRecord service and Jini service lookup process will be assigned to a specific management domain. The specification of the management domain is discussed in greater depth in a later section.

For the purposes of the discussion in this section, nearly all activity of the various participating components may be considered to be in the context of one specific management domain. In the figure above, the only participant that is possibly outside of a given management domain is the administrative entity, labeled "Admin" in the figure. The program or entity, which posts to the MasterRecord the original request for the deployment of a service, may be either within or outside of the management domain. This administrative entity might often be an administrator's console. Such an administrative entity might well post requests for service deployment out to multiple management domains. Generally in a global deployment there would be many management domains each independently using these techniques to manage resources according to local policy.

Master Record:

Each management domain needs to have one MasterRecord service process running. The MasterRecord service embodies both passive storage of information (likely backended in a relational database) and active management of leases. The MasterRecord service represents the definitive storage of the specification of what services are expected to be running within the management domain at a specific point in time. This records the ideal state of deployed services in the domain; not necessarily the actual state, since, at any given moment, some services may be in a state of failure, recovery or being launched. Each entry or record stored in the MasterRecord represents a single service instance that is to be in deployment in the environment. These service descriptions will contain complete information, such as URL of class codebase, class name and initialization information, required to create the service. The service description will likewise contain similar information required to fully specify the Guardian Angel object whose job it is to oversee the lifecycle of that deployed service.

In addition to the passive storage aspect of the MasterRecord, this service will also contain an active component handling lease management. The lease-management apparatus could be based upon a priority queue and a watcher thread that sleeps until the soonest-to-expire lease entry is expected to have expired. The watcher thread wakes up, then starts expiring all the leases at the head of the priority queue whose expiration has already elapsed. When all elapsed leases have been expired, the watcher thread calculates the time it should go to sleep (based upon the time to live of the lease entry at the head of the priority queue, perhaps adding a little extra time to ensure that the thread doesn't wake up milliseconds too soon) and sleeps for that interval. If the priority queue is empty, the watcher thread might go to sleep some default waiting period (like a second), or else wait on a signal sent when an entry is placed into an empty queue. These techniques of lease-management are standard practice.

The MasterRecord will have, in its interface, methods for administrative entities to post new service descriptions and for Guardian Angel management agents to renew their leases. When an angel renews its lease, the MasterRecord process needs to remove the current lease record from the priority queue, update the record, and insert the record back into the priority queue. Its position in the queue is based upon order of time to live, with those leases having less time to live being positioned toward the head of the queue.

When a new service description is posted to the MasterRecord service (or when the MasterRecord restarts during a recovery scenario), the MasterRecord needs to find an Angel Host Service in the management domain into which it can deploy a new Guardian Angel instance. For robustness, there will generally be several Angel Host Services running on distinct CPUs within the given management domain. The MasterRecord needs to choose exactly one of the Angel Hosts from the several that are available and deploy the new Guardian Angel instance out to that Angel Host. The criteria for making such a selection may follow any one of several commonly used policies, such as random choice, round-robin, least-utilized, etc. or via specific reference to a NewWave behavior service. There are also a number of different techniques that the MasterRecord might use in order to maintain awareness of the list of candidate Angel Host services out there from which it may make this election. We briefly describe a few:

One approach to selecting an Angel Host service for deployment of a new Angel instance is a just-in-time procedure. When the MasterRecord needs to launch a new Guardian Angel agent (e.g. when a new service description is posted), it might publish an angel-host-solicitation even to a publish/subscribe event bus. The Angel Host service instances would all be listening on the event bus for angel-host-solicitation events. Whenever they receive the event, they send a callback message to the originator, in effect volunteering their services. The MasterRecord could wait a reasonable short interval for volunteer responses to come back, then apply its policy to select one of the volunteers.

Another possible approach to the Angel Host service selection problem is to have the MasterRecord service maintain a list of all the known Angel Hosts services within the management domain at any given time. In this approach, whenever a new Angel Host service instance is created in the environment, it looks up the MasterRecord service (in Jini lookup), and registers itself with the MasterRecord. When a new Angel is to be launched, the MasterRecord will simply consult its local list of Angel Host services, apply policy and make a selection. Should the selected Angel Host service be unreachable, the MasterRecord would simply choose another.

Other variations include using the Jini Lookup service to maintain the MasterRecord's awareness of the candidate Angel Host services out there. The Angel Host services could register themselves in the Jini Lookup upon launching. Then the MasterRecord could use Jini Lookup to find a suitable Angel Host service at runtime.

Other approaches are undoubtedly possible, and a number of these approaches are likely workable. The only important thing is that there is some suitable mechanism for the MasterRecord to be able to find the various candidate Angel Host services at runtime in order that it may make a selection of which one to use for the deployment of a new Angel into the environment.

Whenever a lease expires, this means that a Guardian Angle instance has failed to report back to the MasterRecord service in a timely manner. The MasterRecord will then choose an alternative Angel Host service and request that Angel Host to launch a new Guardian Angel instance to replace the old one that is missing in action. The new Angel will need to establish contact with the managed service in order to take over the task of managing that service instance. One viable approach to enabling this ability of the new Angel to establish contact with an existing service is as follows: When the original Angel first launches the service for which it is responsible, and that service registers itself in Jini Lookup, the service will tell its Angel the unique Jini service ID generated by Jini Lookup. The Angel can then forward this information on the unique service ID back to the MasterRecord. The MasterRecord can store this ID in one of the fields of the record for that service deployment. Then whenever a failed Angel is replaced with a new one, the MasterRecord can provide the new Angel the service ID which it can then use to look up the service instance in Jini Lookup.

The MasterRecord needs to store its record of deployed services in a reliable, enterprise-class persistent store, such as an Oracle or IBM DB/2 database. Conventional database failure recovery techniques should be in place (such as replication to a mirror database) to ensure that failover to a standby can take place in the event of a failure. Of course, all the techniques of maintaining "sticky services" can be used in conjunction with this.

Angel Host Service:

The Angel Host services are processes into which Guardian Angel instances may be deployed. Each Guardian Angel, upon being launched, is given its own thread of control. (An Angel may spawn additional threads of control, if it wishes.) The Angel Host service might be a typical NewWave Jini service deployed within a NewWave generic service container (itself a JVM process). Or the Angel Host service might be a standalone heavy process started on a CPU host via a boot script. A number of variations are possible. There is some elegance in an approach where the Angel Host service is an ordinary NewWave service deployed out to generic service containers, like any other service; the Angel Host service, being a managed service, would have its own Guardian Angel, deployed within another Angel Host service instance. But such an elegant approach may present bootstrapping problems for doing a cold boot of en entire environment: a service needs an Angel to launch it, and the Angel needs to live in an Angel Host on another CPU from the service it is watching; which leads to an impasse for booting the first Angel Host service. Thus the Phoenix embodiment, described below, uses multiple approaches to achieve this bootstrap. For the time being, we'll just assume that the Angel Host services are just launched via boot script as heavy processes on a variety of CPU hosts in the management domain. Or perhaps, for bootstrap purposes, we have at least one standalone Angel Host process; the rest can be full-fledged, managed NewWave services, deployed dynamically to generic service containers and each with its own Guardian Angel watching over it.

When an Angel Host service is first deployed, it will register itself with Jini Lookup services that are discovered in the local environment. Depending upon the precise approach adopted (as described above), the Angel Host service my look up the MasterRecord and register itself with the MasterRecord, or it may contact the pub/sub event bus and subscribe to angel-host-solicitation events. As stated above, there are several different variations on the approach taken to assuring that the MasterRecord can always find the available Angel Host services in a given management domain.

Guardian Angels:

The Guardian Angels are the objects running in the Angel Host services that manage various deployed services. Each Guardian Angel manages a single service instance. Each Guardian Angel will be started by the Angel Host service with its own thread of control. A typical Angel might put its thread to sleep and awaken periodically to send ping or monitoring requests to the service that it manages. The Angel might also subscribe to heartbeat events or callbacks sent out by the service that it manages. The class which implements the Guardian Angel for a particular service type may, in general, be a custom class designed specifically to manage a particular kind of service. Implementers would probably wish to design a base class for Guardian Angels that provides generally useful behavior that would suffice for most service management situations. Service designers could design specializations of the Angels to handle special cases that arise where more elaborate service management is required.

Service Description:

The Service Description details the specification of the service that is to be deployed, as well as the Guardian Angel that is to manage the service. An administrative entity will create a Service Description, populating its "fields" with required information. The Service Description could be implemented as an XML document, as serializable Java object graph, or as some other representation. For both the service instance and the Angel instance, the Service Description will contain all the information required to launch an instance of the service or Angel in a JVM environment. In a typical implementation, this information would include the URL of a Java code base (usually a jar file), the fully-specified class name (including package path) of the root object of the service or Angel, and some encapsulation of all the initialization parameters required to initialize the service or Angel. At bare minimum, the service description might thus look something like:

(URL serviceCodebaseURL, String serviceFullClassName, Serializable serviceInit, URL angelCodebaseURL, String angelFullClassName, Serializable angelInit)

Designers may wish to add more standard information fields to the service description, beyond the custom initialization information that can be packed into the service and Angel initialization payloads. For example, one might wish to list some criteria desired for the runtime environment where the service is to be homed. "Homed" is just synonym for "deployed" or "launched". Just means that the service code gets loaded from Hypertext Transfer Protocol daemon (HTTPD) and the service objects get created in the container. One might wish to specify class of CPU where the service is to be run or various other constraints.

Service Containers, Services and Jini Service Lookup:

The other components shown in the above figure are the service containers, the services themselves deployed to those containers, and the Jini service lookup in which services register themselves. These components are described elsewhere in NewWave documents, as described in co-pending U.S. patent application Ser. No. 09/863,456 entitled "METHOD AND SYSTEM FOR MANAGING PARTITIONED DATA RESOURCES," and descriptions of Sun's Jini technology.

Scenarios:

In this section, we describe a few scenarios of the Guardian Angel management system in action.

In the first scenario, we consider the initial deployment of a service instance. The first step is that an administrative entity creates a service description fully specifying the service to be deployed and the Guardian Angel that is to deploy it. The administrative entity looks up the MasterRecord service (e.g., using Jini Lookup), and posts the service description using a method in the MasterRecord's API. The MasterRecord persistently stores the service description in its database. The MasterRecord then selects an appropriate Angel Host service (using one of the techniques outlined above). The MasterRecord then invokes a remote deployNewService ( ) call on the selected Angel Host service, passing much of the information from the original service description. The Angel Host service will then use the URL and class name information to instantiate a new Angel instance. One approach to accomplishing this instantiation is to use the URLClassLoader class that is a part of Sun's Java SDK. After instantiating the new Angel, the Angel Host service will start the Angel object's thread of control. At that point, the Angel is an autonomous entity that can do anything it wishes (within established policy constraints of the JVM environment). But typically, the next thing a Guardian Angel would do is to launch the service for which it is responsible. The approach to launching a service to generic service containers has been described elsewhere in New-Wave documents and, as described in co-pending U.S. patent application Ser. No. 09/863,456 entitled "METHOD AND SYSTEM FOR MANAGING PARTITIONED DATA RESOURCES." On an ongoing basis, the Angel will act as the responsible agent that ensures the health of the service. It might periodically poll the service or listen for heartbeats. It might query for various status information and try to diagnose if its service is sick. If it determines that its service has failed or is in bad health, the Angel might deploy a new service instance to another container and shut down the original service. The exact nature of the ongoing management is up to service designers. In addition to ongoing management and monitoring of the deployed service, the Angel also needs to periodically renew its lease with the MasterRecord to keep the MasterRecord aware that the Angel is still out there doing its job. Also note that after the Angel launches a new service and that service registers itself with Jini Lookup, the unique Jini service ID needs to be relayed back to the Angel, then back to the MasterRecord in order that this ID can be stored in the entry corresponding to that service and Angel. (The MasterRecord should store this service ID as part of the record for the deployed service in order that when an Angel fails, a replacement Angel will be able to establish contact with the relevant managed service. This is discussed further in the next scenario.)

A variation on this pattern can occur when the Angel Host already contains a number of unattached angel services. Typically these would have been launched by an Archangel service much like making available a fixed number of Jini transactions services. In this variant, the Host provides an association of the Guardian Angel (instead of a create) to the configuration of the target service. The Guardian then creates its service. The Host may then generate another replacement unattached angel and have it ready to begin work when a new association request comes.

In the second scenario, we consider what happens whenever a Guardian Angel fails. When the Angel fails, its lease will eventually expire in the MasterRecord. The MasterRecord, upon lease expiration, will then find another Angel Host service in which to deploy a new Angel to replace the old one. The MasterRecord will make a launchReplacementAngel ( ) call to that Angel Host service, passing similar information as the deployNewService ( ) call. In addition, it will pass the Jini service ID that uniquely identifies the service which was being managed by the Angel that was lost. The Angel Host service will then instantiate a new Angel instance. This replacement Angel then uses the service ID to locate the service that it is now responsible for. The new Angel will then resume the task of managing and monitoring the health of the service. If the original responsible Angel did not actually die, but failed to renew its lease for other reasons (like a communication failure), then that original Angel may attempt to renew its lease alter it has already been replaced. In that case, the MasterRecord will throw a lease renewal exception that signals the old Angel that it has been replaced. The old Angel should then just terminate itself.

In a third scenario, the Angel and the managed service instance might both fail. As in the second scenario, the lease will expire and a replacement Angel will be created. The replacement Angel will fail to find the service. Either the service's registration will be gone from Jini Lookup, due to lease expiration; or else the registration will still be active, but the replacement Angel will experience a failure upon trying to communicate with the old service that is now gone. The Guardian Angel, unable to establish contact with the old service will then need to re-deploy a new instance of the service.

In a fourth scenario, the MasterRecord goes down for some reason, and is brought back up (possibly on a different machine). There are a number of ways that we can recover from this sort of failure scenario. We assume that very traditional, established failover techniques, such as database replication to a standby database and failover capabilities of commercial application servers, are used to recover a failed MasterRecord service. If an implementation of the MasterRecord service has full recovery capability for its internal state (as well as the state persisted in the database), then the new MasterRecord instance can smoothly take over where the old one left off. If recovery took an appreciable time period, then some of the leases may have expired, not due to Angel failure, but due to the MasterRecord having been out of commission for some time. The MasterRecord can simply go through its usual procedure of replacing Angels whose leases have expired with replacement Angels.

In an alternative recovery strategy for the MasterRecord, we assume that only the data persisted in the database is recovered across the failure. This persisted data is mainly the individual records that describe each of the services in deployment and their Guardian Angels. In this approach, we assume that all the lease management bookkeeping is in volatile memory and lost after a failover. In this case, the MasterRecord should start all over again establishing its lease management state. The simplest approach is for the MasterRecord to simply iterate through all the service records and for each service, recruit an Angel Host service and create a fresh replacement Angel to resume the management of each service. This starts from scratch with a whole new set of Guardian Angels. If recovery of the MasterRecord happens quickly, this approach is a bit wasteful, since it discards a lot of healthy Angels out there that didn't fail, but just couldn't do lease renewal while the MasterRecord was missing. A better refinement would allow the existing running Angels to commence renewing their leases after the MasterRecord failover occurs.

Interface Design:

In this section, we sketch at a very coarse level some of the interfaces involved in the Guardian Angel service management scheme.

Master Record Administrative API:

This API allows the administrative entities (e.g. console programs) to post service descriptions to the MasterRecord. The act of posting a service description kicks off the chain of events that result in a service and its Guardian Angel being deployed to the operational environment. This admin API also allows one to query about a deployed service, and especially to obtain sufficient identifying information to establish contact with a specific deployed service.

```
public ServiceRecord deployService(ServiceDescription srvcDscr)
    throws ServiceDeploymentException;
```

In the deployService( ) method, the caller passes in a ServiceDescription object populated with fields fully describing the service and Angel. The MasterRecord returns a ServiceRecord object that encapsulates information required if the administrative entity wishes to find the deployed service and make calls to it. One key piece of information in the ServiceRecord, perhaps the most important, is a unique id (e.g. a long integer) that identifies the deployed service record in the MasterRecord. This id amounts to the primary key (PK) that identifies a given service deployment record in the MasterRecord service's database. This PK is generated by the MasterRecord (or by the database . . . an implementation detail) immediately when a deployService ( ) request comes in. This PK is different than the Jini Service ID that is generated only after a new service has been launched by the Angel and registers itself for the first time with a Jini Lookup service. Both the PK described above and the Jini Service ID are stored in the MasterRecord's database. It however will take some time for the service ID to trickle back asynchronously to the MasterRecord in the course of the launching of the Angel and service to the environment.

```
public net.jini.core.lookup.ServiceID getServiceID(ServiceRecord rec)
    throws ServiceRecordNotFoundException;
```

This method returns the Jini service ID of the deployed service corresponding to the PK encapsulated in the specified ServiceRecord. Null is returned if the specified service exists in the database, but the Jini service ID has not yet been set. It is normal for some latency to occur during the course of service launch before this field gets set. The caller may then use ordinary Jini means to look up the actual service interface using the returned ServiceID.

```
public GuardianAngelRemote getAngel (ServiceRecord rec)
    throws ServiceRecordNotFoundException;
```

This method returns an RMI remote interface to the Guardian Angel that is managing the specified deployed service. This may be useful for shutting down a deployed service. Rather than directly telling the service to shut down, the administrative entity obtains a handle to the Angel, via the above method, then requests that the Angel terminate the service. The Angel will kill the service, inform the MasterRecord, then terminate itself.

Master Record Angel Callback API:

This API allows the Guardian Angels to make callbacks to the MasterRecord. Note that the Angel always uniquely identifies itself with the MasterRecord by passing in the ServiceRecord, which encapsulates the PK of a specific service deployment record in the MasterRecord database.

```
public void setServiceId(ServiceRecord rec,
                         net.jini.core.lookup.ServiceID sid)
    throws ServiceRecordNotFoundException;
```

This allows the Angel to set the service ID field in the record for the relevant service. The Angel calls this method after it finds out what the newly-launched service's Jini service ID is.

```
public void removeRecord(ServiceRecord rec);
    throws ServiceRecordNotFoundException;
```

This allows the Guardian Angel to purge a record for a deployed service from the MasterRecord's information. This is done during the graceful, permanent shutdown of a specific service instance. This call results in the MasterRecord deleting the appropriate record from the database and removing the lease-expiration entry from the lease management bookkeeping. Making this call is the final act of the Guardian Angel before it terminates itself.

```
public LeaseGrant renewLease(ServiceRecord rec,
                             long requestedLeasueDuration);
    throws ServiceRecordNotFoundException;
```

This allows the Guardian Angel to periodically renew its lease with the MasterRecord. The expiration info for the granted lease will be encapsulated within the LeaseGrant object that is returned.

Master Record API for Angel Host Service Registration:

This API allows the Angel Host services to make calls to the MasterRecord. As described above, there are several different viable approaches to accomplishing the end of keeping the MasterRecord aware of the available Angel Host services in the management domain. These alternatives include such approaches as using a pub/sub bus, using Jini Lookup and so on. We will not describe all APIs for every possible approach. We will simply give some API methods that assume an approach where the Angel Host services just register themselves with the MasterRecord, and the MasterRecord maintains internal bookkeeping on the known Angel Host services.

```
public void registerAngelHostService(AngelHost
    angelHostRemoteInterface)
```

Angel Host Service API:

This API allows the MasterRecord to make requests to the Angel Host services.

```
public void deployNewService(ServiceDescription srvcDescr,
                             ServiceRecord rec,
                             long initialLeaseDuration,
                             MasterRecordRemote mr);
```

This method allows the MasterRecord to request that the Angel Host service (the receiver of the call) create a new Guardian Angel instance, and start that Angel's thread of control. All the information needed to instantiate the new Angel and initialize it is encapsulated in the ServiceDescription. Upon creation of the new Angel instance, the Angel Host service will initialize the Angel, passing it the ServiceDescription and the ServiceRecord. The information within the ServiceDescription will allow the Angel object to launch the appropriate service within the infrastructure of the management domain. The ServiceRecord tells the new Angel its identity, in order that the Angel can identify who it is each time it makes callbacks to the MasterRecord service. The MasterRecord also passes in an initial lease duration as well as an interface for making callbacks to the MasterRecord. The Angel Host service, in turn, passes this lease duration and MasterRecord remote interface to the newly instantiated Angel. The Angel can then periodically make lease-renewal callbacks to the MasterRecord, as well as a callback to set the service ID.

```
public void launchReplacementAngel (ServiceDescription srvcDescr,
                                    ServiceRecord rec,
                                    net.jini.core.lookup.ServiceID,
                                    long initialLeaseDuration,
                                    MasterRecordRemote mr);
```

This method is very similar to the deployNewService( ) call which originally created the Guardian Angel instance. This method, however, is called whenever the MasterRecord has detected a lease expiration and is requesting the creation of a replacement Angel to take over management responsibility for the old Angel that is missing in action. The Angel Host service will instantiate a new Guardian Angel, but will activate the Angel in such a way that it knows that it is a replacement Angel and not the original Angel that launches the service. The Angel thus created will, as a first order of business, attempt to establish contact with the deployed service (using the service ID and the facilities of local Jini Lookup services), rather than launching a new service.

An alternative approach to the use of leasing is described in the following section on Buddy Angels. There is overlap in the domain of problems these two attack. But a global distributed service network is a complex structure and multiple approaches are employed in the present invention which simultaneously can be use to 'tune' the management of resources most efficiently given local circumstances.

Buddy Angel Method and System

The Buddy Angel watches only one thing, it's paired service instance. While it follows from responsible agent pattern, there's flexibility in having the Buddy Angel do special things that are unique to the needs of a given service type. Buddies are usually used where time is of the essence or when the environment is so simple (a few services only) or resource constrained such that common infrastructure approaches, like the Guardian Angel, do not warrant the overhead cost. It is used not just to insure existence of a service but also to monitor the health of a service instance: for example, whether that service instance is running out of head room and needs another instance of itself to be launched for load balancing. The Buddy Angel can be much more highly customized to service critical situations, than other Angel patterns, and do whatever is appropriate to meet the goal of the service designer.

The Buddy Angel exists as a paired representation of the service instance. The Buddy and Service are symmetric peers. They communicate very closely so they can rapidly respond with custom patterns. There are various implementation patterns but, in all, it's basically heart-beating back and forth between the buddy angel and the service. The Buddy angel and the service are built together so that each deploys the other; which means that if the service goes away the Buddy recreates the service but if the Buddy goes away the service recreates the Buddy. So you can deploy on either one of them.

The service launcher effectively launches both the Service and its Buddy at the same time or in the same transaction (ACID properties attached to deployment). The buddy is never launched in the same container as the Service (this would make them two vulnerable to loss of that container.)

In one exemplary realization, depicted in FIG. 5, Jini transaction services are used by the Phoenix life cycle manager to launch service A and buddy A together. Phoenix consults the configuration service to determine the displacement of the service and buddy.

In another exemplary realization, depicted in FIG. 6, Phoenix launches the service B which service B creates its buddy B as its first action. Service B calls the behavior service to determine in what other container the buddy should be launched.

How far away the buddy is launched depends on circumstances of risk and resource. We call this displacement. Generally the buddy is launched in another container on another host that is relatively close for fast round trip message exchange. This is likely on the same subnet or only one or a few router hops away from the service it watches. Generally, the host on which it is launched has a separate connection path to the rest of the network, so that the service and the buddy would not usually be isolated from the network (WAN) at the same time. Dual, non-adjacent network paths can also be used to connect buddies and their services and the pair to the larger network.

A Buddy can reside in a different management domain from its service. In circumstances where it is responsible indirectly for the existence of the management domain, it should reside outside that domain.

Clients of a service are unaware of the Buddy angel that is partner to that service. A Buddy may be aware (via the heart-beat packet) of all the clients attached to a service so the Id's and circumstances of these clients can be returned to a recreated service.

Figure 7:
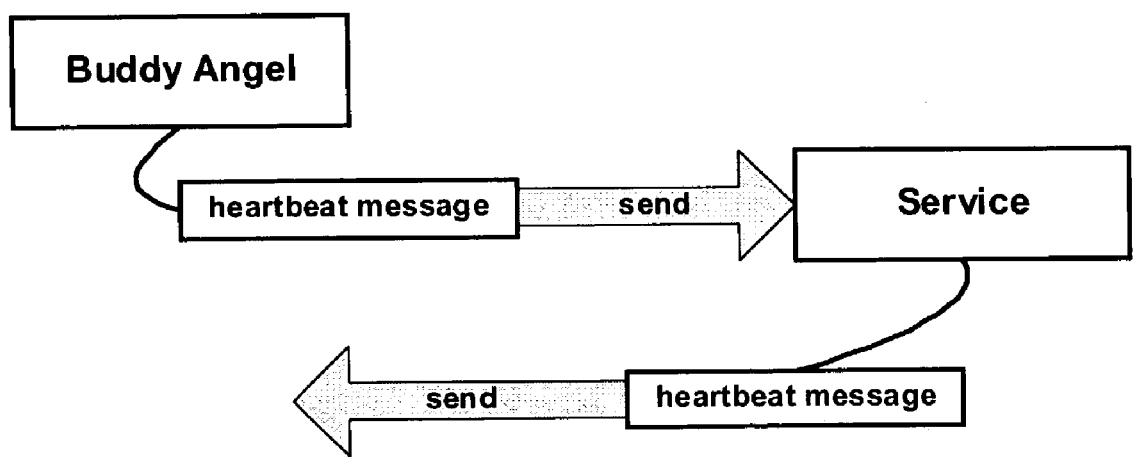
FIG. 7 depict a Service and its Buddy Angel communicating by sending heartbeat message packets back and forth in accordance with an exemplary embodiment of the present invention.

A Service and its Buddy Angel communicate by sending heartbeat message packets back and forth as depicted in FIG. 7. We say packets as short hand; from the applications perspective, generally these are remote call connections, service to service. The timing of the packets is adjustable by pair and by policy service query at launch time. Once set, the timing of heartbeats remains constant for the specific instance of the service deployment life.

The contents of the message package are adjustable for each pair. The packets minimally contain information of the identity, location, and timestamp of the source sending the packet and the ID of the last packet from the destination. Of course information necessary to reload the partner from a code server is also included. Generally the packets would also contain status information on the service so that the buddy could use that information to re-create the service at the processing point of the time of packaging of the message. This is true of the messages in either direction. However, messages should be short enough for efficient and rapid transmission.

Figure 8:
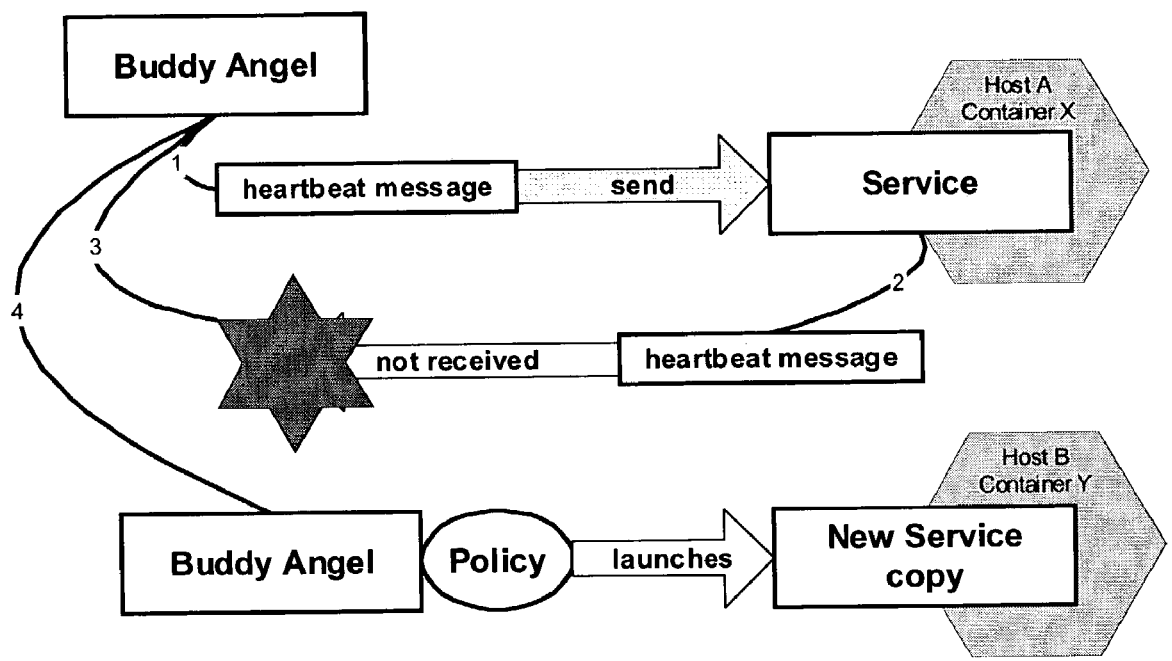
FIG. 8 depicts a process for recovery utilizing Buddy Angel service matching n accordance with an exemplary embodiment of the present invention.

If the Buddy does not receive a heartbeat from its service partner in the required time span, the Buddy will recreate the service, shown in FIG. 8. This recreation could be triggered by simple or complex environmental conditions. The angel can check for the existence and health of the container it was running in and re-launch it there, or in another container. Policy would generally contain these conditions, but an external policy service would not s be used when speed is of essence. Generally an agent would use many methods to determine the service was dead or isolated from its clients before starting a clone. When the new service is up, a kill message is sent to the old service on the odd case it might still be alive.

Figure 9:
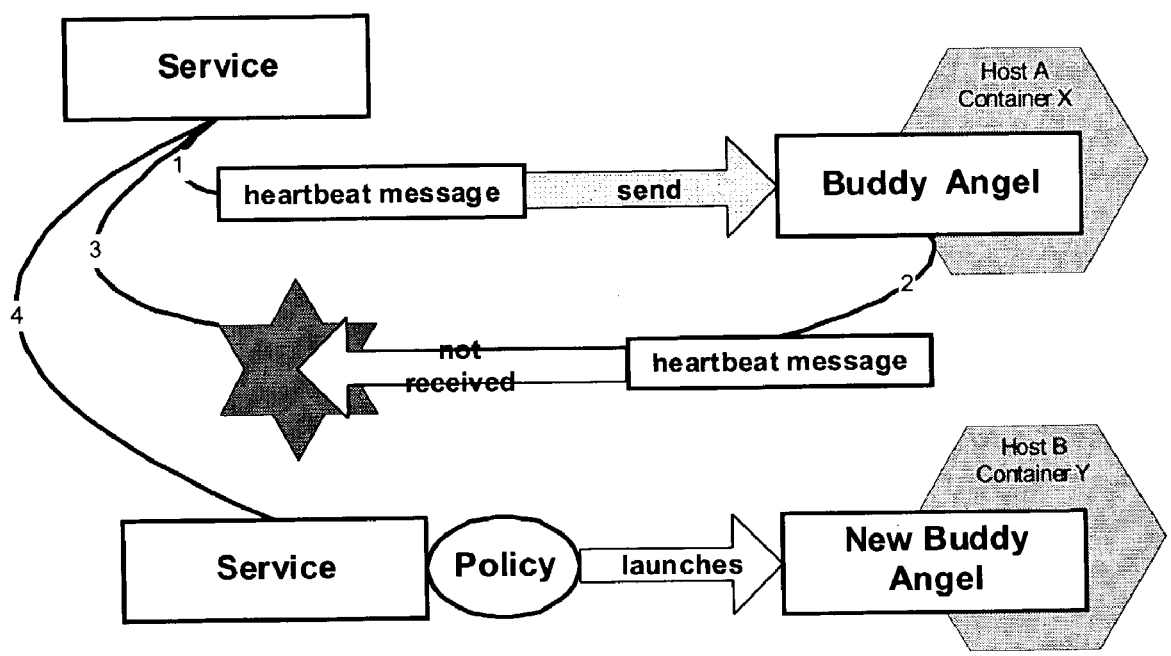
FIG. 9 shows message passing between a Buddy Angel and it's paired service and further depicting recovery in a Buddy Angel service matching in accordance with an exemplary embodiment of the present invention.

If the Service does not receive a packet from its buddy angel, it launches a new buddy. It sends a kill message to the old buddy, depicted in FIG. 9.

Figure 10:
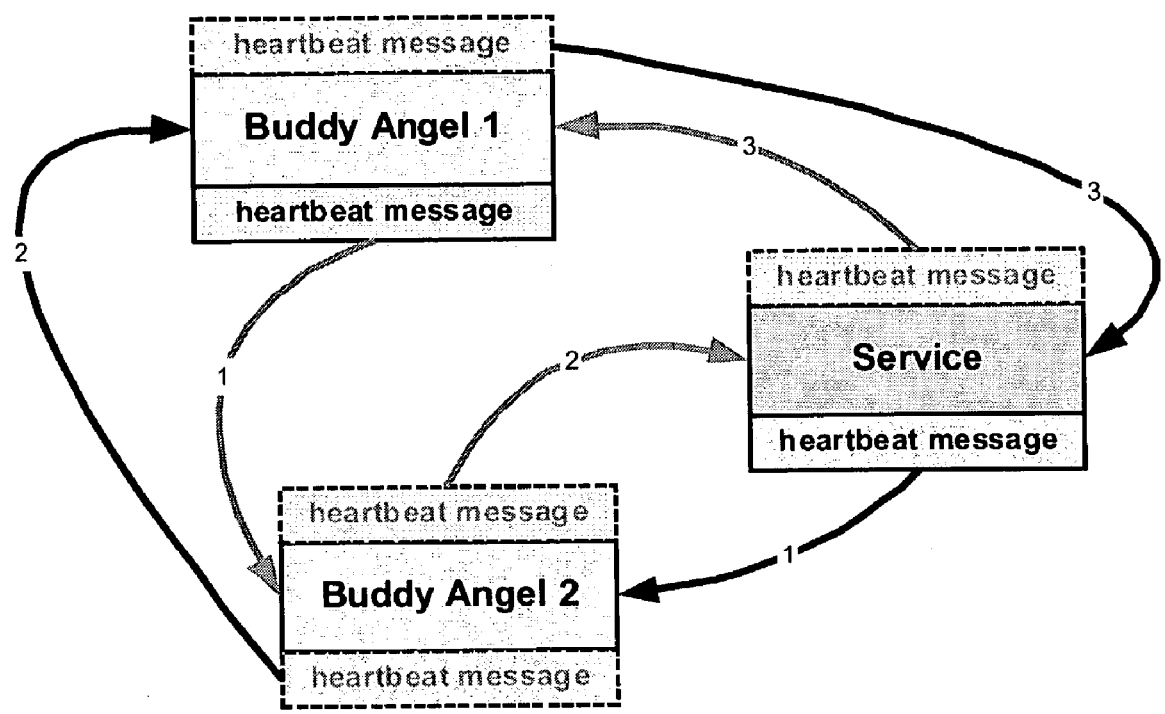
FIG. 10 is a message flow diagram showing two counter flows of messages in a multi-agent-multi service ring grouping in accordance with an exemplary embodiment of the present invention.

Under very special circumstances, a Service could be paired with more than one Buddy instance as shown in FIG. 10. The grouping would communicate by passing the messages around in a circle from one to another. The status of each would be attached to the message train and striped off when the packets comes around again and replaces with a current status. Packets would be sent to each neighbor so that two messages would always be traveling around the circle in opposite directions. This allows the break in the circle to be identified.

As in other services, the behavior of a Buddy angel can utilize Policy Services to customize its behavior and response to specific environments, times and circumstances.

The messages being exchanged are of the same general class as signaling messages. A finite state machine controls reaction to a message. The finite state machines (FSM) of the Buddy and the Service are paired, interactive state machines. These FSM contain the possible states of the partners and the message content types the partners can send. In NewWave, the FSM can be an augmented finite state machine like those found in an Aggregator; that is, the actions resulting from a stimulus event can be ECA (event, condition action) calls to a remote behavior service. One of the actions to loss of message continuity can always be the escalation of the response to a NewWave MOC/DOC. [Management Operations Center/Distributed Operations Community]

Buddy angels, just as Guardian Angels, can perform complex management tasks. For instance they can establish a monitoring link to the container in which its partner service is running. It could monitor the resources in use by the host service of the service. It can ping the network. In short it can provide a variety of actions which determine the health of the environment in which it's partner service is running and from these make predictions on the continued viability of the service. Under policy, it could move a service to a healthier environment. Generally it would move the service only when clients were not connected, or else when failure is predicted to be very soon and response time imperative. Most of the time, simple message exchange accomplishes the same thing as all of this extra watching and therefore this intensive environmental monitoring is used in special circumstances.

Phoenix is an exemplary implementation that uses a reduced buddy system where each higher domain Phoenix is a buddy angel of each of its sub domain phoenix services. Instead of a balanced peering, the buddy system is top downward. This has been shown to be highly effective when the Buddy service has access to configuration and application network information as the Phoenix service holds. It has the weakness that the top of the hierarchy has no higher watcher. This top of the responsible agent tree would usually have a peer buddy angel.

Angels can keep all types of software services alive and well. While designed to provide self-management of a highly distributed service system, these patterns and agents could be used to manage more limited environments or even single instance applications. Also while specifically aimed at software services, these could manage many types of software objects which were not specifically services. Lastly these patterns could be deployed to manage non-software resources: such as cards in a switch.

Phoenix Method and Service

Phoenix is an exemplary implementation using patterns from all types of angels in accordance with an exemplary embodiment of the present invention. Phoenix requires an off board persistent storage of the configuration information for an entire ecosystem of services. Phoenix contains a Service UT interface to the client that can alter the configuration information for it's hierarchical, federated management domain.

Phoenix monitors the lookups in the proper domains and creates all these. Obviously Phoenix needs access to the various federated Jini lookups and the enterprise lookup and have to know about their hierarchical of agents of each particular class so they communicates amongst the Archangels themselves, with other instances of their class.

Phoenix works within a specific environment of services. Specifically a topology of services, or a graph of services is organized in such a manner that very large numbers of services, running on large numbers of hosts, in a geographically distributed network can function and interoperate. The environment itself is called the hierarchical-federated management domains. [It is based on the original multi-tiered enterprise lookup from the original NewWave specification patent referenced above.] The very environment in which these Angels run is, in a very real way, created and controlled by them. Therefore the environment is next described and then the management of it via the Phoenix exemplary embodiment.

Hierarchical-Federated Management Domains Method and Generation

The NewWave architecture is built upon Jini, which defines a very fluid world of services being registered and discovered. The structure of this world is never statically known, it rather evolves over time. To deal with this fluidity, Jini is restricted to a relatively small world—in particular, the span of multi-cast messages, or multi-cast radius.

NewWave, however, is an enterprise-level environment. To make this environment work, two things at necessary:

to extend the scope of Jini outside of multi-cast radius;

to impose some structure upon this extended reach;

to provide facilities for managing services, such as starting and stopping and making sure dependent services are started together.

Placing structure on a Jini world might at first seem at odds with the Jini philosophy. However, the two are not inconsistent. Few would argue that the imposition of a Domain Name Structure on the Internet with a central authority for managing these names as having made the Internet a static environment.

A mechanism used in NewWave to provide this order out of chaos is the management domain. A management domain is simply a group of server machines, and the containers and services running on them, managed as a unit.

The purpose of a management domain is as follows:

to provide scope to the interoperability of services. Services are cognizant of the concept of management domain—which domain they run in and which domains other services may be running in.

to provide scope to the management of the services. Services can be started and stopped as a group and viewed administratively as a group.

The first purpose affects the NewWave mechanisms of service registration and discovery and the mechanism of messaging. The remaining purposes affects the administrative mechanisms, particularly the Phoenix Restart Service.

The Management Domain Method and Service

The Management Domain Structure and Domain Name

Figure 11:
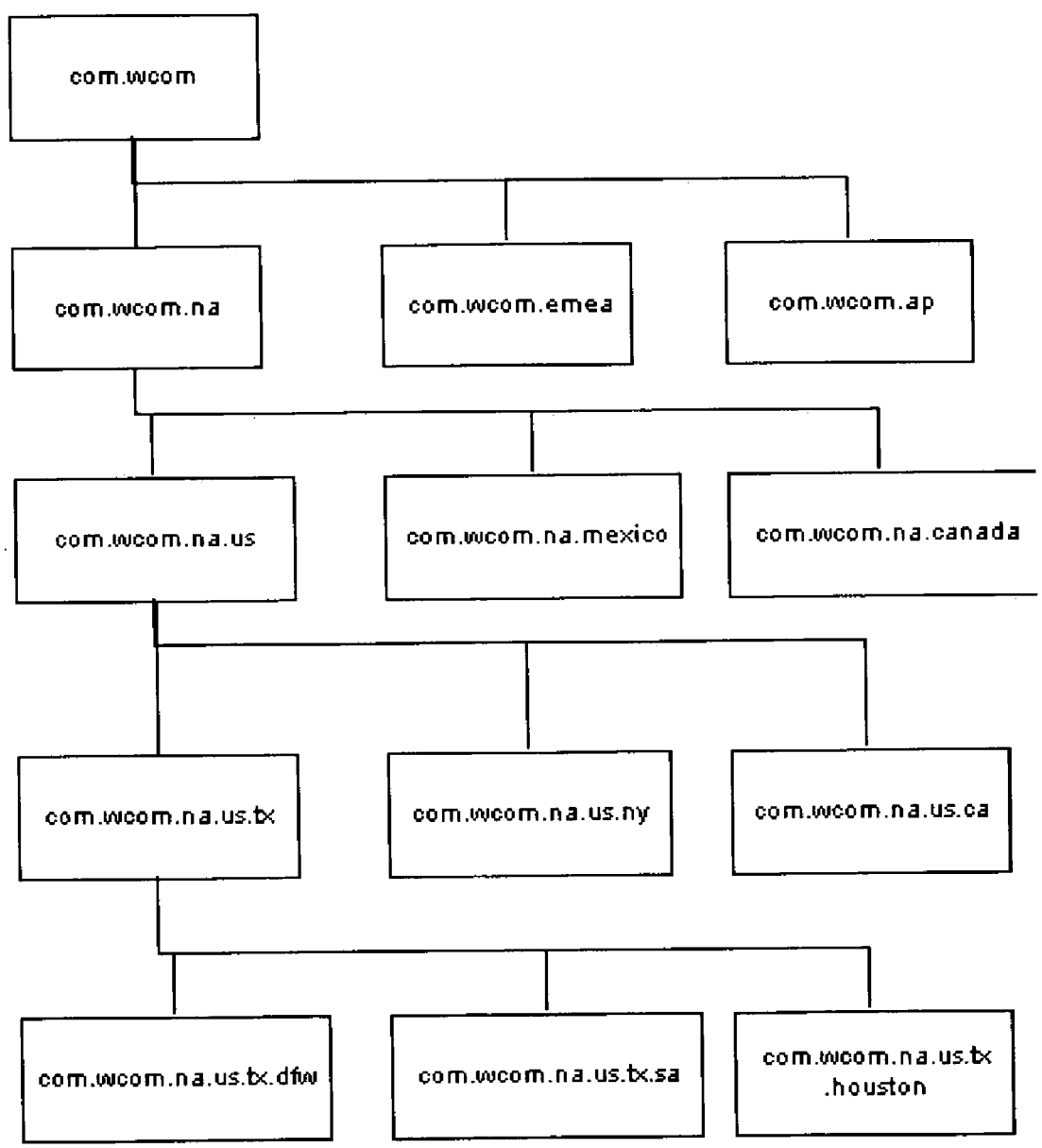
FIG. 11 is an illustration of the domains form a parent child relationship in accordance with an exemplary embodiment of the present invention.

Management domains are combined into a hierarchical structure and identified by a name which reflects that structure, similar to a DNS domain name. A management domain name consists of dot separated nodes in a reverse DNS format similar to Java package names. Example: com. wcom. na may represent the WorldCom North American management domain. The first node is considered to specify an environment so that management domains beginning with 'com' would represent production management domains and 'test' would represent test management domains. Hierarchies of management domains may be created. The management domain com. wcom. na. texas would have as its parent the management domain com. wcom. na. The domains form a parent child relationship, as depicted in FIG. 11.

Runtime Management Domain

Figure 12:
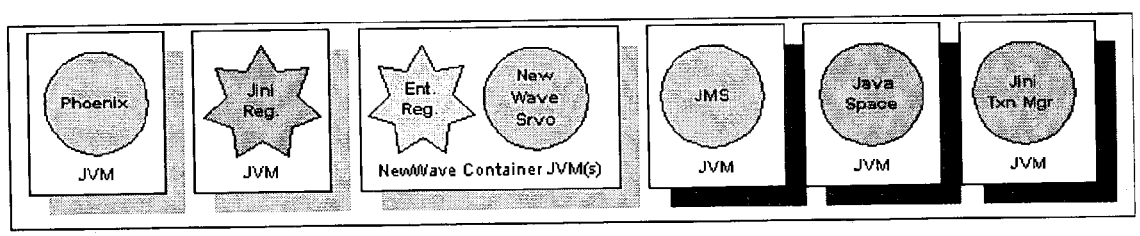
FIG. 12 is an illustration of the minimum components of a management domain in accordance with an exemplary embodiment of the present invention.

A management domain can be defined in several ways, one of them being by what runtime entities it is made of. A management domain is composed of the minimum components depicted in FIG. 12 in accordance with an exemplary embodiment of the present invention and further discussed below.

The Phoenix service is responsible for ensuring that the management domain and all of its required services are up and running.

The Jini Registrar should be included and it should have been launched with a discovery group that is equal to the management domain name. This group is a Jini feature for grouping service registrations and limiting discovery. It will receive all of the registrations for services in the management domain.

Some number of NewWave containers should also have been launched with a property indicating its management domain. Each will attempt to discover the Jini Registrar(s) within multi-cast radius for the group/management domain. All services launched in these containers will be a part of the management domain.

In general, interactions between services within the management domain use the normal Jini facilities of discovery, lookup and event notification. The EnterpriseRegistrar service should be included in the Management Domain and is used for coordinating activities that cross management domain boundaries. Each EnterpriseRegistrar knows of the EnterpriseRegistrar in its parent management domain. The current implementation limits the cross domain knowledge to the parent-child relationship; however, future enhancements could include peer-level knowledge.

The Jini Transaction Manager is an optional service for the Management Domain but it should be understood that a Transaction manager might be required for some infrastructure surfaces and is used for managing distributed transactions.

The Jini JavaSpace is also an optional service for the Management Domain but it should be understood that a JavaSpace might be required for some infrastructure surfaces and is a collaboration space for coordinating activities from different distributed components/services.

The NewWave JMS messaging service is another an optional service for the Management Domain but it should be understood that a messaging service might be required for some infrastructure surfaces and facilitates the passing of messages between services without direct connectivity between the services.

Management Domain Configuration

Administratively, management domains are described in static configurations maintained in an LDAP directory service. Each management domain is described in a domain entry. A domain entry is an LDAP directory service entry containing an XML document containing:
 the management domain name
 the name and IP addresses of server machines included in the domain
 the start properties of the Phoenix Restart Service for the domain
 the child management domains
 the deployment entries to be included in the domain.

A deployment entry is an LDAP entry containing an XML document with the following:
 Jini infrastructure service entries, such as Jini Registrar
 NewWave service container entries
 NewWave service entries describing services that should be launched in containers Service Registration and Discovery When a service is launched, it should have its management domain name in a service property. NewWave service launching mechanism will ensure that the service is only launched in a container that has the same management domain.

The service includes two lookup attributes with its registration: its management domain and its visibility. The visibility attribute describes the highest level management domain that it should be visible to. This describes what management domains will be able to find the service.

Figure 13:
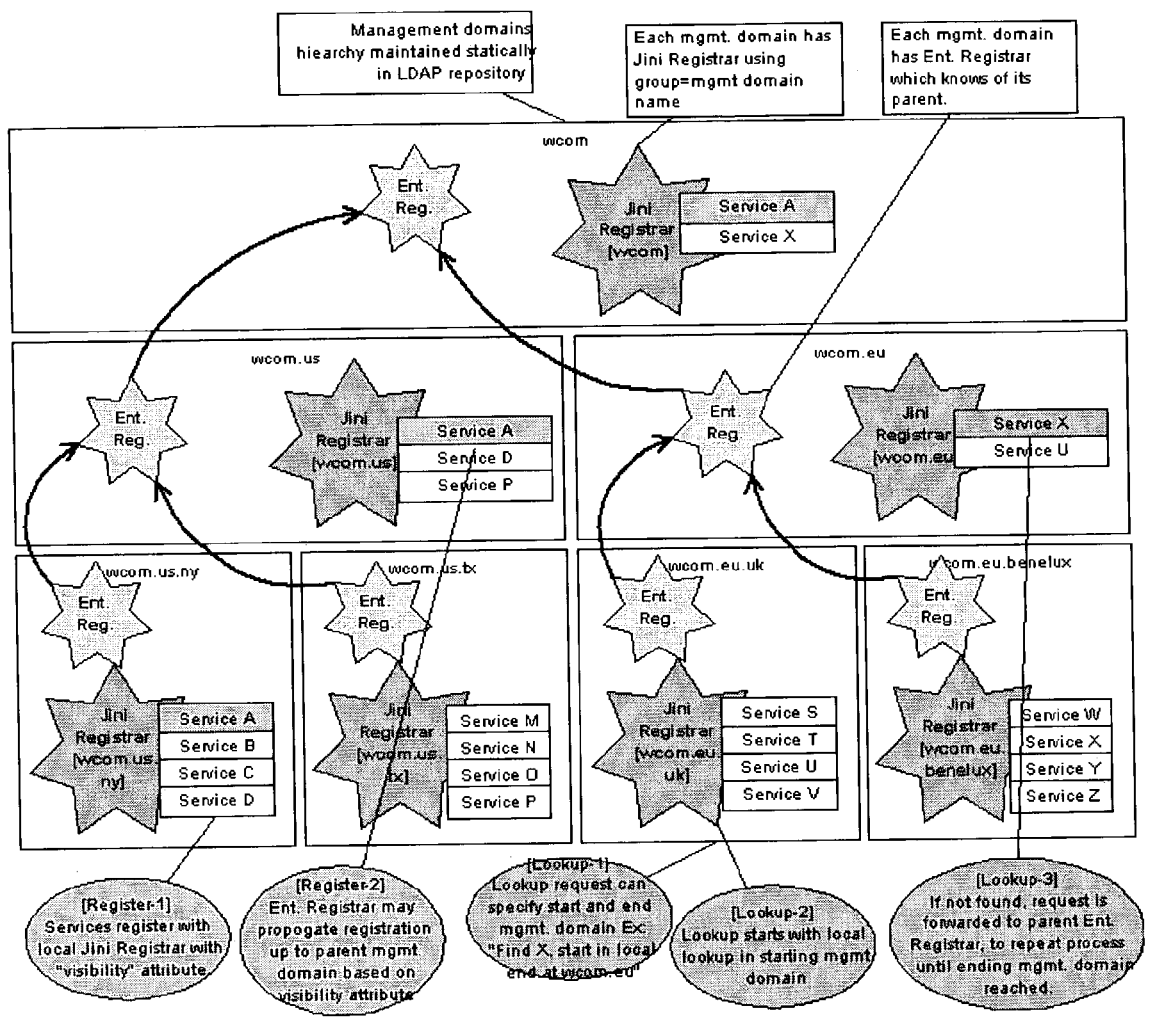
FIG. 13 depicts an Enterprise Service Registration and Lookup in accordance with an exemplary embodiment of the present invention.

When a service is registered, the local EnterpriseRegistrar will receive a notification from the Jini Registrar saying that a new service was registered. It will examine the visibility attribute in the registration. If the visibility is for a management domain higher than the current, it will instruct the newly registered service (via the Jini Join protocol) to register itself in the parent management domain's Jini Registrar. The EnterpriseRegistrar in the parent management domain will then be notified, and continue the propagation until the visibility domain is reached. FIG. 13 depicts an Enterprise Service Registration and Lookup in accordance with an exemplary embodiment of the present invention with regard to the registration of Service A in management domain wcom.us.ny and visible to the management domain wcom. Ultimately, it is registered in each of the domains wcom.us.ny, wcom.us and wcom.

To perform a lookup of a service that may be running in a different management domain, the caller can provide a scope to the lookup request. This tells the lookup whether to propagate the lookup request up the management domain structure if the service is not found in the local management domain. The scope of the request includes the management domain to start from and the management domain to end in. The figure above also shows this lookup capability. A lookup for Service X is requested from the management domain wcom.eu.uk. Service X is running in the management domain wcom.eu.benelux but its visibility is up to wcom.eu. It is not found locally, so the request is forwarded to the EnterpriseRegistrar, which forwards it up to the EnterpriseRegistrar in wcom.eu where it is found.

The current implementation requires registrations to be propagated up. If there are many services with enterprise-level (top domain) visibility, then that management domain's Registrar will become a bottleneck. Two other implementations were considered, and could be implemented at some time to resolve this problem.

- do not propagate the registration; when propagating the lookup request, start at the end domain (highest level is lookup scope). At each non-terminal management domain, broadcast the request to all children.
- do not propagate the registration up; when propagating the lookup request, start from the local and move up to the parent. Parent both broadcasts down to children and propagates up to parent. Some logic is needed to not repeat the lookup request in management domains that have already been visited.

Messaging and Management Domains

The Messaging Service used by NewWave is based on JMS. A key problem is how to get messages from one management domain to the next without sending messages around needlessly. Most commercial grade JMS implementations have some solution for this, so one approach is use the provider's mechanisms. This would be the best and most efficient way if the provider had a good solution.

The current NewWave JMS implementation is OpenJMS, which does not support clustering and federation of JMS servers. To deal with this problem, support for management domains was added in helper classes used for interacting with the messaging service. The classes, ChannelProfile and Channel, provide a simple mechanism for dealing with JMS.

A ChannelProfile describes the queue being listened on/sent to or the topic being subscribed for/published to. It includes the management domain. A Channel is created from the ChannelProfile and it encapsulates the many JMS interfaces needed to interact with JMS. If a management domain is specified an it is not the current, it looks for a JMS messaging service in the specified management domain. Behind the scenes, messages will be sent to and from the other management domain.

To make effective use of this, the concept of management domain should enter into normal processing. For instance, when trying to diagnose a problem with a virtual circuit whose endpoints are in different management domains, subscriptions might be issued to listen for events from each endpoint. Each subscription would be for a different JMS implementation, one in each management domain.

Management of a Management Domain

The Phoenix Restart Service is responsible for keeping a management domain up and running. It is capable of starting up any of the runtime elements of a domain specified in the management domain configuration. In fact, Phoenix is capable of raising a management domain from the ashes, as it were, with nothing running but Phoenix itself.

Phoenix-to-Phoenix Handshake

There should be only one Phoenix running in a management domain at a time. Otherwise, each will be trying to restart the same services. When a Phoenix service comes up, it should ensure that there are no other Phoenix services. Further, it should be able to do this without the use of the Jini Registrar. To accomplish this, Phoenix uses multi-cast announcements. Multiple Phoenix instances discover each other in this way. The earliest Phoenix wins, and the later one(s) shut down.

One alternate approach would be for the later Phoenix to not shutdown, but to stay alive but inactive and monitoring the multi-cast announcements, becoming active if the other Phoenix died. This, however, has some drawbacks, as the parent domain Phoenix is monitoring the situation already. This would be an approach to take to reduce dependency on outer domains and might be useful for the top level domain.

Monitoring a Management Domain

Phoenix is responsible for monitoring a management domain to see if all services in all deployments for the domain are running. Phoenix takes three types of activities for all services:

discovery of the service ping the service restart the service

For most services, discovery is performed by registering for transition events with the local Jini Registrar. Phoenix gets a notification whenever a service is registered, is removed from the registrar or has its registration modified. The Jini Registrar itself is special. To find the Jini Registrar, Phoenix uses the Jini discovery protocol. Service containers are themselves simple services (from the perspective of the Jini Registrar), as are the Jini TransactionManager, JavaSpace and JMS, so for this purpose are treated no differently from any other service.

When a service registration is removed, Phoenix attempts to ping the service to see if it is still up. Sometimes, the registration lease expires even though the service is still up. The service will ultimately correct the situation, so Phoenix should not try to restart the service.

If the ping fails, Phoenix restarts the service.

Starting a Service

When starting a service from scratch (that is, it was never discovered) Phoenix uses the services properties from LDAP. It combines the properties from the service configuration with those of the deployment entry. Phoenix uses normal NewWave facilities for launching a service in a container.

Figure 14:
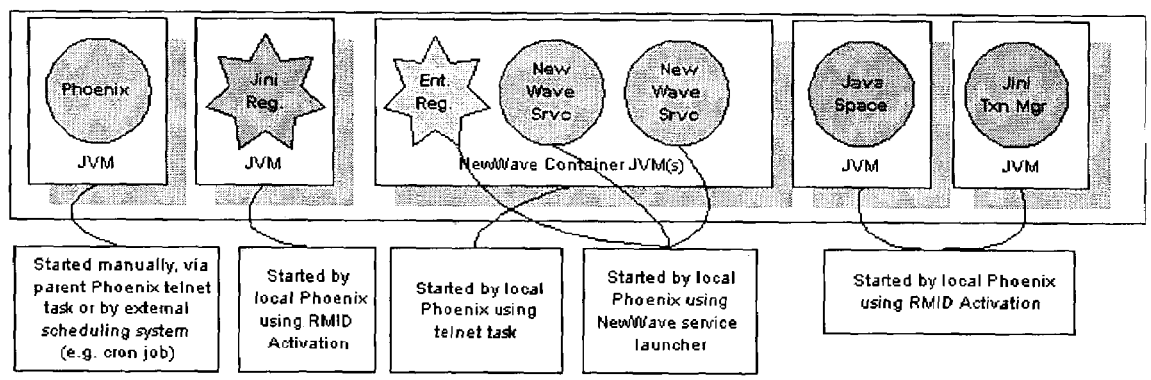
FIG. 14 depicts a Management Domain restart process in accordance with an exemplary embodiment of the present invention.

When restarting a service that had previously been discovered, the properties that were used to start the service originally are used. FIG. 14 depicts a Management Domain restart process in accordance with an exemplary embodiment of the present invention.

Starting a Jini Registrar, Jini Transaction Manager, JavaSpace, container or another Phoenix follows a different approach. These are not services launched in a container. Launching a service into a container requires no specific knowledge of the server machine on which it will run. The container is found through the Jini Registrar. However, launching outside of a container does require some knowledge of which machine is to be used. The Jini Registrar, Transaction Manager and JavaSpace are launched on the same machine as the Phoenix. Containers are launched on specific server machines by IP address. Phoenix telnets into the specific machine and executes a script for launching the container.

Monitoring a Child Management Domain

Phoenix should monitor to see if a management domain's children domains are up. In this case, up is defined as having an active Phoenix. If the child domain has an active Phoenix, that Phoenix is responsible for ensuring that the domain itself is completely up.

To determine if a Phoenix is active, the parent Phoenix performs a task which telnets into a server machine in the child domain (based on the LDAP configuration). The task then performs a discovery for the Jini Registrar, then does a lookup for the child Phoenix. If the Phoenix cannot be found, a new one is started.

The careful reader will note a flaw in this mechanism. What if the child Phoenix is up but has not yet started the Jini Registrar? The parent Phoenix will start a new Phoenix and there will be two. This is where the multi-cast handshake between Phoenix services comes into play, to ensure that only one of them stays up

Cold Boot

To completely boot the entire management domain structure with all services running, the following is all that needs to be done:
1. the web server acting as the infrastructure code server should be running. Phoenix does not try to restart the web server and cannot run without being able to load its code.
2. the LDAP directory service should be running. Phoenix does not know what services and domains to start without the directory service. It is conceivable and relatively straightforward enhancement to update Phoenix to be able to start the directory service via telnet.
3. start the Phoenix for the top-level domain. This Phoenix, in addition to starting all of the services need for its domain, will start Phoenixes for of its child domains. Each of these will do the same until all domains are started. The top level domain Phoenix can also be started from the Configuration Browser tool.

Runtime Administration

The Phoenix service presents an administrative service UI for the administration of management domains. From this UI, the user can start and stop the deployments in the management domain, as well as add and remove deployments. As stated earlier, a deployment is a logical grouping of services. A management domain may contain many such deployments. This allows groups of services within the management domain to be selectively started and stopped.

In addition, the UI allows the user to add and remove child domains and show the status of the child domains.

The UI also shows the status of the deployments, whether stopped or started, and if started whether all services are up. For each service in a deployment the UI shows the status of that service: up, down, attempting ping, or attempting restart.

New Wave Security in Kerberos Environment

Information Background

In order to successfully deploy NewWave based applications network host environments where Kerberos is the only network authentication protocol in production, security features of the Phoenix embodiment, acting on a Federated-hierarchical management domain, are altered as follows. Apart from authentication, authorization and cryptography, there is a very specific issue to tackle, i.e., the method of remotely launching up, in the first place, those processes on which other services rely, such as Phoenix, JINI Registrar, Transaction Manager, containers, etc.

Approaches:

Authentication

Whenever a human-machine interaction happens, no matter it is through a command-line interface or GUf, the user needs to be first authenticated by JAAS (Java Authentication and Authorization Service) Kerberos implementation.

User Authorization

Term user authorizatiion is used in here because it is different from the concept defined in JAAS, where authorization is described as granting certain system resource privileges to the application. Authorization is carried out by setting up Java policy files properly, and User Authorization by locally or remotely consulting an access control file containing a list of kerberos user principals.

Encryption

By Java GSS-API (Generic Security Service) Kerberos implementation or by RMI/SSL.

Launcher

Launcher is a Java RMI program that gets started via boot script.
The boot script runs without authentication, so there is no need to create Kerberos service principal for the Launcher.
The Launcher is installed on each productionized New-Wave application box.
If there is a need to manually start a Launcher locally, authentication and user authorization applies.
The API of the Launcher allows caller to specify and the name and the location in the file system of a shell script to be started.
The Launcher does a fork/exec to start the shell script.
The shell script serves as a wrapper of the real executable to be launched, such as a JVM, so that its life span is independent of the life span of the Launcher.

Benefits

User is always authenticated locally, without passing around user credential over the network.
There is no need to handle any user credential on New-Wave side because only the Kerberos environment does that.
There is no constraint of associating the NewWave application with a Kerberos service principal, which adds a lot more management work in the Kerberos environment.
Angels can keep all types of software services alive and well. While designed to provide self-management of a highly distributed service system, these patterns and agents could be used to manage more limited environments or even single instance applications. Also while specifically aimed at software services, these could manage many types of software objects which were not specifically services. Lastly these patterns could be deployed to manage non-software resources: such as cards in a switch.

Angels are used in the global network that utilizes the NewWave Management Network for some OSS functions. The following sections describe another specific environment where use of the angel pattern to manage resources is especially useful. This is the network where the concepts and technology of NewWave have been put to use to manage resource life cycle in a commercial, service hosting network product. Specific extensions, refinements, and restrictions of NewWave (as per prior patent filings), sufficient to describe, build, and operate this type of network are given below.

Service Hosting Venture

The next several sections describe the business reasons for a service hosting network product. Many of the concepts of the dSHIP service hosting invention are described in this proposal. Further details and refinements follow in the sections headed "Method and System for Providing a Distributed Service Hosting Infrastructure Platform (dSHIP)".

We propose a venture to bring hosted Jini network services to the scope of the public Internet. The telecom would supply the service-hosting platform and facilities which would enable tomorrow's Generation-D entrepreneurs to frictionlessly deploy the network services they invent onto compute-nodes at the edge of the Telco's core network. Publicly-accessible, global directory services would afford visibility to any hosted service from any Java-capable device or software process with Internet access, given proper authorization. Simple APIs, leveraging the power of code-mobility, would allow service suppliers to home their services, at will, onto waiting farms of available CPUs, lowering barriers-to-entry, reducing time-to-market, and easing the challenge of scaling up to meet growth. Unlike many Internet ventures that scarcely consider how revenues are to be reaped, we plan to place the service platform onto a sound economic footing by accommodating real-time (micro) revenue flow in the very core of the proposed network service model. The power and flexibility of the Jini service architecture allows a broad spectrum of network-based compute and communications capabilities to be framed as, or built from, Jini services—everything from primitive, communications-oriented, horizontal micro-services all the way up to high-level, vertical applications. Initial target markets for this disruptive technology would concentrate upon small, emerging sectors at the fringes, rather than large, mainstream corporate customers whose inertia resists adoption of breakaway approaches. But as the future telecom landscape evolves—with IP and Java becoming ubiquitous, bandwidth becoming abundant, core networks tending toward fatter, dumber, all-optical pipes, and network intelligence migrating to general-purpose compute nodes at the network edge—the Jini service architecture could potentially emerge as the embodiment of virtually all network intelligence. We speculate upon the conceivable emergence of a greatly simplified and elegant future network that is practically nothing but Jini services and IP over lambdas (optical transport).

A network services architecture based upon Jini technology may also tend to blur the distinction between carrier OSS functions and software services offered for sale to customers. Services supporting the OSS function and services offered for sale may ride on the same uniform infrastructure platform. In fact some of the OSS microservices could be made available for usage based sale.

Information Summary:

This is a new venture and product offering, roughly falling in the areas of application hosting and micro-services, but differing substantially from current ASP and managed service provider models. This document proposes that the telco/network service provider offer a Java/Jini technology-based platform for hosting future network-based software services. Such services might come primarily from the entrepreneurial community, but would also include select core services supplied by the telco/network service provider. Regardless of who supplies a service, any process or device with a connection to the public Internet would be able to look up the service and exercise the service's interface.

The following facets are central to the proposed venture:
A network service platform, based upon Jini network service technology and augmenting current Jini capabilities;
Facilities (including large farms of CPUs distributed around the world in hosting centers at the edge of The telco/network service provider's core network) onto which Jini services may be deployed;
services running on this distributed platform include both core services supplied by The telco/network service provider and services of any sort whatsoever coming from third-parties . . . all ride on the same, uniform infrastructure;
bringing new services into live deployment on the network is frictionless, requiring only calls to APIs, NOT phone calls to support personnel;
a scalable directory infrastructure with global visibility on the public Internet permits any Java-enabled process or device with a connection to the Internet to locate any service and exercise its interface; and
A micro-payment-transfer core service that allows frictionless revenue flow in real-time among the service consumers, service suppliers, and platform provider, placing the entire network service concept onto a sound, pay-as-you-go, economic basis.

Sun Microsystems' Jini is arguably the most advanced, powerful network service architecture available to date. The Jini architecture derives much of its power from over-the-wire code mobility. Moving code, at runtime, out to client processes allows a Jini service interface to encapsulate anything that can be done in Java code. Exercising a Jini interface might produce arbitrary computations local to the client process, or result in interactions with one or several remote processes anywhere on the Internet using any protocol or middleware. This power to hide anything behind an interface gives Jini services a certain universality, allowing Jini to become a sort of enabling network DNA. Any functionality on the network, from the most primitive communications-oriented service (e.g., an SVC based on MPLS or a WDM switched circuit) all the way up to high-level vertical application services (e.g., an electronic commodities trading exchange or ECN) could, in principle, be framed as a Jini network service. Because of this fundamental power at the heart of Jini, the provider of a network services platform, who bases their offering on Jini, stands to gain technical advantages over competitors (such as HP or IBM) who offer a service platform that does not embrace Jini.

All of this power of Jini does, however, come at a price: the entry fee for a client system to participate seamlessly in this microcosm of Jini services is the requirement that the process or device be Java-enabled. The proposed venture takes a tack that is just the opposite of technology neutrality. But given the inroads that Java is making, for example, into the wireless device arena, this bet is by no means a long-shot. [See, for example, the Gartner strategy/trends report, "Will Mobile Java Kill WAP?", by Nick Jones, Aug. 31, 2000.]

One of the central value propositions of this venture is to lower the barriers of entry and reduce the time-to-market for creative entrepreneurial talent out there who come up with ideas for future network services. While the telco/network service provider should certainly endeavor to offer a rich portfolio of useful core services, it is clear that there are limits to how many useful services we can realistically build and offer on our own, especially in the area of specialized, vertical services. In contrast, the range of services that might be implemented by outside entrepreneurs is essentially unbounded. By offering the enabling platform, the telco/network service provider may tap into a depth of creative vitality out there, for example in universities, and help to bring to market an array of services that we could not possibly bring forth on our own.

The proposed service-hosting scheme may help forestall an emerging industry trend toward a peer-to-peer computing model—a trend that threatens to cut providers of network-based software services out of the loop. Currently, it is very easy for two kids in the proverbial garage, with little more than a PC, an idea, and the spare time to implement it, to bring a peer-to-peer application to market. The barriers to entry involved in getting new network-based services deployed to Network edge hosting facilities are significantly greater in the current landscape. One goal of the proposed scheme is to level this playing field and allow deployment of new service concepts onto the network to happen in Internet time.

In the proposed service-hosting scheme, thousands of rack-mounted CPUs, such as Netras or Compact PCI units, are deployed within POPs or hosting facilities around the world. (Hosts are installed pre-configured with a complement of basic services, like relational databases, fast in-memory databases, directory services, communications middleware, event buses, Jini infrastructure, etc.

At the heart of the proposed scheme is the concept of a generic service container—a CPU process into which arbitrary software services may be homed at runtime. Every CPU in our entire hosting complex would run one to several of these service containers. Programming interfaces allow runtime launching, under administrative control, of any service out to any awaiting container process within our facilities. Code that implements the deployed service is fetched at runtime, by its URL address, from ordinary web servers which play the role of dedicated code dispensers.

Another essential ingredient in the proposed service-hosting concept is the notion of a sort of yellow-pages directory that categorizes offered services into logical subject areas. This directory scheme allows client applications (and other services) anywhere on the Internet to (conceptually) move into a subject area, then look up and fetch interfaces to relevant Jini services in that area. This directory of services would be hierarchical in nature, similar to the tree structure of UseNet discussion group subject areas (e.g. arts.architecture.townplanning.collaborative). This would be similar to HP E-Speak's approach to organizing services into a hierarchy of topic areas. While Sun's Jini Lookup service is currently oriented toward the locating of services on a local network, Sun has provided the hooks required to integrate Jini Lookup with global directory services. The WorldCom NewWave pilot projects have already demonstrated the feasibility of extending the visibility of Jini services to enterprise-wide scope through such an integration.

Thus, as a simplification, a grand Connection Machine with many thousands of CPUs at each of several hosting center hubs, all interconnected by a backplane which is the Telco/network service provider network is described. Under programmatic calls to simple interfaces, any software service that one can invent and implement in Java code may be loaded into and executed on any host CPU out there in this massive complex. When we refer to frictionless service deployment, we are speaking of this ability to effortlessly home services in real-time out to arbitrary nodes through function calls to APIs, NOT phone calls to support personnel. Global directory services coupled with Jini Lookup services allow any Java-enabled client process or device with Internet access to locate and call upon any such deployed Jini service.

Many ingenious "e" concepts have failed, not for lack of clientele, but for lack of a means of harvesting revenues, other than banner ads. Such mistakes of the past should not be repeated. A central tenet of this proposed venture is that revenue flow should not be an afterthought, but rather should be built into the very core of the architecture. To realize this goal, one of the primary, core services offered from the outset would be a real-time, funds-transfer service, working down to micro denominations, which any service supplier could incorporate as part of their APIs. We don't dictate how or whether the third-party service supplier uses this funds-transfer service. The point to be understood is that it is available for any service to use in order to allow the supplier to extract payment in return for use of their service. The telco/network service provider supplies the interfaces and protocols to allow any participant to securely move monetary units from their account to any service supplier's account. The telco/network service provider, in turn, uses the same mechanism to collect payments from the service suppliers who lease our hosting resources. Beyond charging for the resources we rent out, The telco/network service provider does not dictate any specific pricing plan for services on tap that are coming from third parties. Customers (the service suppliers) are free to explore any models they desire, whether those be flat-pricing, pay-as-you-go usage-based, bidding, or whatever.

The revenue flow scheme has the potential of growing into a quite rich sort of market in silicon, with complex monetary flows amongst all participants. One of the implications of this dynamic monetary flow aspect of this venture is that playing within this microcosm of Jini services will generally mean abandoning notions of anonymity that prevail on the Internet at large. Participants in the usage and offering of network services all need identities and accounts for money to flow in and out of. We should also note that this accommodation of real-time, fine-grained revenue flow does not mandate that such a model should extend all the way out to end-user applications. Consumers often are made nervous by a ticking meter. End-applications can expose more conventional billing methods out to end-consumers, should they so desire, and not directly expose the consumer to a ticking meter.

The Jini service hosting platform that we propose can play a role which is complementary to the role of the present World Wide Web. The current web focuses mainly upon person-to-system interactions (of course all mediated by computers), such as allowing the user to browse a corporate site's brochure-ware, or to purchase a product online. Other Internet applications, like instant messaging and chat, focus upon person-to-person interactions. In contrast, the Jini architecture focuses upon system-to-system (S2S) interaction. S2S interaction across the Internet is an area of network computing that is likely to see strong growth, for example, to support business-to-business processes. This places the proposed venture squarely in the middle of what will likely be a hot growth sector.

Most web usage currently follows a fairly simple straight-line interaction from the human user to a corporate silo.

Enterprise backend systems may involve many system-to-system interactions, and represent a prime candidate area where corporations could use our Jini service component model to build such backend applications, and host them on our facilities.

However, the proposed service platform has the potential to grow in very different, novel directions beyond this role of building out enterprise backend systems. Consider as a hypothetical example the recently introduced GrooveNetworks collaborative application. This is a desktop PC application that permits coworkers anywhere on the Internet to share a virtual workspace for real-time collaboration. Despite its largely peer-to-peer conceptual nature, it in fact relies upon a buffering and synchronization service hosted on the network to coordinate changes to a group's shared image, assuring that intermittently-connected participants' workspaces stay in-sync. This buffering/syncing service is a prime example of a hosted network service that could be implemented using the Jim service-hosting platform described in this proposal, should some entrepreneur out there wish to build a lava-centric product to compete with GrooveNetworks. In this example, a person-to-person application is employing, under the covers, system-to-system interactions with a network service to fulfill its mission.

While the end-user is not directly manipulating Jini services (though that is certainly possible), the application that they are using is interacting with a Jini service out there on the network.

Another long-term outcome of the proposed Jini service-hosting platform is that it could help future distributed computing applications to overcome the unavoidable communications latencies due to the finite speed of light. While technical innovation appears capable of supplying an ever increasing abundance of bandwidth, latency is something we're stuck with. The only way to reduce communications latency is to bring the communicating processes into physical proximity. The dynamic service deployment scheme advocated in this proposal, plus refinements like the support of mobile agents discussed later in this document, offer a means for future demanding applications to easily bring their communicating components into physical proximity in order to conquer latency. The following figure depicts the concept of bringing communicating agents into proximity by dispatching them to a neutral ground located on the Telco/network service provider hosting facilities.

What are Jini Services?:

The central premise of the proposed venture is that the telco/network service provider offer a platform that brings Jini network services to the scope of the Public Internet. In order to understand exactly what this means, and to make any sense of this proposal, it is necessary for the reader to have a basic knowledge of what Jini technology is all about, and how it is different from other distributed computing technologies. We also need to dispel some wide-spread myths and misunderstandings regarding where Jini is and is not applicable.

For the benefit of readers who are new to Jini, a brief introduction to Jini is presented.

The following is a brief list of some of the key points to note regarding Jini networking technology:
  Jini enables network-based services that hide difference between hardware and software
  Jini architectural model is simple and elegant
  All Jini services are defined by a Java interface. The interface is all that the service consumer knows
  Jini is a Java-centric model for distributed computation
  Service lookup is based upon type and attributes, not simply a common name
  Registration means depositing a service object (not just a reference or address) within a lookup server process
  Looking up a service means fetching the service code
  Nothing is forever: resource-allocation is time-limited, using a leasing model
  Jini helps one to build spontaneous, self-healing, adaptive distributed systems
  The world of distributed computing is a world where failures are inevitable, including partial failures. The Jini Transaction Manager service can supply an effective, light-weight approach to dealing with distributed transaction coordination, without the heavy, monolithic character of traditional TP monitors.
  Jini services can hide diverse communications protocols and middleware . . . anything can be presented as a Jini service
  Runtime, dynamic loading of Jini service code over the wire to clients allows Jini services to do anything that can be done in Java code
  There is a widespread mistaken belief that Jini is only relevant to plug-and-play of devices (like printers and handhelds) on a local area network. Jini is much more than just a technique for fetching device drivers
  Jini can form the basis of enterprise-wide and global Internet-wide distributed computing
  Jini's ability to hide any code, protocol or middleware behind a curtain makes it an ideal legacy integration technology
  Basic Jini service lookup is, in typical applications, proximity-based, scoped to physically local networks. However, the hooks are there to extend Jini service visibility to the enterprise and the public Internet.

Bringing the Power of Jini Services to the Public Internet:

To date, most applications of Jini technology have centered around the formation of communities of producers and consumers of services that have physical proximity to one another. Jini uses multi-cast packets to allow service provider processes and consumer processes to spontaneously discover Lookup servers within multi-cast radius, thus bootstrapping the process of registering and finding services. Joining a community of Jini services often literally entails connecting a device to a LAN cable or bringing a wireless device into range of a wireless local network.

While this concept of spontaneous discovery of physically-nearby services is very powerful and applicable to a wide range of consumer and business applications, physical proximity is not a universally appropriate model. Indeed, a central notion of the emerging cyberspace is that the Net breaks down traditional notions and limitations of physical proximity. For many applications, one desires location-transparency. One wishes to find and offer services within a logical space, not a physical one. (For example, consider an m-commerce application that displays information on nearby restaurants on one's PDA. This is based upon physical proximity. I may, however, be on my way from Washington to Baltimore, and more interested in restaurants where I'm going than ones where I am.)

Bringing Jini services to the scope of the Public Internet thus involves replacing the notion of entering a physical space and connecting to a LAN, and substituting the notion of (conceptually) navigating to a logical space then looking up the services that are local to that logical space. In terms of implementation, what this implies is that we need to create a marriage between global, public directory services and Jini service Lookup. A hierarchical directory service (such as LDAP-based directories) provides the appropriate model. Such directories allow the creation of a hierarchical topic-space. Navigating down the topic tree is how one conceptually moves into a logical space. This tree navigation is analogous to the act of joining a Jini community by physically walking into a building and connecting via a wireless LAN.

Within any specific topic (e.g. /hobbies/gardening/organic), one could store the URL of one or more Jini Lookup services in which services relevant to the topic are registered. A client seeking to find Jini services relevant to the topic "/hobbies/gardening/organic" would make API calls to the public directory to navigate to that topic and fetch the URL of one of the Jini Lookup servers local to that topic. (The actual physical location of the Lookup server might be anywhere.) The client application could then connect directly to that Jini Lookup service and proceed to look up available services scoped to that topic area.

This notion of scoping Jini services to hierarchical topics is somewhat reminiscent of USENET discussion groups on the Internet, which fall into a hierarchical categorization. One conceptually navigates to a desired node in the topic tree (e.g. comp.lang.cobol.advocacy) then makes use of the services available in that space. In the case of USENET, the services available in any domain are pretty limited, only allowing one to read and post comments to the discussion thread. In the present scheme that we are proposing, the possible services that are bound to any topic area are essentially limitless.

The two-step process of first finding Jini Lookup using a directory, then using the Jini Lookup to find the service, is straightforward. A somewhat similar approach has already been used successfully in an enterprise computing context by the Telco/network service provider NewWave OSS pilot project. (The two-stage lookup is quite analogous to finding a file on a PC by first going to the right directory using "cd" command, then locating the desired file using "dir" or "ls".)

The integration of directory services with Jini Lookup is key to the proposed venture. An API to the directory would allow . . .
1. topics to be added to the hierarchical space
2. a new Jini Lookup service (actually its URL) to be added to a topic node in the tree (the act of binding a Lookup service to a logical domain)
3. Jini services that come online to find all the Jini Lookup services bound to some topic in order that the service might register itself in all the discovered Jini Lookup services, as well as to renew the leases periodically
4. service consumers to find one of the Lookup services bound to a topic in order that they may look up desired services A callback mechanism is also required in order to notify services scoped to a specific area whenever a new Jini Lookup service becomes bound to that topic. There also needs to be a leasing mechanism in place that allows the Jini Lookup Services (or their agents) to periodically renew their binding to a directory topic area. Consistent with Jini leasing philosophy, should a Lookup Service or its CPU crash, no stale garbage information should remain for long within the directory data stores.

The main challenge here is to create and deploy a scalable directory infrastructure visible across the public Internet. One decision that would be required is whether to base the implementation on, say, commercial LDAP servers like iPlanet, or build it ourselves. This decision would largely factor in the scalability of commercial directory products, as well as their cost. Should this Jini Internet service architecture take off in the marketplace, hit rates to the directory could grow to enormous volumes. Scaling becomes critical. Massive replication would evidently be required, as well as perhaps partitioning of different subtrees into separate stores.

Technical Note on Scaling: One approach to the client-to-directory interface would be to tunnel all directory requests over http, and service those directory requests using Servlets. This would allow us to leverage the scalability of commercial app servers. A multi-stage fan out of requests could use DNS address-cycling, followed by several proxy servers on different IP addresses, each proxy server feeding requests into several app servers. Multiple URLs for different regions of the world could further load-balance the directory hits. Another concept that I'm toying with is to implement the replicated directory storage using an in-memory, replicated database, such as that from the vendor "Kx".

Throughout this document, we emphasize that the directory infrastructure expands the visibility of Jini services to the scope of the public Internet. However, this does not imply that we will not use private networks in the mix. We will, on the contrary, probably wish to eventually run traffic amongst the compute nodes spanning different hosting centers over a private network. In effect, the back-plane interconnecting the distributed compute-nodes with each other could be a private network. With proper network design, services on our hosting infrastructure could be accessible from clients on the public Internet, but communicate with each other via private networks.

Summarizing this section, marriage of Jini Lookup services to a global, scalable, publicly-visible directory infrastructure is central to the scheme proposed in this document for bringing Jini services to the worldwide public Internet. This integration is straightforward, in principle. But scaling the directory to accommodate conceivable access volumes could be a challenge.

Note from the discussion so far, we have not pinned down the exact location of the Jini Lookup services that are bound into the directory, or the location of the Jini services that register themselves in the Jini Lookups. In principle, they could be located anywhere on the Internet: in the telco/network service provider hosting facilities, in corporate computing centers, even on a PC in someone's house with an always-on DSL connection. The main thrust of this proposal is that both Jini Lookup services and deployed Jini services are hosted within the Telco/network service provider facilities. We should, however, bear in mind that we may wish to eventually support these other deployment options to cater to the needs of customers who wish to control the facilities that run their services, but who still desire to bind their service offerings into an external, universally accessible directory infrastructure.

The Service-Hosting Model:

The previous section pointed out that a central facet of the proposed venture is creating a distributed directory infrastructure to bring visibility of Jini network services to the scope of the public Internet. A second central facet of the proposed venture is that most of the deployed Jini services are hosted on CPUs in the Telco/network service provider hosting facilities. Furthermore, while some of these services are provided by the Telco/network service provider, others are provided by third-party businesses that invent the Generation-D network services of tomorrow. The proposed venture could thus be succinctly described as a "Network service hosting platform."

This model means that there are three distinct roles of people or institutions involved in the proposed scheme:
 the platform provider that supplies a service hosting infrastructure (we play this role);
 the inventor/supplier/deployer of services who runs their services on our facilities (for some core services, this role is played by us, while in general, this role is played by third party businesses who we consider to be our customers); and
 the consumer of services, who might be an end-user out there on the Internet, or another service that builds upon more primitive services.

By and large, end consumers of network services will not literally be ordinary citizens out there. The man in the street doesn't generally do Java programming to get something done! Generally speaking, it is applications programs and appliances (used by ordinary people) that will actually be exercising network-based services as consumers of those services, on behalf of the actual human end-user. Jini technology is fundamentally all about systems talking to systems, in contrast to something like html which is oriented toward human-to-system interaction.

In enterprise computing, the platform provider, the supplier of services (programs) and the consumers of services are often all the same corporate entity, residing within a sort of corporate bubble. FIG. X12 illustrates the conceptual shift that should occur as one transitions from wholly internal enterprise computing to the proposed 3-role model:

While the Jini architecture provides an elegant model that allows service consumers to locate services and access them, core Jini says very little regarding how services get deployed or launched in the first place. The proposed venture fills this gap by providing a dynamic service deployment architecture. The provider/inventor of services launches their services onto CPU hosts on our facilities through the exercising of administrative APIs and/or an administrative console application. Indeed, the APIs that allow third parties to load their services onto our facilities are themselves realized as basic Jini services that the telco/network service provide supplies.

This model of dynamic service deployment onto awaiting facilities is radically different from more traditional hosting arrangements that might involve extensive business negotiations. In our case, deploying the services that one creates onto live hosts out on the network amounts to API calls—not phone calls to support personnel. I refer to this model of service deployment as being frictionless. This allows the customer who supplies tomorrow's services to get them out into the field in Internet time.

This concept of frictionless, dynamic deployment of services onto the network is all enabled by Java's code-mobility. As discussed above, Java code-mobility allows Jini systems to move code out to consumers of services. By the same token, this mobility allows developers of services to also dynamically load the code that implements their services onto the telco/network service provider's CPU hosts. We're all familiar with the notion of Java applets being streamed out to a user's PC web browser. The web browser runs a Java Virtual Machine (JVM) process that serves as a sort of software container for applet code. Our proposed service deployment platform simply applies this software container concept to backend hosted services. Every CPU host in the telco/network service provider hosting facilities will run at least one of these generic container processes into which service deployers may inject the code for their services. The actual implementation code gets served up from any ordinary web server (http daemon) located anywhere in the Internet.

Through administrative APIs, the service supplier indicates the URL that identifies where the service code resides out there somewhere on the Internet. The generic service container process will load the code via the web server and run the service in its own thread of control. More details are given on service life-cycle specifics later in this document. The following diagram illustrates (roughly) how a service supplier might make a call to a service container (itself a Jini service) to request that the container run a service instance using code located at a specified URL. (The exact architectural details of how we do dynamic service launch are more complicated than this simplified diagram; but this conveys the gist of how dynamic service deployment works. More detailed discussions are given later in this document.)

This model of dynamic service deployment not only makes the act of bringing services to market frictionless. It also gives us enormous flexibility in managing a future network service environment where there may be quite literally millions of service instances concurrently running in our facilities around the globe. CPUs will crash from time to time; connectivity failures will occur. With the flexibility of dynamic service deployment onto generic service containers at our disposal, we can create management agent software that sees to it that failed services get re-homed to other CPUs or facilities. More details of management of services are given later in this document.

The WorldCom NewWave OSS pilot project has already successfully used this model of dynamic deployment of services into generic service containers. We had good results using both container processes that we had built from scratch and using commercial mobile-agent containers as the home in which services run.

The exact service deployment philosophy used in the NewWave project will require some modification to adapt it to the requirements of a service hosting environment that is opened up to services coming from suppliers outside of WorldCom. In WorldCom's NewWave, all participants involved were within the telco/network service provider corporate bubble. In the proposed venture, the bubble is opened up to outsiders. One change that needs to be made is that we shouldn't permit services coming from distinct business entities to be co-resident as threads within the same service container. The service container amounts to a heavy-weight CPU process. Allowing service threads belonging to different suppliers to coexist in the same process space is an open invitation to adverse interactions (e.g. modification of a non-final static variable used by both services). For the sake of isolation, each service container process is required to be uniquely owned by a single service supplier business entity. APIs allow the customer who supplies services to lease a service container. They might supply information on what class of CPU hardware they need, as well as geographic information specifying the desired hosting facility, etc. Details need to be worked out. One possible approach would be for us to deploy, say, 10 service container processes on each CPU. Although each container process is owned by a single customer, the CPU would be shared by as many as 10 different customers. Should a customer wish to essentially own most of the cycles on a given CPU, they would need to lease all 10 service containers on that CPU. (Note that this choice of 10 service containers per CPU does not imply that there can be only 10 service instances deployed on a given machine. On the contrary, the generic service containers are multi-threaded processes, allowing many separate service instances to be run in their own threads. Realistically speaking, a given CPU might support a few thousand service instances, perhaps on the order of 150 threads per container process.)

Farms of Pre-Configured Generic Host Computers

In accordance with exemplary embodiments of the present invention, the future Jini service hosting environment is that of farms of many thousands of rack-mounted CPUs will be deployed in hosting centers distributed around the globe, all with fat pipes to the core network. The CPUs might typically be Sun Netras or Compact PCI class computers. However, there is nothing in the present high-level architecture that dictates whether the hosts are few-CPU, rack-mounted pizza boxes, or high-end multi-processors, like an IBM SP/2. Some mix may be desirable.

Network design will be crucial. Performance should not degrade as more and more services come online and usage goes up. The network design aspect of the venture has, however, not yet been explored to any depth.

Hosts are quite generic, deployed pre-configured with a basic complement of infrastructure. Each host is configured to run several generic service containers at boot time, as discussed in the previous section. These container processes are at the heart of the hosted service architecture. A certain subset of hosts will also be deployed with other basic infrastructure components. This set of infrastructure could include some or all of the following:

Relational databases, such as Oracle or Informix, that could be leased and used by deployed Jini services Commercial LDAP directory infrastructure, should we choose to go the commercial route. (If we build the directory infrastructure ourselves, these components would be realized as just one more Jini service.)

Ultra-fast, in-memory databases, for example the product from the vendor Kx.

Communications middleware, such as Tibco or IBM MQSeries. We may wish to make an information bus like Tibco available to any services running on our platform. Or we might find that it is more cost effective to build the info bus ourselves as Jini services, or even rely upon info bus Jini services coming from the entrepreneurial community building for our platform. (Tibco is quite expensive.)

Web servers, such as Apache or iPlanet, that play the role of code-servers rather than serving up html pages Core Jini infrastructure processes, such as Jini Lookup Service, Mini Transaction Manager JavaSpaces or other so-called tuple-spaces engines that greatly facilitate cooperative distributed computing Rules engines, perhaps Blaze or Ilog.

Other service-supplier entrepreneurs make suggestions of other basic plumbing that they need.

Storage Area Network infrastructure may also factor greatly into the mix of hosted supporting services. (And of course, the telco/network service provider will supply traditional web-hosting infrastructure, such as web and app servers, to our customers. But that is a part of already ongoing hosting ventures, quite separate from the subject of the current proposal—Jini network service hosting. I would expect a great deal of synergy between these two models. For example, the servlets or JSPs of a customer's hosted web site might well call upon Jini services to perform its backend intelligence.)

This embodiment of pre-deployment of generic hosts and infrastructure helps customers get to market quicker and scale on demand, avoiding the months-long agony of hardware procurement. There is always a pool of available resources waiting to be put into use by the service suppliers (assuming our hardware suppliers can keep up). It's a lot more viable for the service hosting provider to keep resources in the pipe-line than it is for every service supplier to maintain their own pipe. We moderate the fluxuations. This advantage is not unique to the proposed scheme, but is common to all hosting models.

Placing Network Services on a Sound Economic Basis

A central thesis of this proposal is that the network services platform of the future should, from the outset, rest upon a sound economic basis—a pay-as-you-go model where dollars change hands in payment for services rendered. Many ingenious Internet ventures, the so-called dot-coms, have failed or soured in the eyes of Wall Street, not due to a lack of patronage, but rather due to the absence of any means for capturing revenue, aside from advertising. The telecom industry faces a similar dilemma over where their future revenue streams will come from. The downturn on Wall Street that telecom is currently in the midst of may be at least partly due to the uncertainty over where future revenues are going to come from. Both the dot-coms and the telecom industry are hurt by the fact that the public has gotten used to a status quo where the Internet and its various services (like e-mail, web-surfing) are free, aside from a monthly ISP access fee at the on-ramps. It has become almost as if the Internet is the air that we breathe. Peering charges help compensate the backbone providers for services rendered, somewhat placing the Internet on an economic basis. But is the peering model enough to ensure the vitality of the industry? Compounding the problem of a public attitude that expects a free lunch is the fact that technological leaps in network infrastructure (like all-optical) are pushing costs per bit toward zero at super-Moore's-Law rates. We're facing the prospect of the commoditization of bandwidth.

Despite current public attitudes that expect a free lunch, I believe it is still possible to introduce a sound, pay-as-you-go economic model into the network service layer. Software services are less subject to commoditization than raw bits. Software is hard to write and varies in quality and utility from abysmal to superlative. And people keep inventing new software and services that people are willing to pay for. It seems hopeful that the public and the corporate world will be willing to accept a network service model where you pay for what you get. While there is no guarantee that a market will take off for the Jini-based network services advocated in this proposal, at least this venture will not fail due to an absence of a mechanism for revenues to flow.

So, we face the question of how precisely to put the proposed Jini network service platform onto a sound economic basis. A central thesis of this proposal is that micro-revenues should be able to flow amongst service suppliers, service consumers and the service platform provider in a frictionless manner. This is much in the same spirit as our advocacy of a frictionless deployment model. Much of Jini's power lies in its simplicity and elegance, reminiscent of the RISC processor architecture that rejected trends toward baroque instruction sets. This proposal suggests, in keeping with the spirit of Jini technology, that we follow a similar path and seek a bone-simple, elegant solution to put network services on an economic basis. To allow for payments to flow in real-time amongst consumers and providers of services, we could either partner with an existing commercial e-payment provider (say, CyberCash), or we could build our own funds-transfer infrastructure. The advantage of building it ourselves is that we could make it a pure Jini service fitting seamlessly into the platform. Another advantage is that by controlling the money flow, we could skim a small handling fee, say one part in 10,000, for every funds transfer amongst consumers and providers of network services. This could ultimately add up to significant revenues if the proposed network services platform took off in the marketplace. For now, we'll assume that the mechanism of money flow is a service provided by the telco/network service provider.

To accommodate revenue flow, we propose that one of the core Jini micro-services that the telco/network service provider provide as part of the Jini service-hosting platform be a funds-transfer service capable of rapidly, effortlessly moving small fractions of a dollar in real-time. This would be a simple debit/credit account balance system that provides the interfaces and protocols for secure transfer of funds from one account to another. We require that all who participate with our platform of Jini network services sign up (online) for an account, and establish an identity for themselves within the system. Participants can range from the end-consumer in the street all the way to enormous institutions. As far as we are concerned, any participant, however large or small, is just a sort of persona on the system which has an id, a bucket that holds monetary units, and miscellaneous contact information. Participants include the suppliers of services, the consumers of services (both applications vendors and end-users) and the platform provider.

Upon signing up, an account is created and an account balance is maintained. (We might maintain balances using 64-bit arithmetic, where each unit represents a millionth of a dollar. This allows expression of money to span the range from a millionth of a dollar to some 20 trillion dollars.) One could use very conventional means (such as online credit-card payment over an SSL connection or existing EFT) to allow participants to move money from the real world into their accounts. Similarly, one could withdraw money from the account, moving it back to the real world, using traditional funds transfer techniques (like being mailed a check, or EFT). These traditional means of doing bulk movement of money in and out of the account to and from the existing financial world can be thought of as frictional. They take time. Time for credit-card transactions to be approved. Time for checks to be cut and mailed. Time for credit institutions to receive monthly payments. These mechanisms also generally don't work down to micro-transaction levels.

But once money is in the system, it can flow effortlessly from party to party as we debit one account and credit another. The telco/network service provider provides the Jini service that allows this transfer of monetary units. Security could be based upon either public or shared secret key encryption. For example, in the shared key approach, the Jini central bank service provided by the telco/network service provider represents the trusted third party with whom the participant shares their secret key. This central banking service mediates the transfer of funds. In this shared key approach, any participant would have a unique key known only to them and the central banking service. When the participant wishes to transfer funds from their account to another party, they generate a transfer authorization object specifying recipient account id and the amount to transfer. Their secret key mangles the account transfer contents. Only the central banking service, who shares the secret key, can un-mangle the transfer authorization and ascertain its validity. Upon generation of the funds transfer authorization object, the paying party can pass that object to the recipient party, who can at that time or a later time cash it in by sending it to the central banking service. Upon receiving the transfer authorization, the central bank will validate it and move monetary units from the payer's account to the recipient's. The Jini Transaction Manager service from Sun could be used to ensure transactional integrity during the funds transfer operation. We also need to ensure that the transfer authorization object behaves as a one shot to ensure that the same object is not used a second time to double-dip.

As the provider of the hosting platform infrastructure, many of the services we offer, such as allowing service suppliers to use our CPUs, will adhere to a leasing policy. As with usual Jini leasing, periodic lease renewal is required to express a continuing interest in the leased resource. We also make monetary compensation a part of such leasing protocols. The party that supplies services riding on our platform and consuming The telco/network service provider facilities resources will need to pass funds transfer authorizations to us upon every lease renewal. There also need to be APIs in place to allow participants to make inquiries as to the cost of leasing before-the-fact in order that they may decide whether they wish to take out or renew the lease. Perhaps we will need to augment the concept of a lease with the concept of a rate guarantee, whereby the resource supplier affirms that a leasing rate (price) will be honored for some time period into the future. At some point, we may even contemplate introduction of bidding models, where the consumer entity makes an offer and the resource supplier accepts or rejects it. In all likelihood, an initial offering of the proposed platform would stick to flat pricing.

There are three basic mechanisms by which the telco/network service provider reaps revenues from the proposed Jini services platform. First of all, we charge for every time a service supplier consumes one of our resources, such as by leasing a service container process on one of our CPUs. The second way we gather revenues is by offering core services that require funds transfer authorizations to be passed when exercising their APIs. For example, one core service that we might offer is a network-based, reliable, persistent message queue service that might be used for, say, business-to-business interactions. The API of this Jini service might require a transfer authorization to be supplied for every payload that is enqueued. Services that require ongoing, periodic payments might require the caller to pass in a payment agent object that is authorized to generate funds transfers on behalf of the user. Such details remain to be refined. The third place where we reap revenues is the handling charge that we skim, say one part in 10,000, every time participants move funds from account to account.

The third-party service suppliers who ride their Jini services on our platform can also incorporate the requirement for payments into their Jini service APIs. Or they can choose to offer their services for free. That's their business. One feature to be understood here is that the present invention offers a means of extracting micro-payments for the services provided. These third-party service suppliers may also implement sophisticated market mechanisms that allow for bidding, floating prices, etc. One could imagine some high-level service that is built using several more primitive services. The consumer might ask the service for its rate and it recursively asks the subordinate services for their rates, then sends a response back to the caller returning a cost plus answer. Similar recursion could apply to bids. The main point is that enormously sophisticated real-time market mechanisms could arise, enabled by this simple primitive service that we offer that allows transfer of monetary units.

If the proposed scheme of hosted Jini services on the Public Internet eventually took off in a major way in the marketplace, we could eventually arrive at a situation where there was almost a habitat or ecology of interacting services on the network, all the while passing streams of money amongst themselves. This could very much become an economy in silicon. The owner of the platform could reap substantial revenues just by skimming tiny transfer handling fees. On the downside, should this take off, banks and other financial institutions would not be happy. They would not like to see this microcosm or mirror world of their own world. Governments would also become nervous. Careful attention would need to be paid in order to satisfy government concerns. Funds transfers representing earnings would need to be logged for tax purposes. The system would need to obey any relevant laws regarding the reporting of large funds transfers in order to thwart money laundering. The value of monetary units would need to be pinned to a currency system, like dollars, and not allowed to float, so that the system is not construed as trying to create a currency. And if funds can enter and leave the system as different currencies, such as dollars, yen and euros, we would need to make sure that the service charges extracted for moving money into and out of the system are large enough to prevent the system from being abused as a vehicle for currency exchange speculation.

It should be noted that the incorporation of dollar flow into the Jini service platform implies that all participants all the way up and down the line have an identity in the system. There is no sense of the anonymity that exists on the usual Public Internet. Participating in the network services requires establishing an identity and account on the system. In a way, this somewhat locks down and privatizes the Internet . . . at least the hosted Jini service portion of the Internet. Some may feel that this closes off the Internet. But at the same time, the proposed platform actually lowers the barriers of entry for the small entrepreneur to field their services onto the Network. And with identity integral to everything, there is accountability and traceability that discourages malicious abuses, such as Jini service code that destroys client files. Also note that if the money flow percolates all the way up to the human end-user via applications on their PCs, TVs, handhelds and so on, there needs to be a secure, convenient way of identifying the user. This appears to imply the need for smart card adoption in the consumer sector. It should be likewise noted that in the above exemplary embodiment of the present invention, billing as we know it seems to have disappeared, replaced by real-time monetary flow. The question of consumer and corporate acceptance of such a model is a definite risk. One could imagine that payment agent objects with threshold stop-loss policy could ease fears of using such a real-time funds transfer system end-to-end. [Note: The details of such a payment agent are further filled in within later sections on the policy-based payment agent.]

Finally, note that this accommodation of real-time monetary flow within a community of network services is one of the ways that the proposed service hosting platform is quite different from existing ASP offerings. Existing models, if I understand them correctly, are still quite isolated silos, where the pricing model pretty much consists of a simple dollar flow from the corporation that is outsourcing their IT or web systems to the hosting provider. The revenue flows that arising on this service platform could become far more complex, as services depend upon other services to accomplish their missions.

Mobile Code and the Speed-of-Light Barrier:

As bandwidth becomes more and more plentiful due to technology advances, distributed computing becomes more and more practical. Business processes can be spread around the globe, perhaps realized as services hosted on our Jini service-hosting platform. It is tempting to start thinking of the platform that we are creating as a sort of giant, worldwide connection machine or massively-parallel multi-processor machine whose backplane is The Network. The one wrinkle in this view is the latencies caused by the finite speed-of-light, as well as any latencies due to router hops. The speed of light barrier can't be overcome by any technological progress. We're stuck with it. Signals sent halfway around the globe take some 70 milliseconds to travel.

But what seems like a weakness of our distributed Jini services platform is actually a strength. The reason this is so is once again found in Jini/Java technology's ability to move code across the wire. If multiple services need to perform intensive back and forth conversations with each other, our dynamic service deployment approach allows the communicating parties to home their services at the same geographic hosting facilities . . . even on the same CPU.

But we can go a step further. The Jini services described so far are not intended to be very agile. One generally doesn't move them around a lot, except for re-homing them in cases of failure. We also enforce the policy that Jini services from different institutions do not reside in the same heavy-weight service container process. In contrast to services, mobile agents are much lighter weight entities that can be moved around the network from container to container, perhaps following an itinerary. Mobile agents may be the right answer for many situations in which interacting entities need to be located in physical proximity to overcome the limits of the speed of light.

In this vein, and in accordance with one exemplary embodiment of the present invention, one of the Jini services that someone implements will itself be a mobile agent's container service. Perhaps the telco would supply this service as one of its core micro-services. Unlike the Jini service container that we supply, which doesn't allow co-resident services from different institutions, the mobile agent container service accepts the injection of mobile agents coming from many different parties. These mobile agents are manifested as multiple threads running within a process. They have less isolation than Jini services and need to obey certain laws of the road. But mobile agents offer a very attractive mechanism that will allow businesses to move entities that need to interact into the same process at runtime where they can communicate without large latencies. So far, mobile agents haven't taken off in any big way in the marketplace. But maybe that's attributable to the fact that mobile agents need a place to live and no one has supplied a hosted neutral ground out there where the agents can reside. (Corporations are understandably wary of code coming from the outside into their systems.)

The following figure illustrates the notion of nesting mobile agents as threads within agent containers, which are actually Jini services running within a Jini service container, which is actually a JVM heavy-weight process running on a CPU located in our hosting center:

Although it is impossible to predict what future applications of mobile agents might emerge, the ability to move interacting entities and their code into proximity in order to overcome latency is advantageous. As bandwidth becomes abundant and commoditized, and the speed of light remains a fixed wall, the provider who offers techniques (like mobile agents) and expertise for overcoming latency will present a competitive advantage.

Candidate Services:

In this section, we outline some of the possible services that might be implemented on the proposed platform. The first subsection outlines some of the primitive Jini services and other interfaces that need to be supplied by us in order to enable the basic use of the platform by service suppliers and service consumers. These are in the nature of bootstrap services that underlie the whole show. The second subsection lists a number of potential core services that also might be provided by the telco/network service provider in order to make the platform more useful out of the gate Primitive Services These are the basic primitives which should be present in order to use the hosting platform. Some of these might be Jini services, while others may be distributed in more conventional library form to users in order to bootstrap the entire works. At the present level of abstraction, we do not probe too deeply regarding the question of which primitives are exposed as Jini services and which are distributed as linkable libraries.

1. Service Lookup Utilities:
   Key to bootstrapping all use of Jini services on the public Internet.
   Somewhat extends Sun's LookupDiscovery beyond the scope of multicast radius into the scope of logical, hierarchical topic areas on the Internet.
   Will likely be distributed as class libraries.
   Allows any client on the Internet to find a Jini Lookup Service bound to a directory tree topic area. (The client may then use usual Jini methods to find desired service interfaces within that topic.)
   Allows a Jini service to find all Jini Lookup Service instances bound to a given topic area, in order that the service may register itself with the Jini Lookups and maintain its leases.
2. Other Global Directory Service Interfaces:
   Allows service suppliers to define nodes in global directory space
   Allows navigation (browsing) of directory tree
3. Resource Inventory Services:
   Allows queries regarding available resources (CPUs, service containers, etc.)
   Allows users to query as to what service containers and other resources they currently own
4. Service Container Rental Management Service:
   Allows service suppliers to lease a service container on a hosted CPU into which the supplier may then home their services
5. Service Life-Cycle Management Service:
   Allows the service supplier to request that one of their services be launched
   Allows the service supplier to provide a management agent that will oversee the health and life-cycle of the deployed service.
   Main implementation component is the Service Master-Record process described elsewhere in this document.
6. Jini Lookup Launching Service:
   Allows the service suppliers to request that a Jini Lookup Service be launched and bound to a given topic area (i.e. tree node in global directory).
   The launching of the Jini Lookup Service is scoped to a specific management domain, allowing designation of the geographic location where it will be running.
7. Primitive Persona Services:
   Mainly exposed to users via conventional web application, rather than Jini API.
   Allows one to establish an identity on the system
   Supports creation of an account
   Supports depositing money into account and withdrawal (in frictional manner)
8. Funds Transfer Services:
   Provides interfaces and protocols for safe, frictionless, real-time movement of monetary units from account to account.
   Allows fine-grained payments to be required for use of any Jini service
   Consumer of service can request the creation of a one-shot funds-transfer-authorization object, specifying amount of money and the id of the recipient.
   Consumer can pass this authorization in calls to the API of Jini services that require payments.
   Service provider can redeem the transfer authorization that they receive by passing it to central funds transfer service
   Central bank decrypts the transfer authorization object, validates it, then does a debit and credit to effect the funds transfer.

Other Candidate the telco/network service provider Supplied Core Services:

This is a tentative selection of other core services that the telco/network service provider might elect to supply to increase the value, out of the gates, of the service-hosting platform:

1. File System Services:
   Allows a service supplier to use disk space on one or more hosts.
   Isolates customers from direct contact with native file systems
   Should be a distributed file system that allows multiple disks to appear as seamless file system.
   May adopt approach somewhat reminiscent of old Apollo workstation distributed file system. Owner can "cd" to top of the world then "cd" into the root of their file system on any of the host CPUs on which they have reserved space.
2. Reliable Message-Queueing Service:
   Allows any customer to launch a queue, physically homing it to a specific location
   Allows access permissions to be set on queue
   Allows exercising of a deployed queue
   Might well rely upon underlying commercial product
3. Publish/Subscribe Event Bus:
   Allows customer to dynamically create a web of one or several message routing hubs, located at specified physical locations.
   Allows users to publish events, subscribe to event topics and receive events to which they have subscribed (modulo some specific, identified web of routing hubs).
   Event space is not one big homogeneous space—users can create disjoint virtual buses (each comprised of its own web of routing hubs) for private or public consumption.
   Might rely upon underlying commercial product 4. Database Access Services:
Provides administrative interfaces for gaining access to specific deployed databases, setting up accounts, etc.
Allows services to fetch JDBC connections to databases in order that the services may issue SQL calls to the databases
5. NewWave "DataBus" Services:
Allows objects of given type to be stored across many distributed databases and located efficiently
Allows associations to be defined between any entity types in deployment
Allows association traversal amongst related entities
6. Advanced Communications-Specific Services:
As network technology evolves, the telco/network service provider may expose new communications channels to our customers, framing them as Jini services.
An example might be a WDM switched circuit between two end points
One option for exposing such circuits to customers is to provide a Jini interface that returns a socket factory (an object that creates and returns objects conforming to the socket interface, but hiding the implementation). The socket factory can be used, for example, to run RMI over some specific networking technology.
7. Tuple Space Engines:
e.g. Java Spaces
Allows deployment of tuple space repository on specified compute node
Tuple space engines support collaborative computing, distributed computing process coordination and data passing
Of special interest to scientific programmers who wish to spread intensive computations across many compute nodes; but also of potential interest to business computing.
8. Jini Transaction Services:
Processes that need transactional atomicity (several operations complete in their entirety or not at all) can enlist a Jini Transaction Manager instance to oversee a given transaction
Jini TM oversees the 2-phase commit protocol
9. Mobile Agent Places:
A Jini service would play the role of a mobile agent place
Mobile agent places serve as a habitat in which mobile agents run in their own thread of execution
Mobile agents may be injected from outside, and can move from place to place, under their own volition, or in response to external commands
Mobile agents often communicate with other agents residing in the same place
Homing multiple mobile agents to the same place can allow interacting processes to overcome the latency due to the finite speed of light
Need strategy for controlling who has permission to move agents into an agent place
10. In-Memory Database Support:
e.g., Kx or TimesTen
Define Jini interfaces that give services access to these fast, in-memory databases
Third-party service suppliers might, for example, exploit in-memory DB to implement an ultra-fast, reliable message-queueing service
11. Funds Transfer Convenience Services:
Enhances functionality of basic funds transfer services
Basic funds transfer service disallows payers to direct-deposit into someone else's account. Receiving party may choose to reject incoming money. Payer sends receiver a funds transfer authorization, and receiver can redeem it with central bank service.
A convenience service may be provided that serves as a sort of payment receiving agent that can act on behalf of a participant to accept payments (perhaps continuous, ongoing). May contain policy behavior to flag large transfers and get human confirmation before accepting transfer. Might log all incoming payments. If payment is accepted, the agent service would redeem the funds transfer with the central bank service.
12. Route Diagnostic Services:
Utility services along the lines of trace-route or ping
Enables, for example, other services to pick a geographic location of service instance (when there is a choice) that is optimal for a given service consumer to interact with Risks The following lists some of the obvious risks of the proposed venture:
1. Resistance to adoption of a Java-centric approach in the marketplace: The technology-specific approach is a significant break with technology-neutrality that has long prevailed in networking. This venture amounts to creating a Java Network. Microsoft's reaction will be "over my dead body."
2. Potential delays in ubiquity of Java: Java is making its way onto wireless devices, with efforts underway at Nokia, Motorola, Symbian and DoCoMo. However, handhelds are currently resource-starved, mainly due to the limitations of battery technology. Java on handhelds may remain fairly stripped down for the next few years, with J2ME (Java2 Micro-Edition) not supporting RMI. It's still uncertain whether handhelds over the next few years will be able to be fully-functional Jini clients. This is not a show-stopper, since surrogate processes in POPs can play the role of proxy clients to Jini services on the network. But the proposed platform will come into full bloom whenever devices are fully Java-capable, end-to-end.
3. Scalability of Global Directory Services: One technical challenge in the proposed venture is creating a distributed directory infrastructure that can scale to accommodate access by millions of users. Fortunately, a disruptive technology such as this will typically ramp up in acceptance over time-scales on the order of 5 to 7 years. During the ramp-up period, there will be plenty of time to hone the techniques for scaling the directory.
4. Security Issues: Security will be crucial to viability of proposed venture. The thought of code from the outside world being dynamically loaded into server farms and out to client processes is enough to strike terror into most IT people. We'll need to take great pains to sandbox services running on the hosting facilities to isolate them from direct access to system resources and from each other.

Jini Basics

Jini is a network computing technology, introduced by Sun Microsystems two years ago, which aims to bring ubiquitous, spontaneous computing to networks. Jini technology allows devices to come and go from a network, without the need for administrative intervention to configure the system to accommodate the intermittently-connected device. Such devices that attach to a local network can offer services that other devices on the network can make use of, or they can discover and make use of services offered by other devices or compute processes on the network. In other words, anything participating in a Jini-enabled network can play the role of provider and/or consumer of services. Sun's marketing organization originally positioned Jini networking technology in the consumer/embedded product space. Local area networks in office buildings, campuses, homes, cars, and so on could be Jini-enabled. Jini-enabled devices could then be attached to the network, perhaps through a wireless link, then spontaneously discover other services on the network, and make use of those services. For example, one might bring a wireless handheld PDA into a room, and immediately be able to make use of a nearby printer, without any requirement to perform any system configuration.

This exemplary embodiment of the present invention of local, spontaneous networking is very powerful and has the potential to greatly impact local, networked computing, enabling smooth interoperability amongst so-called ubiquitous or pervasive computing devices. But unfortunately, this initial focus by on the consumer/embedded/ubiquitous computing space has led to a widespread impression that Jini technology is only relevant to plug and play of devices on local networks. Jini technology, suitably extended in accordance with exemplary embodiments of the present invention, has much wider applicability beyond local consumer or workgroup computing. In accordance with one exemplary embodiment of the present invention, Jini can be applied within an enterprise computing context and could well form the basis of future enterprise computing. In accordance with another exemplary embodiment of the present invention, Jini service can be taken to the scope of the Public Internet, making Jini services the embodiment of intelligence at the edge of an increasingly dumb worldwide communications network.

One of the key features of Jini is that all services are accessed through a Java interface. Jini is Java-centric, and assumes that processes participating in the system as consumers of services are Java-enabled. Many processes and devices that participate in a Jini network in the role of providers of services will also be Java-enabled (i.e. run a Java Virtual Machine). However, Sun's Jini Surrogate Architecture permits devices that do not run Java natively to become accessible as Jini services.

Another feature of Jini is that it hides the difference between hardware and software. It is agnostic with regard to whether a deployed service is some process running on a general-purpose computer, or is embedded in some special-purpose hardware device. To consumers of Jini services, all Jini services appear as APIs (application programming interfaces) that conform to one or more Java interfaces. The interface is simply the signature of operations that the service understands and to which it responds.

At its very heart, Jini depends upon Java's dynamic code-loading capability as the defining feature of its architecture. This ability to move code across the network is what sets Jini apart from other network connectivity architectures such as CORBA. Indeed, without the power to move code at runtime, the network service architecture proposed in this document would not be tenable. The movement of software objects and code across the network is central to how consumers look up Jini services and how those services are deployed. We now describe how Jini service-lookup works, and how code mobility is central to service lookup in accordance with exemplary embodiments of the present invention.

The glue that binds a Jini-enabled network together is the Jini Lookup Service. Sun provides a reference implementation of this service, known as Reggie. In vanilla Jini, as currently provided by Sun, one Jini-enables a local network simply by running one or more Jini Lookup Services on general-purpose computers somewhere on the local network. Any provider or consumer of Jini services that attaches to the network needs to connect to these Jini Lookup Services in order to participate in the local Jini service community. Such providers and consumers of services spontaneously discover the nearby Jini Lookup Services through the mechanism of multi-cast. No a priori knowledge of IP addresses, DNS names or URLs is required in order for spontaneous discovery to take place on the local network. As a consumer or provider of services comes on-line, it sends out multi-cast packets on a conventional Jini port. Jini Lookup Services within multi-cast radius respond to these pings, and the Lookup Service and participant perform a handshake. Upon launch of a new Jini Lookup Service, that Lookup Service will also send out multi-cast pings, allowing any participants in the Jini community that are already running to handshake with the new Lookup Service. In this manner, Lookup Services and participating processes in the Jini community can come and go in any order, and remain in touch. Once a participating process on the Jini-enabled network discovers nearby Jini Lookup Services, it can either register the services that it offers with Lookup, or it can look up services offered by other participants in the Jini community . . . or both, in the case of participants that are both providers and consumers of network services. The scoping of this discovery process to multi-cast radius strictly limits the visibility of Jini services to a limited subset of the connected internet, since multi-cast packets only make it through some (tunable) number of router hops. (But it should be clearly understood that consumers of services can also directly connect to Jini Lookup Services beyond multi-cast range, so long as they have a URL that permits them to find these remote Lookup Services in accordance with exemplary embodiments of the present invention. Described elsewhere in this document is a description of how this hook is leveraged to allow us to bring the Jini service architecture into the scope of the Public Internet in accordance with exemplary embodiments of the present invention.)

Figure 15:
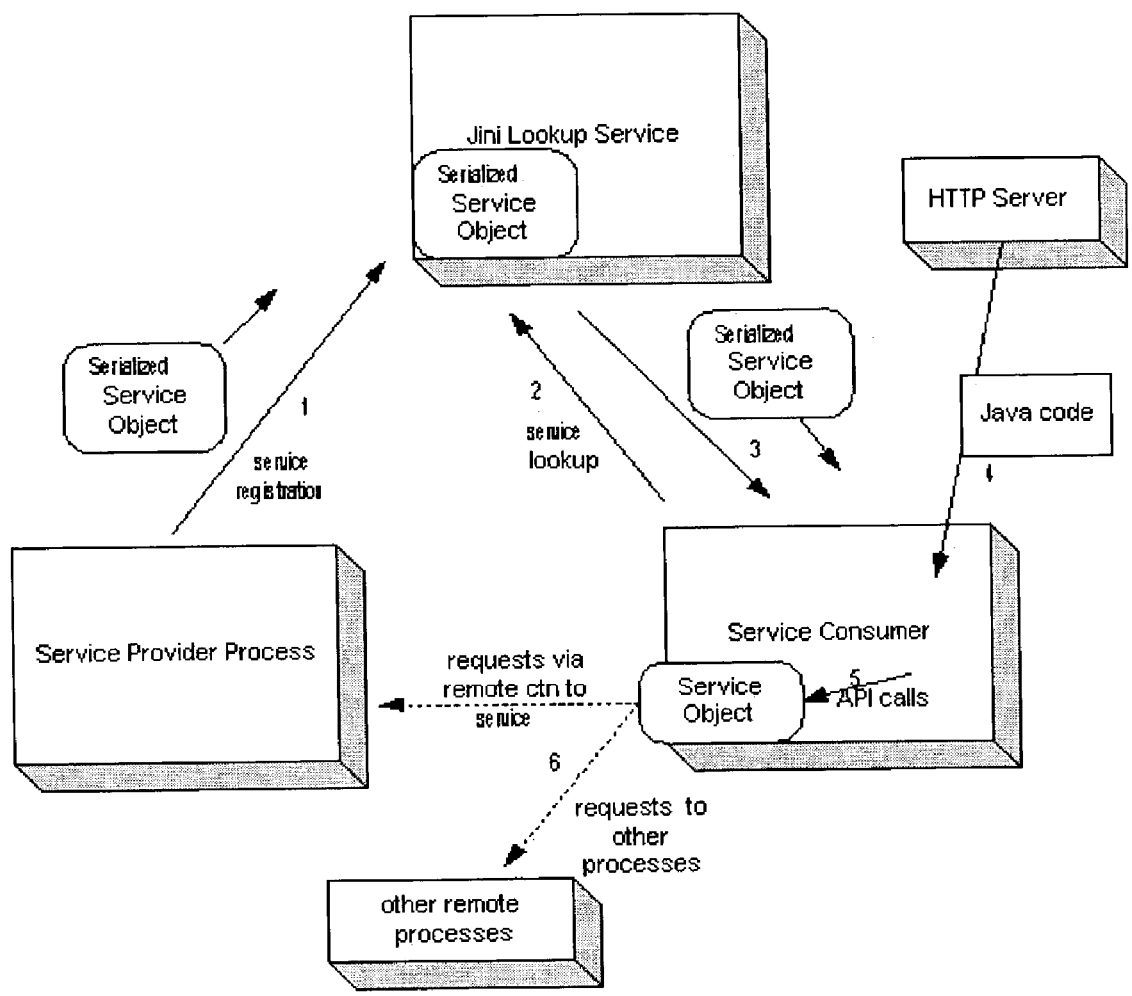
FIG. 15 shows sequence of operations typical in use of Jini services, including the services registering themselves, clients finding services, and clients accessing so found services in accordance with an exemplary embodiment of the present invention.

When a provider of a Jini service registers its service-offering with Jini Lookup, it streams an object (or objects) that implements the service to the Lookup Service. This service object is stored (in serialized form) within the Lookup Service itself. When a consumer of the service looks up that service, the service object is, in turn, streamed out to the consumer. The Java byte-code that implements the service object can be served up from an http server located arbitrarily. This scheme of service registration and lookup is illustrated in FIG. 15.:

This model is in sharp contrast to CORBA, where a registry simply stores a sort of address that allows a consumer of a CORBA service to make a connection to some remotely deployed service process. This ability to move service objects that implement the service interface out to consumers, at run-time, is powerful in the profoundest sense. This is what permits us to suggest that Jini has the potential to become the central unifying basis of a next-generation network where nearly everything is a Jini service.

Figure 16:
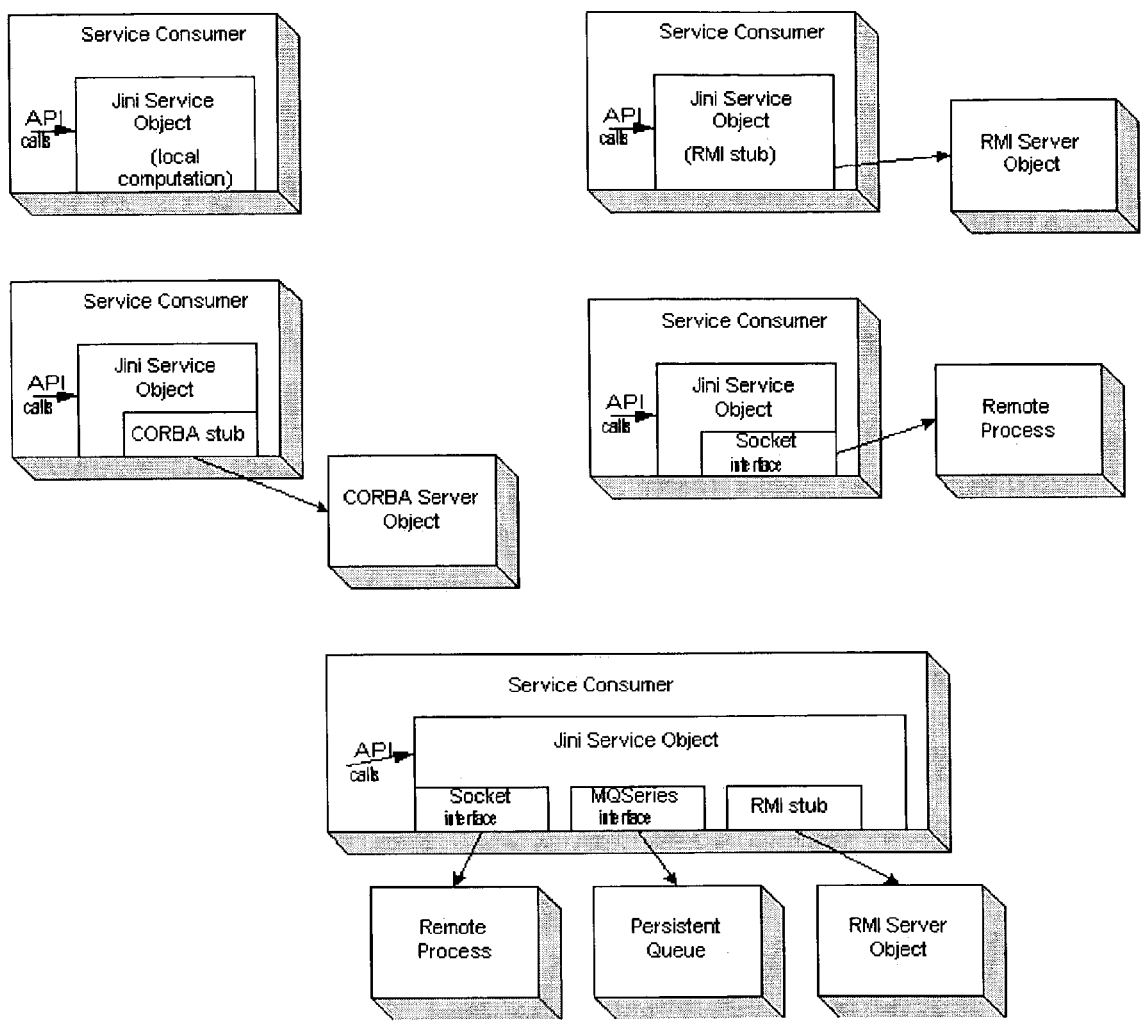
FIG. 16 illustrates the many kinds of things that can happen when clients invoke the APIs of Jini services, ranging from local computations in the client, to forwarding of requests to remote CORBA, RMI or socket-based services, to complex interactions with multiple remote processes over multiple middleware technologies in accordance with an exemplary embodiment of the present invention.

The Jini service object that gets stored in Jini Lookup and subsequently streamed out to consumers of the services can be absolutely any Java object that is serializable. It can do anything that can be done in Java code. This is a powerful concept, and is what allows us to position Jini services as the single, unifying construct for building all network services, from the most primitive core communications services to the highest level application components in accordance with exemplary embodiments of the present invention. This model of moving service objects and implementation code to clients at runtime is in sharp contrast with CORBA, where a stub object can only act as a proxy that forwards requests to and responses from a remote server process in accordance with one exemplary embodiment of the present invention. The Jini service object might perform computations that are purely local within the client's process space in accordance with exemplary another embodiment of the present invention. In accordance with other exemplary embodiments of the present invention, it might store state local to the client; or it might interact with a remote server process—the real implementor of the service. In this degenerate case, where the service object simply forwards requests to a remote process, Jini.services become roughly equivalent to CORBA or RMI services. One of the most common forms of Jini services uses an RMI stub object as the service object that is downloaded from Jini Lookup to the consumer. But this is simply the most common case. In accordance with other exemplary embodiments of the present invention, the service object might encapsulate code that interacts with a remote service using any one of a variety of protocols or middleware, such as sockets, RMI, CORBA, IBM MQSeries, and so on. Or instead, interact with two or more remote services using the same or different middleware or protocols in accordance with anther exemplary embodiment of the present invention. With respect to other exemplary embodiments, the service object even interact with zero remote processes, implementing the entire service interface locally within the client's process space. Over the course of time, the service object might have an implementation that changes to a different communications protocol, unbeknownst to the consumer of the service. The service object might talk to one or another remote server processes, depending upon the time of day. Or the service object might parasitically use the communication channel of an object that is passed to it as an argument, not using its own communication channel. FIG. 16 illustrates a variety of different Jini service objects communicating with remote services using different protocols/middleware, and also illustrates service objects interacting with zero, one or several different remote processes.

This flexible notion of the Jini service object brings true object-oriented encapsulation or hiding of service implementation to network computing in a way that earlier ORB technologies couldn't even approach. This hiding of implementation, protocols and middleware permits us to move away from the paradigm of interoperability through agreed-upon protocols. In Jini network service computing, what becomes important is agreeing upon the API. Consumers of services cease to care what communication technology is underlying the fulfillment of the service. Indeed, that implementation can change over time, as technology progresses, without breaking clients. The price to pay for this flexibility is that one needs to participate in a Java-centric universe.

Just to illustrate how different this model is from anything that has come previously, consider a service, available for use by numerically-oriented applications, which, say, solves a system of linear equations, or perhaps does a systems optimization via Karmarker's algorithm. Such a service might be implemented so that if one passed in null as the value of the payment field, the computation is performed within the client's CPU; but if one passed in a funds-transfer authorization object, of the required amount, the computation is performed on a remote super-computer. As another example, a service that from the outside performed the functional equivalent of a point-to-point socket connection between remote processes. Indeed, internally, it was just passing bytes across a socket connection. But internally, it was also keeping a count of usage, and every ten seconds would forward this metering information over an out-of-band connection to a mocked-up billing service. This was a sort of analog, in software, of the Sprint ION approach to customer-premises usage metering.

Another facet of the Jini service architecture is the notion of leasing. Leasing, as a function of Jini service architecture, is purely function of the local domain. Any time resources are reserved on behalf of some participant in the Jini community, the reservation of those resources adheres to a leasing convention, sometimes known as time-limited resource allocation. The party who requests the reservation of resources will specify a lease duration. This is a time-period over which that party can assume the resource reservation will be maintained. The party requesting the lease will be issued a lease object that indicates the amount of time for which the lease has been granted (a duration that might be shorter than that requested). The requesting party should request a lease-renewal before the lease expires, if they wish the resource to be maintained on their behalf. If the requesting party should fail to renew the lease, and it expires, the provider of the resource will do whatever cleanup is appropriate. This technique of leasing helps one build self-healing systems. If a process, on whose behalf a resource is leased, should crash abruptly, the lease will eventually expire, and the system can de-allocate the resource. Things get cleaned up all by themselves. This technique of leasing is used by the Jini Lookup service that forms the core of Jini communities. When a provider of a service registers a service object with the Lookup Service, that registration is only valid until the lease expires. Service provider processes will typically run a background thread that periodically wakes up to perform the lease-renewal chore. Leasing is also used in Jini's event management model. Subscribers to event topics will specify a lease duration. If they fail to renew the lease, the events will stop being published to them. One of the key premises of this proposal is that the notion of leasing is expanded to include payment for services rendered in accordance with exemplary embodiments of the present invention. Any request for reservation of some resource on behalf of some party on the Network should entail the movement of dollars to pay for the resource, thus putting the architecture on a sound economic basis, and bringing it into line with how we expect the everyday world of commerce to function. These issues are discussed in more detail elsewhere herein.

Finally, Jini differs from other distributed computing technologies with regard to its flexibility for looking up services via various criteria. Jini allows one to either look up services according to their Java interface type or according to matching against one or more attributes with which the service registered itself. A combination of these two lookup approaches can also be used. This provides a richer range of service lookup than the simple common name string typical of distributed computing technologies.

Summarizing this section, a key feature of Jini network service technology that makes it a candidate as the key enabler of a next-generation Internet service platform is its ability to move arbitrary implementation code from the Lookup Service out to client processes on the network. This allows us to build a range of services that cover a spectrum from the lowest level core micro-services (such as point-to-point IP connections over allocated lambdas) all the way up to high-level domain-specific applications. Indeed, Jini services can quite literally embody the convergence of computation and communications, casting both uniformly into a single notion of a network service that can be looked up and used at runtime.

Architectural Notes

This appendix gives a brief sketch of some of the major architectural components in the proposed service-hosting platform.

A key assumption is that we will define logical management domains to partition our hosting universe into manageable chunks. In accordance with exemplary embodiments of the present invention, several management domains are defined, at least one per geographic hosting center location, though a given large hosting center may well encompass several management domains. Furthermore, each given management domain will be entirely confined within one specific hosting center.

Every resource, such as a CPU, as well as all the software resources running on CPUs, will be considered to belong to one specific management domain. In accordance with other exemplary embodiments of the present invention, the local networks are designed or tuned such that all resources within a given management domain are within multicast radius of all the Jini Lookup services that also belong to that domain. This assumption permits all Jini services within a given management domain to have mutual visibility via local Jini lookup, without extra overhead of global lookup.

The following is a discussion of some of the major components of embodiments of the present invention, comprising the platform architecture.

CPU Hosts:

Hosted services and infrastructure components ride on general-purpose CPU hosts. Every CPU belongs to exactly one management domain.

Jini Lookup Services:

Includes both Jini Lookup Service instances for local "multicast radius" lookup chores, but also Jini Lookup Services that are targeted for global Internet lookup and bound to a given topic area of the global service topic space. The ones dedicated to local lookup will probably be launched via boot script. The ones that serve global lookup duty will be launched dynamically, perhaps with the help of the HeavyProcessLauncher described below.

Directory Service Components:

All management domains will contain components comprising the distributed, replicated, scalable directory infrastructure that provides global Internet access to the Jini Lookup servers bound to various directory topics. Several design options are possible for the directory infrastructure remains. It might largely be based upon a commercial directory, similar to the design of iPlanet, or instead it might be custom built. Even commercial LDAP will require additional infrastructure will be required in order to add the leasing semantics of directory entries, something missing from off-the-shelf LDAP servers. The API includes methods for: navigating the directory tree, adding topics to the tree, binding one or more Jini Lookup Services (their unicast discovery URLs) to a given topic, finding one ol the Lookup URLs bound to a specific topic, finding all of the Lookup URLs bound to a topic, renewing a lease on a Lookup Service that is bound to a topic.

Service-Hosting Container Processes:

The service containers are realized as JVM heavy-weight processes which get launched from boot scripts as the host is booted. The service containers are the multi-threaded servers that provide a place in which multiple service instances reside, each executing its own thread or threads of execution. We may also make the service containers be, themselves, Jini services that can be looked up using Jini Lookup services. So, they are at once a Jini service and a home in which most other Jini services run. In this bootstrap capacity, the service containers are one of the few components in the whole show that gets launched at boot time. Most other services get dynamically deployed via API calls.

[Note that Jini Lookup is not the only means we could employ for finding a handle to a service container. Another option is to register the service containers within RMI registry. The URL for connecting to a specific service container (e.g. "rmi://lambic.wcomnet.com/serviceContainer13/") could be stored within the inventory database. A service supplier would query the inventory database for the URL then do a conventional RMI lookup against that URL.]

The primary API method allows a requester to start a service executing in the service container, supplying parameters that identify the URL for the code-base of the service code, the fully-qualified class name of the Java object that is the service's root object, and initialization payload object. Other methods are provided to allow a service to be abruptly shut down, allow the service to be gracefully quiesced (requested to stop accepting incoming requests, but carry to completion in-flight requests), and allow one to query whether the service is in a quiescent state.

Note that in accordance with the present invention, service suppliers (or their console applications) do not directly invoke the service container's methods for launching a service. It is rather the management agent that oversees the life-cycle of the service instance who calls the method that launches the service. The service supplier (or their console) rather makes a request to the ServiceMasterRecord (see below) service to requisition the launching of a service. The ServiceMasterRecord will see to it that a management agent is created and handed the responsibility of launching the service and overseeing the remainder of the services' life-cycle.

Service Master Record Service:

In accordance with exemplary embodiments of the present invention, a ServiceMasterRecord is an integral component in the strategy for managing the many thousands (or even millions) of service instances that will be riding on the proposed service-hosting infrastructure.

The ServiceMasterRecord can be thought of as the definitive MasterRecord of all the service instances that are supposed to be running at any given moment within a management domain. As such, there will be exactly one ServiceMasterRecord process running within each management domain. The records within the ServiceMasterRecord represent the ideal state of the universe within the management domain, with regard to what is supposed to be running. At any given moment, the actual state of the universe may differ from that ideal. It is the goal of the service management strategy to keep the deltas between the actual and the ideal reduced as close to 0 as possible at any given time.

Since the ServiceMasterRecord is the definitive record of what should be running, this service demands high fault-tolerance. The data within the MasterRecord needs to be persisted in an industrial-strength database, such as Oracle. The data contained in the database should be replicated over to one or more standby databases. We need to monitor the health of the ServiceMasterRecord process and fail-over to a backup process should it or its CPU crash.

The ServiceMasterRecord provides the interface that service suppliers exercise in order to effect the launching of a service. Its primary exposed method allows one to request that a service be launched, and pass in parameters that give the URL of the service's codebase, the fully-qualified class name of the service's root object, an initialization payload, as well as the management agent object. The management agent object that is supplied by the service supplier can encapsulate all sorts of policy behavior. It can choose to launch the service in one specific container, choose among available service containers in the management domain that are owned by the service supplier, etc.

The ServiceMasterRecord provides a fault-tolerant record of what is supposed to be running, not a place where one looks up running services. Looking up services is done with conventional Jini Lookup. The philosophy of Jini Lookup follows the leasing model: A service remains registered only so long as it keeps expressing interest via lease renewal. The ServiceMasterRecord adopts the opposite philosophy: A record indicating a service that is supposed to be running is maintained (at all costs) until someone explicitly says to kill the service and remove the record. However, in accordance with exemplary embodiments of the present invention, the leasing model is implemented in another way in the ServiceMasterRecord. Each record, representing a service, contains a field indicating which ManagementAgentService (see below) instance contains the responsible agent that is managing the service. The ManagementAgent needs to maintain the lease upon the affiliation between service instance and ManagementAgentService.

Management Agent Service:

This is itself a Jini service running in a service container. The ManagementAgentService collaborates with the ServiceMasterRecord to implement our service management strategy. The ManagementAgentService forms a sort of container in which the ManagementAgent objects run their own threads of control. Each ManagementAgentService contains many ManagementAgent instances. A given management domain will typically contain several ManagementAgentService instances, to balance the load and provide fault tolerance. When a service supplier posts a request to the ServiceMasterRecord for the launching of a service, the ServiceMasterRecord will choose one of the ManagementAgentServices (perhaps at random) within the management domain. That selected ManagementAgentService will then be streamed the ManagementAgent object and all the parameters that specify the service to be launched. The ManagementAgent will launch the service and oversee the service's life-cycle. The ManagementAgent will also renew the lease on the affiliation between the service and itself as the responsible agent. Should the lease expire due to a ManagementAgentService crashing, the ServiceMasterRecord will enlist a new ManagementAgentService to oversee the life-cycle of the service.

Management Agent:

This is a serializable object, rather than a service, which comes from the service supplier and runs within the ManagementAgentService. It's responsibilities include: renew the lease in the ServiceMasterRecord that expresses its affiliation with the service instance; do the initial launch of the service instance; monitor the health of the service instance; and if necessary, launch a replacement of the service in a new container, should the original service become unviable.

Heavy Process Launcher:

This component (in accordance with one exemplary embodiment is a heavy process itself, executed via boot script provides an API that allows requesters to request that a heavyweight process be forked. In accordance with exemplary embodiments of the present invention, each CPU runs one of these. These may be used, in accordance with exemplary embodiments of the present invention, to permit a new Jini Lookup service to be launched when a client requests the creation of a Jini Lookup and that it be bound to a directory topic. The HeavyProcessLauncher is itself a Jini service. Local Jini lookup can find the HeavyProcessLauncher on any given CPU host by filtering the service lookup by the host-name attribute. Requests to the HeavyProcessLauncher will typically come from ManagementAgents running in ManagementAgentServices. While the typical ManagementAgent sees to the dynamic launching of Jini services into a service container, some ManagementAgents will see to the deployment of a service by requesting the HeavyProcessLauncher to do a process exec on a specific CPU. Again, this may be the approach that we use to launch the global Jini Lookup services that are bound to topic areas in the directory.

Utility Databases:

Relational database will be employed for a number of duties in the basic functioning of the service-hosting platform. Each management domain will, for instance, have database tables that describe inventory for the management domain. Inventory can include available CPUs, and service containers, with attributes indicating who (if anyone) owns the container (i.e., leases it) and on which CPU it runs. Jini services will probably be supplied to provide an API to put a face onto access to such inventory data.

Global Lookup Agent:

This component is tentative, and plays a role of coordinating the registration of Jini Lookup unicast discovery URLs in the global directory service. This component is a sort of daemon that sits there waiting for discovery events when Jini Lookup services launch. It checks the group name of the Lookup service, and if the name matches a conventional pattern that indicates that the Lookup is to be bound into the global directory, then this agent performs that binding operation. The agent might also be responsible for renewing the registration lease for the binding in the global directory. More refinement of details for managing dynamically-launched Jini Lookup services needs to be done.

Method and System for Providing a Distributed Service Hosting Infrastructure Platform (dSHIP)

dSHIP Distributed Service Hosting Infrastructure Platform

Jini network service technology, in its basic form, is oriented toward services with local visibility. dSHIP, in accordance with exemplary embodiments of the present invention, bring network-oriented software services based upon Sun Microsystems' "Jini" technology into visibility on the worldwide public Internet to allow consumers and businesses anywhere (with Internet access) to find and use Jini services, irrespective of physical or multicast proximity, overcoming the local nature of basic Jini technology.

A telecommunications company, cannot invent all the potentially useful, specialized network services that could be offered. A platform that facilitates third party entrepreneurs in bringing their concepts to market can benefit both carrier and entrepreneur.

Bringing new network service ideas from concept to deployment can be extremely slow and expensive at the present time. Even outsourcing the hosting of network services, using current ASP or MSP models, can pose enormous barriers to the small entrepreneur. Offering a service hosting platform that enables inventors and providers of software services (whether those providers be the telco or third-parties) to dynamically deploy or home their services onto farms of computer CPU resources within network facilities, can speed time to market and facilitate scaling of services on demand.

Allow small entrepreneurs with limited funding resources to get their network-based services into deployment on the Internet with very low cost of entry, permitting them to rent even a fraction of a CPU. This overcomes the problem of small third-parties entering the network services business during a time of tight venture capital.

Network based services have traditionally required such great up-front capital that potential builders of these services who lack such funding may be driven to pursue alternative technologies, especially peer-to-peer, that don't require costly central infrastructure beyond public networks. dSHIP aims to be inclusive, not driving the small entrepreneur toward P2P solutions that do an end-run around central service providers. dSHIP aims to keep the telecom carrier in the revenue loop, collecting fees for leased computational, storage and network resources.

The present industry direction toward Web Services architectures will fall short of realizing the potential of software services on the Internet due to Web Services' relatively static nature and lack of code mobility from machine to machine. While XML-document-based Web Service architectures allow remote invocation of network services on the Internet, and these services are well-suited for many business applications, many potential network services require richer behavior and a more dynamic environment than what can readily be supported by document exchange. Applications, such as online multi-user gaming, may require greater efficiencies than those available with exchange of ASCII documents, and may require multicast protocols, not supported by industry-standard Web Services. Many applications of network service architectures, in such areas as consumer/entertainment/gaming and scientific/technical applications, can also greatly benefit from real-time mobility of code, something that is missing from XML-based Web Services. An Internet software services architecture based upon Jini and Java, with its inherent code-mobility, can facilitate offering such richer network applications. Even as far back as the classic 1990 paper, "The Lessons of Lucasfilm's Habitat", Morningstar and Farmer indicate that rich cyberspace applications need the ability for object classes to "migrate from machine to machine" (a capability missing from their Habitat application).

Many online ventures have failed due to a lack of sound economic basis where money flows in payment for services rendered. Too much of value on the "Web" has been free, leading to myriad failed businesses, plunging stock prices and the possible onset of an economic recession. dSHIP aims to add sound economics at the services layer, not repeating the sins of the past with respect to the free Internet. While some existing online services do charge fees, the models of money flow are too coarse-grained to permit very small transactions. There are potentially many minor services that millions of consumers might gladly spend a fraction of a cent for and which could thrive in an environment that supports fine-grain payment; but which will fail even at a price-point as small as a dollar. Other cumbersome subscription models are constrictive and convoluted to the consumer. dSHIP aims to allow the consumer to use any attractive services they find, on a pay-as-you-go basis, much as one would shop and buy at a shopping mall. In fact dSHIP strives to build a micro economy where money flows in real-time through value-chains, just as other forms of information flow.

Billing consumers for use of online services and applications presents a dilemma. While flat monthly fees for subscription-based services are very convenient for consumers, this model has its drawbacks. The flat rate model lacks a sound economic footing, since it creates a perverse situation where the service provider wishes that their customers not make use of the service—profits go down as average consumption goes up. Flat billing for some bundled package also discourages the consumer from making fine-tuned choices of what they consume. On the other hand, pay-as-you-go approaches with a "ticking meter" can be nerve rattling to the consumer. Incessant prompts to authorize small payments can be annoying, while the absence of such prompts carries the frightening specter of catastrophic personal loss. The dSHIP approach to consumer billing attempts to resolve these competing tensions.

The public Internet has had a high degree of anonymity. This "Wild West" climate has led to security problems. Requiring identity during nearly all online interactions with services (as well as payment for services rendered) can go a long way toward making the Internet more secure, safe and civilized by adding a level of accountability.

Technology advances in networking are providing increases in bandwidth capacity at an accelerating rate. However, the speed of light barrier means that communications latency between fixed points cannot be reduced below some minimum value. As applications become more distributed in the future, latency will likely cause increasing pain. The only known way to reduce latency between communicating processes is to reduce the physical distance between those processes. In accordance with exemplary embodiments of the present invention, the dSHIP platform, by facilitating the dynamic homing of processes to hosting centers can allow the latency barrier (for some applications) to be reduced by bringing the communicating processes into proximity within a hosting center.

Peer-to-peer technologies allow small entrepreneurs to bring network-oriented services to market and can do an end-run around attempts by service providers to offer centrally oriented network services. An example P2P infrastructure platform, which could compete with dSHIP by providing entrepreneurs with an alternative to service hosting for realizing distributed network services, is Sun's JXTA architecture for peer-to-peer programming.

The emerging Web Services architecture based on XML document exchange, the SOAP protocol and other protocols offers a somewhat similar concept of making focused services available on the public Internet. Web Services differ from dSHIP in being programming language neutral (while dSHIP is centered around Java) and not supporting dynamic code mobility.

CORBA is another architecture upon which commercial services could be deployed on the public Internet. CORBA at an Internet scope never thrived, and CORBA usage has mainly been within enterprises. CORBA, like Web Services, has centered about language and platform neutrality, and lacks dynamic code mobility.

Proprietary online gaming hosting platforms are emerging. These are somewhat competitive with dSHIP, since online entertainment and gaming applications are a likely "sweet spot" for the dSHIP platform. One infrastructure provider for building online gaming supporting massively multi-player games is the company RebelArts with their "VAST" platform. Another online gaming infrastructure provider is GameSpy.net. Canal+ offers a massive gaming-hosting center. Other ventures allow consumers to self-publish music or video content. Sony "ScreenBlast" is an example. To the best of my knowledge, none of the existing gaming hosting and infrastructure platforms is based upon Jini services, or has the dynamic service deployment features and code mobility to clients that is embodied in dSHIP.

Terraspring offers an infrastructure that can be used by xSP players to facilitate hosting and providing CPU and storage capacity on demand. They implement virtual LANs and farms of CPUs that can be booted (under various operating systems) off of network storage (rather than local drives), allowing new CPUs to be allocated on demand as customer resource needs grow. This is somewhat similar to dSHIP, but is at a lower layer and does not provide a network services model. Terraspring provides techniques for CPU and networking resources on demand that can underlie any hosting scenario, whether corporate computing, Web Services or standard web hosting. In fact Terraspring could provide a nice CPU and networking infrastructure upon which dSHIP could be built.

A European venture, called FETISH, in the online travel industry vertical space, has built a system with Internet scope based upon Jini technology. FETISH differs from dSHIP in that it is an industry-specific vertical application that is built on Jini. Unlike dSHIP, it is not a horizontal platform for deploying any sort of network-based service.

Numerous online or electronic payment systems are in existence. Some only support coarse-grained monetary transactions. No ultra-fine-grain payment systems (to the best of my knowledge) are in widespread use at this time. I've heard of activities existing in this area, but I don't know specific names of ventures.

The Web Services UDDI directory offers a public directory for finding Web Services that match queries against specified attributes. This differs from dSHIP's primary approach of arranging Lookup services within hierarchical topic space. dSHIP also offers geodetic (coordinate systems indexing) based lookup that is not supported in UDDI.

HP E-Speak/E-Services technology offered a hierarchical topic space categorization of their online e-services. HP E-Speak/E-Services platform, however, offered services based upon XML document exchange (similar to emerging industry standard Web Services . . . indeed HP is evolving their e-services offering into a Web Services offering). HP did not offer logical topic trees for lookup of Jini or Java centered online services. It also did not support geodetic lookup of service based upon proximity in a mathematical coordinate system.

Prior mobile agents systems, such as IBM Aglets, ObjectSpace Voyager and General Magic's various products, have provided the means for bringing communicating agents into proximity, hence overcoming communications latencies. These technologies have not thrived commercially, perhaps partly due to the lack of service providers deploying "places" (processes running on physical computers) where participants can dispatch their agents. dSHIP emphasizes the service provider hosting aspect, not just a package of software infrastructure. It provides the physical "place" on the network to which service processes (and given mobile agent container services) can be homed in real-time.

USENET discussion forums have, for many years, offered a hierarchical topic space of discussion groups on the Internet. Users conceptually navigate to a topic node in the subject tree. Then one makes use of a specific network service within that topic context. This specific USENET service permits posting and reading messages. dSHIP is very much in the spirit of USENET categories of topics, but allows virtually any conceivable online service to be placed into a topic area and accessed by consumers—not just the single, wired-in discussion service characteristic of USENET.

The following explains how dSHIP solves problems outlined above in accordance with various exemplary embodiments of the present invention, and their advantages over existing approaches.

In accordance with one exemplary embodiment of the present invention, dSHIP expands the visibility of Jini services to the scope of the public Internet by binding Jini lookup services to logical nodes in a hierarchical topic space, implemented as a directory service. The directory is highly replicated for scaling to large access volumes. Users or applications navigate the directory to logical topics, then employ Jini Lookup calls to find services scoped to a topic. Hybridizing directories with Jini service lookup avoids "hops" through multiple Jini Lookups in pursuit of services, which can happen in alternative federated approaches. The present approach allows clients to "discover" Jini Lookups in logical regions (topics) in cyberspace, independent of proximity (in a network router hop sense) from the Jini Lookup process. dSHIP also front-ends Jini Lookup with at least one alternative navigational system, besides logical topic trees. dSHIP also offers "geodetic" lookup wherein a Jini Lookup service may be logically bound to a coordinate position in some mathematical coordinate system. Implementation would leverage a geodetic database, such as Informix loaded with its geodetic "blade". Other possible implementations of the geodetic database could include a geodetic layer of logic over JavaSpaces tuple-space engine. Users and applications can "discover" Jini Lookup engines bound to "locations" within some bounding region about a user-specified coordinate position. This allows, for example, mobile devices that are location-aware (e.g. via GPS technology) and have Internet access to search for services that have virtual or logical geographic proximity to them (even though the deployed service process might be physically running on a host anywhere on the Internet). In the two above-described ways, dSHIP augments Jini multicast discovery on a local network to Jini discovery in logical categories and virtual coordinate systems in cyberspace.

In accordance with another exemplary embodiment of the present invention, dSHIP presents service developers with APIs that permit them to lease service containers on demand, and deploy largely arbitrary software services of their creation, in real time, to containers they lease. We call this "frictionless deployment" and can happen without human intervention. A fraction of a CPU can be leased by an organization. This permits small startups to share a CPU, thereby lowering cost of entry. Most hosting provider models (other than rudimentary web hosting) do not offer granularity to customers finer than the CPU. This ability to lease less than a whole CPU is achieved by running several generic service containers on each CPU. A typical number might be ten or more container processes per CPU. A customer may lease one or more container processes, and then has exclusive use of these leased containers. In this way, customers may share the available CPU cycles when different customers are leasing containers on the same CPU; or a given customer can effectively monopolize a given CPU by leasing all of the containers on that CPU. There are two feasible alternative approaches to billing. We could charge a flat rate per container process that is leased. Or we could meter the CPU-seconds of usage by each container process and bill the lesser proportionally to usage. The flat rate approach is more suited to the case where one organization leases all containers on a CPU. The usage-based approach is better suited when a CPU is shared. The leasing of fractions of a CPU allows the price of entry to be small enough to enable the small entrepreneur to get to market without large capital backing. Dynamic leasing of CPU resources and dynamic deployment of services also facilitates scaling up to meet growth in demand. Alternative hosting models often lack the zero-latency capability of leasing resources through API calls. Entry price points of most existing hosting solutions may also be well beyond the means of the proverbial "two kids in a garage" who seem to historically generate the freshest ideas, but have access to the least resources, especially in the current difficult funding climate.

As a sidebar, leasing in the Guardian Angel approach to management, using a lease on the affiliation between an Angel and a managed service. Leasing is also used in the dSHIP topic tree directory or geodetic engine. The binding of a Jini Lookup to a topic node or coordinate position is leased and is purged if the lease is not regularly renewed. The implementation of the leasing mechanism for these applications does not use any Sun code, however.

dSHIP relies heavily upon mobile code to create a level of flexibility and dynamicism missing from Web Services based upon XML and SOAP. Streaming service implementation code to clients allows service logic to be carried out in any process space, including the client's, not just in one single remote server. Mobile code allows objects, complete with behavior and code that implements the behavior, to be streamed out to the client process space in real time. Objects that client processes have never seen before can enter their process space. This can allow such applications as 3D shared virtual worlds to gain richness as time passes, with new kinds of entities entering the virtual world, not being pinned to the state existing at some static compile time. The classic paper by Morningstar and Farmer cited above points out the rich possibilities that this opens up in virtual environments. Mobile code also permits service interfaces to hide various protocols, even non-standard ones. There are no barriers against the service implementer using, for instance, multicast . . . at least no barriers from the service architecture. Direct peer-to-peer connections can also be supported within the dSHIP and Jini service models—all interaction does not need to be channeled through a remote server. By contrast, within the world of XML/SOAP based Web Services, the protocols used are dictated by the state of the agreed-upon industry standards, not upon the unique needs of a particular service. XML document exchange over H-ITTP may also be too inefficient for such applications as real time gaming. Web Services may be adequate for business applications, but are likely to run out of steam when faced with richer application areas in the consumer/entertainment/gaming space.

Mobility need not stop with two-dimensional or terrestrial multicast methods. For instance, a client could move in space, and GPS coordinates could be fed to a client proxy object, and that proxy could from time to time look up and connect to different Jini service processes, using the dSHIP geodetic discovery to lookup services registered in different Jini Lookups bound to different coordinate positions. But outside of the above-described exemplary embodiment, by and large the assumption is that a client handle to a service is generally connected to the same remote server process for the duration, except whenever a failure occurs (and a smart reconnect proxy finds another remote service).

In accordance with still another exemplary embodiments of the present invention, dSHTP is a system where everything is based upon payment for services rendered. Payment is required for service suppliers to lease CPUs and other resources. Service suppliers, in turn, will generally require payment for consumption of their services. Rather than trying to come up with complex subscription systems with endless variations, dSHIP adopts a very simple model to support placing services on a sound economic basis. The approach of present invention as embodiment in dSHIP, adopts a debit model where money from the external world should first exist within a participant's account in order for them to do anything. Money then just flows through the system, a sort of economic microcosm, through the simple transfer of monetary units from account to account, accomplished by a very simple API of a central banking service. This API is discussed more fully later in this document. All participants within the dSHIP universe should have identities and accounts established in order for them to participate. The telco provides a core funds transfer service that allows movement of funds (down to 1 millionth of a dollar) from account to account. Service suppliers are free to incorporate the use of the funds transfer service into their APIs to exact payment for use of a service. The basis of funds transfer is an API that allows consumers to request a funds transfer authorization object from a central bank, a bit like a voucher or check made out in a specific amount to a specific receiver. The funds transfer authorization can be passed in calls to service suppliers, who can then "cash it in" to the central bank, completing the debit of consumer account and credit of supplier account. "One-shot" behavior prevents cashing in the same voucher twice. The entire payment system is debit-based. Everyone has a wallet. You move money from the external world (say via credit card) into your dSHIP wallet. You then access (or supply) services, and money moves from wallet to wallet. There is no billing, per se. All flow of money happens in real time. Service suppliers are expected to supply, in their service APIs, methods that allow consumers to query for price quotes and allow consumers to pass payment to suppliers. Service suppliers are free to implement any sophisticated capabilities, such as negotiation, as they wish. Also, end-consumer applications may automatically extract payment from a consumer's authorized payment agent (under policy control). This aspect of dSHIP is discussed below.

dSHIP addresses the dilemma of convenient end-consumer billing by implementing a policy-based payment engine on the dSHIP client environment. Services that provide an end-user application experience, and which the consumer "invites" into their space via lookup and selection, will be allowed to request payments for services rendered from the local (client-side) payment agent. This software agent is authorized to make payments on behalf of the consumer without consumer intervention (usually). But the payment agent acts subject to consumer-specified policy regulating constraints upon allowed payments. Such constraints can include maximum transfers allowed in a single transaction, caps upon total spending per second, minute, hour, day, week or month, etc. These serve as safeguards to prevent the consumer from spending more than they know is in their best interest. But at the same time, the consumer can freely experience any application on the platform without cumbersome, up-front subscription models or the hassle of incessant prompts requesting approval for every fraction of a penny payment. The consumer is safeguarded against catastrophic loss. (The debit nature of the account system also protects the consumer. Everything stops working when their account runs dry. We could easily augment the model to allow spending on credit by supporting negative account balances. More thought is needed to determine whether this enhancement is wise.) Even though a meter is "ticking" as the consumer engages in use of services, we hope that the policy-based safeguards make the online consumer experience enjoyable, worry-free and responsible.

dSHIP addresses the problems associated with anonymity on the Internet by requiring all participants to establish an identity and account on the system, in accordance with other exemplary embodiments of the present invention. This is closely coupled to the payment system described above, which depends upon identity and accounts. Any service on the platform may require a service consumer to identify themselves and prove their identity via a core authentication service, which might perhaps use "trusted third party" (TTP) techniques, similar to Kerberos. The combination of identity and requirement of payment for services can go a long way toward stopping cyber-crime. Denial-of-service (DoS) attacks would not be made if doing so debited the perpetrator's account. Identity can also help add accountability for those who introduce malicious code into the system.

dSHIP addresses the "latency barrier" in two ways, one direct and the other indirect. Dynamic deployment of services into containers provides a reasonably convenient way for multiples parties to make sure that software entities that need to do rapid communication with each other are homed to the same hosting center, or even the same CPU. Basically, in accordance with the present invention, JVMs try to load classes on the fly the first time they need them. But they don't generally unload them. Once a class is loaded, it stays where it was loaded. Generally, a new version of the same class cannot even be loaded (although it is possible to do some tricks with alternate code bases). But services are generally focused things. There should be some reasonable number of classes required to build a service. The code does not get moved over and over again from the HTTPD, just once. Beyond this direct approach, the telco/network service provider or a third-party service supplier could implement a service whose function is to serve as a place for mobile agents from multiple parties to reside. Such a mobile agent container would allow objects (each with their autonomous thread of control) from different business organizations (or consumers) to coexist within the same heavyweight process space, and interact rapidly with each other. There are no competing approaches to reducing latency other than moving communicating processes into proximity, due to the speed of light barrier. Other competing approaches to hosting lack real-time dynamic deployment capabilities of dSHIP to practically realize this model of latency reduction via almost instantly homing processes close to each other.

Mobile agents are not crucial to dSHIP. dSHIP stands without mobile agents. But mobile agent containers (places where mobile agents live and interact) typify one example of a service that we or a third party supplier might deploy. Mobile agents exist without dSHIP and dSHIP without mobile agents. A service container is owned by a single participant (usually a service supplier company), and all service code running in a container process comes from the same supplier. The mobile agent container is similar, except that it is realized as a dSHIP service running in a service container; but the mobile agent container allows mobile agents from many different participants to all cohabit the same agent container. It's a place for very lightweight entities from different companies or consumers to interact in the same process space. Creating agent containers that are safe from different suppliers' code interacting adversely is an active research area.

DETAILED DESCRIPTION OF AN EXEMPLARY EMBODIMENT dSHIP provides a platform for delivery of network-based software services that are built upon the Java language and Jini service architecture. In accordance with exemplary embodiments of the present invention, dSHIIP provides a hosting model for providers of services to deploy their services onto managed hardware resources and in accordance with another, dSHIP provides a lookup capability for service consumers to find and access services from devices with Internet access, and in accordance with still another, dSHIP provides a method of placing delivery of services upon a sound economic basis where consumers can pay (down to small fractions of a dollar) for services rendered.

dSHIP builds upon the experiences of the WorldCom NewWave OSS platform to provide a network services architecture suitable for offering commercial services for consumption on the Internet. dSHIP is all about revenue generation, in contrast to internal operations support. Like NewWave, it adopts and builds upon the Jini service model as the approach to realizing network services. The stereotypical usage of Jini services is in a local area network context. NewWave expanded upon this common usage, applying Jini in an enterprise-wide context. dSHIP takes the next step, exposing Jini services in a worldwide Internet context. The first defining feature of dSHIP is therefore visibility of Jini services on the public Internet.

Figure 17:
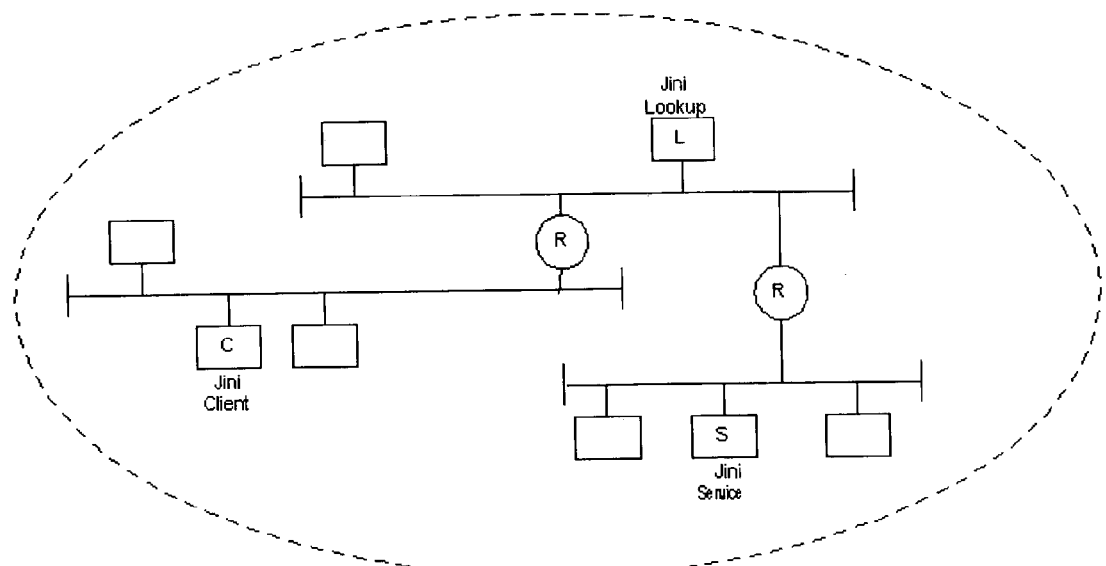
FIG. 17 shows moving Jini services from a local area network scope to world-wide visibility on the Internet in accordance with an exemplary embodiment of the present invention.
Figure 17:
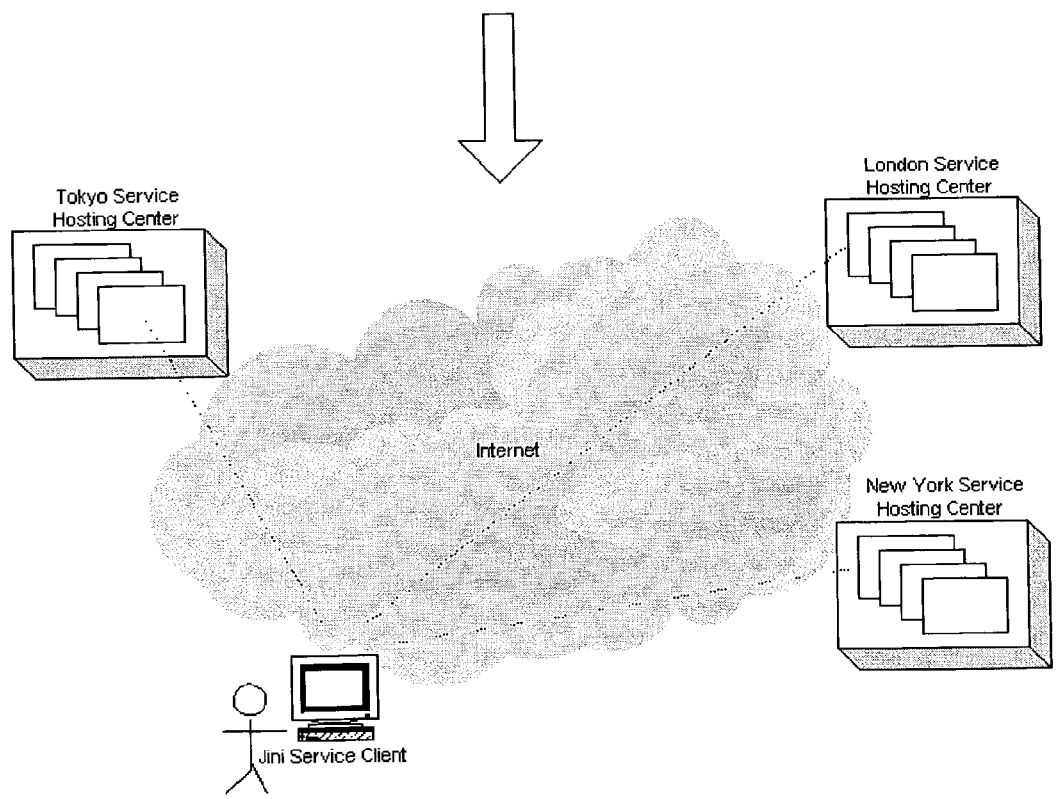

FIG. 17 schematically illustrates the move from Jini as an enabler of services with local visibility to Jini as a platform for services with worldwide visibility:

Recall briefly the salient points about Jini, a Jini service is something that can be looked up using criteria matching. Each service implements one or more Java interfaces. A service consumer exercises the service by making Java method calls to those interfaces that the service implements. When a client looks up a Jini service, the code implementing the service is streamed to the client. In accordance with exemplary embodiments of the present invention, that service implementation code can do an enormous range of things, such as forwarding requests to a remote server that does the work, talking to multiple remote servers, and/or carrying out logic of any complexity within the client process itself. Thus invoking the API of a Jini service can carry out activity virtually anywhere on the Internet. As with other service-oriented architectures, Jini services are primarily accessed by other services or by computer application processes. They are thus typically oriented toward system-to-system interaction. However, Jini services can also realize displayable GUI interfaces and complete applications accessed by human users. A minimal Java Swing-based client console is all that is needed to deliver Jini services-with-a-face to the human user as applications. Because of this enormous flexibility in Jini services—with uses ranging from primitive communications oriented services, behind the scenes plumbing components only of use as building blocks or micro services for creating other higher level services, all the way up to applications with a face accessed by end-users—it's sometimes hard to get one's hands around exactly what a "service" is. There is in a very real sense a bit of universality to Jini services.

The second defining feature of dSHIP addresses the supply side. dSHIP offers a hosting environment where service developers can deploy their services onto CPUs located within hosting centers. Deployment onto leased resources can be accomplished in real time via exercising APIs or by web browser interaction.

Figure 18:
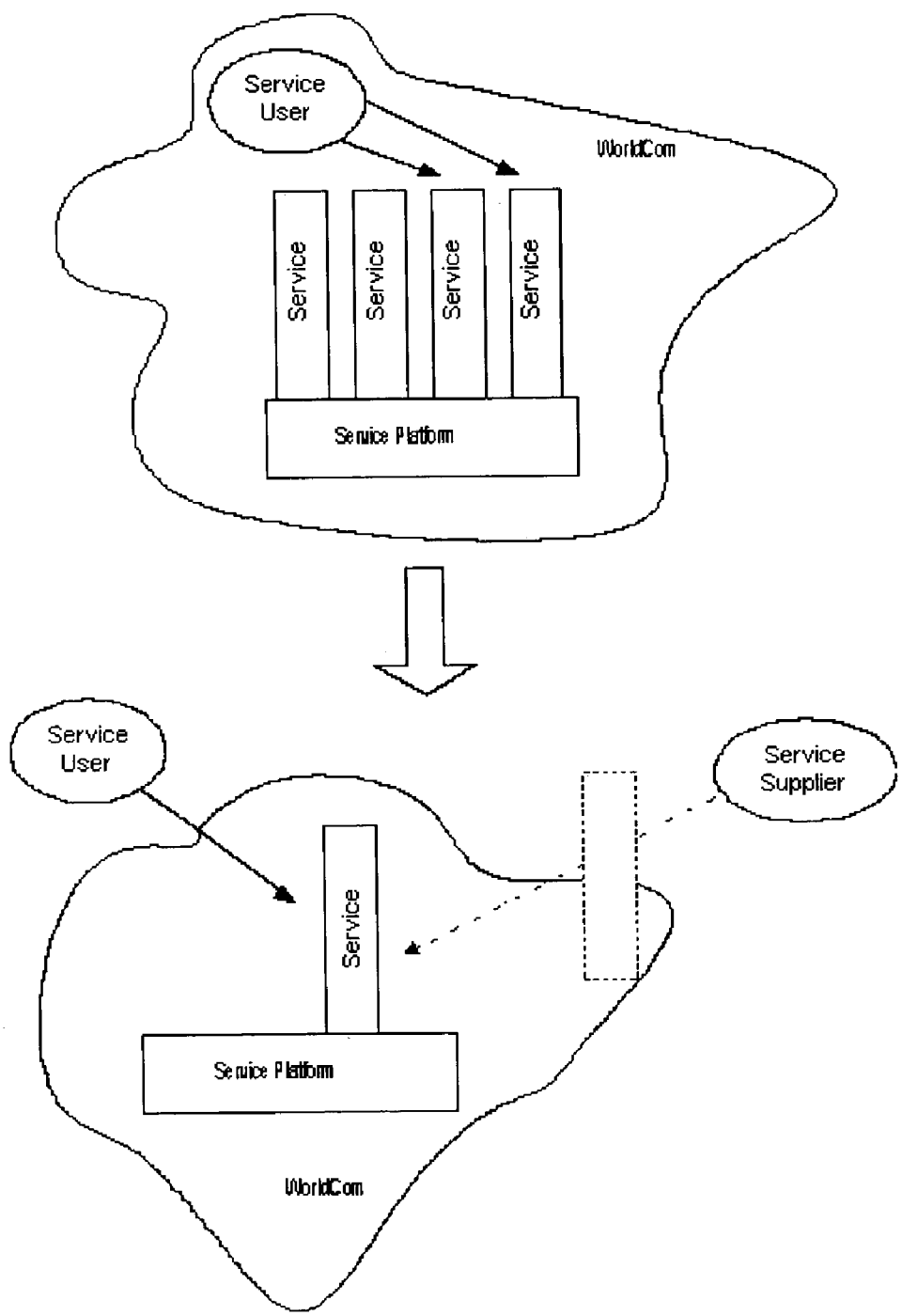
FIG. 18 demonstrates the concept of opening up the NewWave service deployment platform (especially generic service containers) so that services from outside third-parties can be loaded into the hosting provider's facilities in accordance with an exemplary embodiment of the present invention.

FIG. 18 depicts the concept of transitioning the Jini service platform beyond NewWave's use within the enterprise "bubble", and opening the platform up to third-party service suppliers in the external business world loading their services onto the telco/network service provider's dSHIP service hosting platform:

dSHIP also leverages service management techniques developed under the NewWave projects to manage the lifecycle and health of deployed services. Refer to "Angel" service management invention disclosure.

Figure 19:
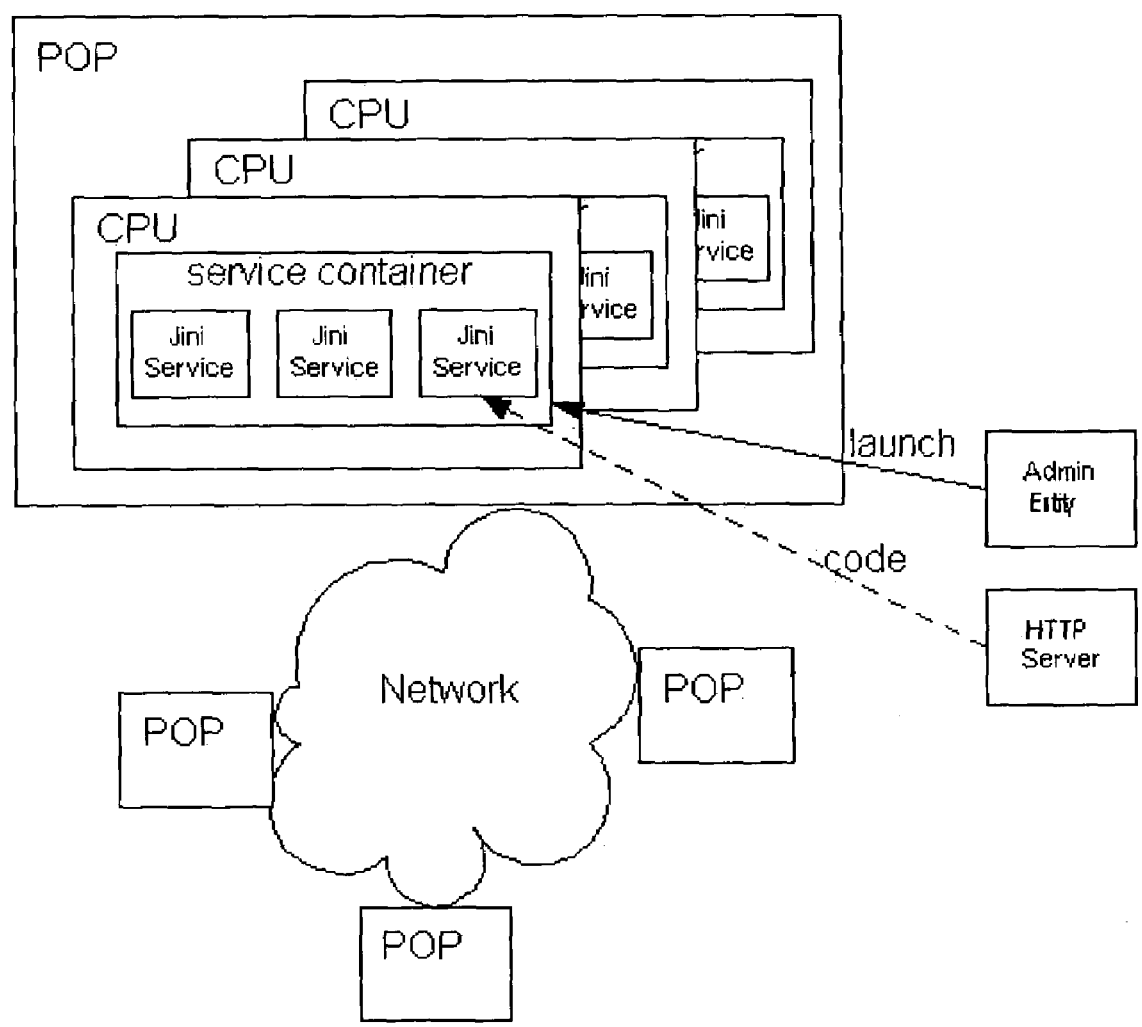
FIG. 19 illustrates the notion that each point-of-presence (POP) or hosting center contains many host CPUs, and each CPU runs service container processes, and each container process can be home to many service instances. Also illustrates that outside administrative entities can launch services into containers, and code for services comes from web servers in accordance with an exemplary embodiment of the present invention.

In dSHIP, CPUs are installed in hosting centers preloaded with at least one, and perhaps several, generic service container processes. That is to say, container processes are typically launched from boot script. These generic service containers are extensively described in previous NewWave disclosures, as described in co-pending U.S. patent application Ser. No. 09/863,456 entitled "METHOD AND SYSTEM FOR MANAGING PARTITIONED DATA RESOURCES." dSHIP hosting centers or POPs around the world, each contain racks of thousands of CPUs, each CPU hosting several service container processes, and each container process plays home to potentially many service instances, each running autonomously with its own thread or threads of control. This notion of services run within containers hosted on CPUs within POPs or hosting centers is conveyed by FIG. 19.

An inventory database and query interfaces allow service suppliers to see what containers are available. Service suppliers can lease an available container that is not already being used by someone else. A service supplier will thus acquire a portfolio of containers that they "own" (actually lease). A small entrepreneur might lease a single service container process that resides on a CPU along side containers leased by other small entrepreneurs. A large company might lease thousands of containers running on several hundred CPUs. Once the service supplier has leased a service container, they can deploy Jini service objects that they develop into any container that they "own". The various "Angel" management techniques from NewWave can be adapted to managing the deployment of services to containers and managing service lifecycle. Note that a sole party owns each container, and only the owner of the container can deploy service instances to the container. (The heavy process serves as our unit of isolation. Containers are implemented as JVM processes, and thus are a natural unit of isolation.)

Service suppliers will express their intentions of deploying a service instance by posting a service description to a sort of bulletin board that is the definitive MasterRecord of what is supposed to be running in a specific management domain in a hosting center. More details of this declarative approach to service deployment are described in co-pending U.S. patent application Ser. No. 09/863,456 on various Angel management techniques. Among the details contained in the service description arc Java class name of root service object, and URL of the codebase where the implementation code can be found on the network. This codebase URL typically corresponds to a jar file containing the service implementation code which is served up by an ordinary web server (http daemon).

In Jini, it's important to understand that there are basically two pieces of code, the server side implementation code and the client side code that implements the interface of the service. The client object(s) usually does remote calls to the server objects, but they are largely two independent sets of objects. In the simplest degenerate case, there is no server side code and all there is client code that carries out all the processing in the client address space. But that isn't the typical case. The usual case is where invoking the client methods forwards the calls to the server implementation. (But there are also other less typical scenarios where invoking the client interface results in interaction with more than one server object out there.) However, according to the typical scenario, the service supplier implements the objects that comprise the server code. They also implement the client service code that implements the interface of the service. (In many typical cases, the client code is simply the RMI stub classes that are generated by the RMI compiler, so the service developer doesn't even hand code the client code. In other cases, they may hand code custom client service classes that do more processing in the client than just forwarding remote requests to a server. These are called smart proxies.) In any case, all the code implementing the server side and client side classes are archived into jar (Java archive) files. One embodiment is to place client and server side code in separate jar files. Given the jar files, the service supplier then deploys their service. In the Angel service management and life-cycle disclosures, we've explained in gory detail how the service supplier (administrative entity) declares what they want to run, and how management agents carry out the deployment. Without getting into all that detail, disregard whether it is the service supplier or a management agent that is making the calls to carry out the service deployment, for the time being. Here is should be understood that the service containers have an API containing a method that allows service suppliers or management agents to launch a service. For instance, this method in the container interface has the form: void launchService(URL codebase, String className, Object initializationParams) The URL is just the locator for the service code. It might look like "http://myhost.wcom.com: 80/~joe/services/foo/foo-code.jar" The className just specifies the Java class of the main or root object that implements the service. When the container gets this call, it will create the root object (which in turn may create other objects), creates a thread, and invokes some agreed upon run method for the service object. This run method might do anything imaginable. But typically, it will find Jini Lookup services (in the case of dSHIP, it would usually use the directory to find Jini Lookups bound to a topic), it will then register the client access object in the Jini Lookup service(s). At this point, a server-side code running in the container has been defined, and a serialized version of the client access object is stored in the Jini Lookup services. When a client looks up the service (perhaps first discovering Jini Lookup via navigating the dSHIP topic tree), the Jini Lookup will stream to the client the serialized client access object. (Technically it's a Java marshaled object). The bytes constituting the data or state of the client access object(s) come from the Jini Lookup server directly to the client. The code implementing the client access classes, however, does not come from the Jini Lookup. It is streamed from the original HTTPD to the client. So, in summary, during launch of dSHIP (or ordinary NewWave) service, the container loads all the required classes from the specified URL, and it gets loaded from HTTPD to container process; the running service in the container then typically registers the client access object with Jini Lookup, resulting in the serialized form of the client access object (its just a byte array, not a live object) being passively stored in Jini Lookup; then when client looks up the service, this byte array gets moved out to client, deserialized and the implementation code gets loaded from the original HTTPD. When Java objects are passed around from process to process, a tag indicating the codebase gets carried along, so that when an object enters a process, if the class or classes implementing it have not been seen before and loaded, then the JVM (Java Virtual Machine) will attempt to load the classes just-in-time from the specified codebase (in our case, from the web server corresponding to the URL). All this is part of the Java/RMI/Jini stack of facilities coming from Sun.

Figure 20:
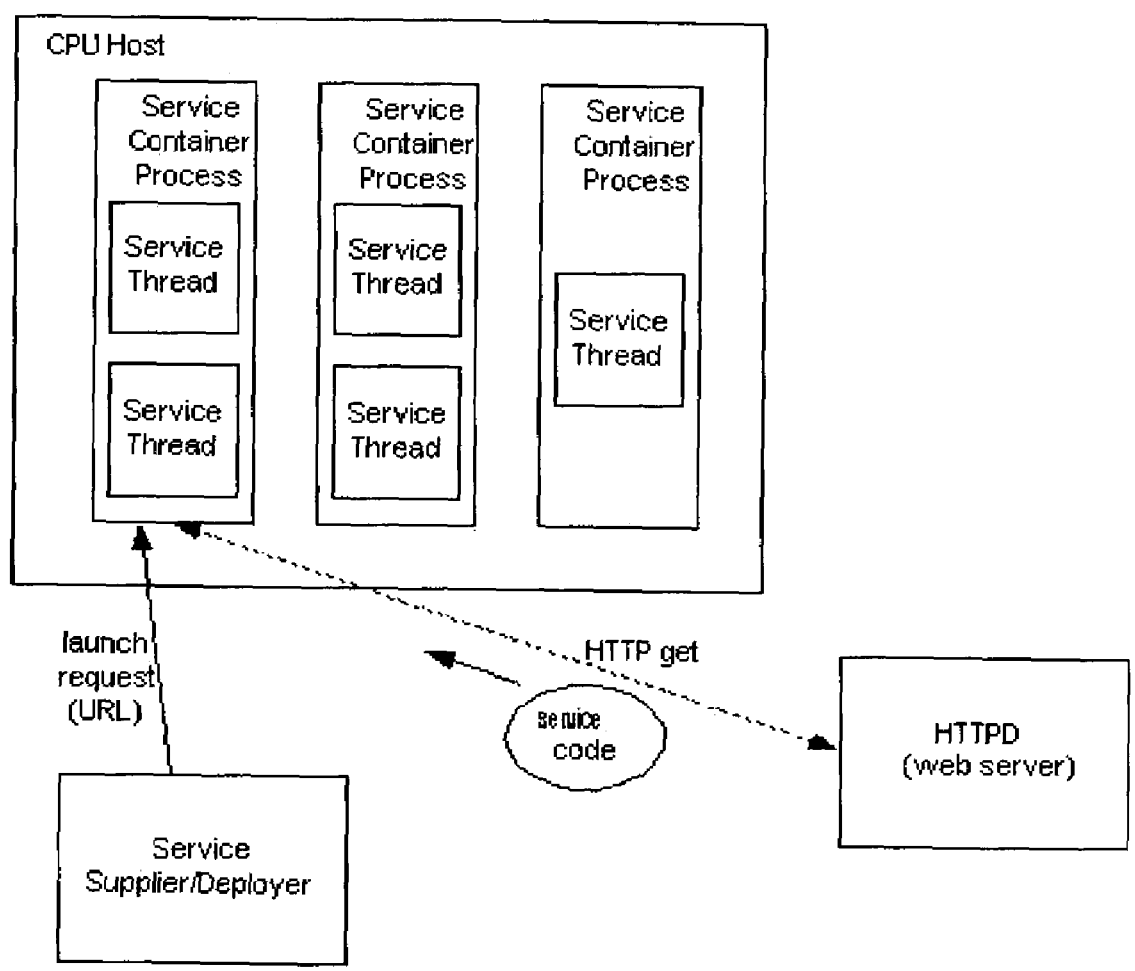
FIG. 20 is an illustration depicting that each host CPU may be running several service container processes, and services run with their own threads of control within container process in accordance with an exemplary embodiment of the present invention.

These "code servers" can be anywhere on the Internet, either within the telco's hosting centers, or externally located at service supplier's own facilities. FIG. 20 depicts service implementation code being served up to the hosting container from an httpd web server located somewhere on the Internet:

Various approaches have been used within NewWave to extend visibility of Jini services to enterprise scope as described in U.S. patent application Ser. No. 09/863,456. In dSHIP, at least two different techniques are realized for making Jini services visible on the public Internet. These techniques are distinct from those used by NewWave in an enterprise context. In accordance with an exemplary embodiment of the present invention, the first approach is to deploy a scalable directory service that implements a hierarchical topic space. APIs are provided for service suppliers to add nodes to the topic tree. (A fee will be charged for the creation of a new node in the tree in order to deter wanton creation of nodes.) The directory API also provides a method for "binding" an existing deployed Jini lookup service to a directory node. APIs also exist that allow service developers to launch new Jini Lookup engine instances into the hosting environment. The act of binding a Lookup service to a topic tree node effectively places that Lookup within the context of a logical topic. In turn, any Jini services, which are registered in such a Jini Lookup bound to a topic node, are themselves implicitly placed into the context of that logical topic. Services themselves are not directly registered in the directory tree; but rather indirectly by virtue of being registered within a Lookup service that has been bound to a node in the directory tree. (Note that when we say that a Jini Lookup engine is "bound" to a node in the topic tree, in terms of implementation, this simply means that the URL of the Jini Lookup service is placed as an entry at the given directory tree node. Any process navigating the tree can then connect to the Lookup services bound to given nodes in the tree.)

Figure 21:
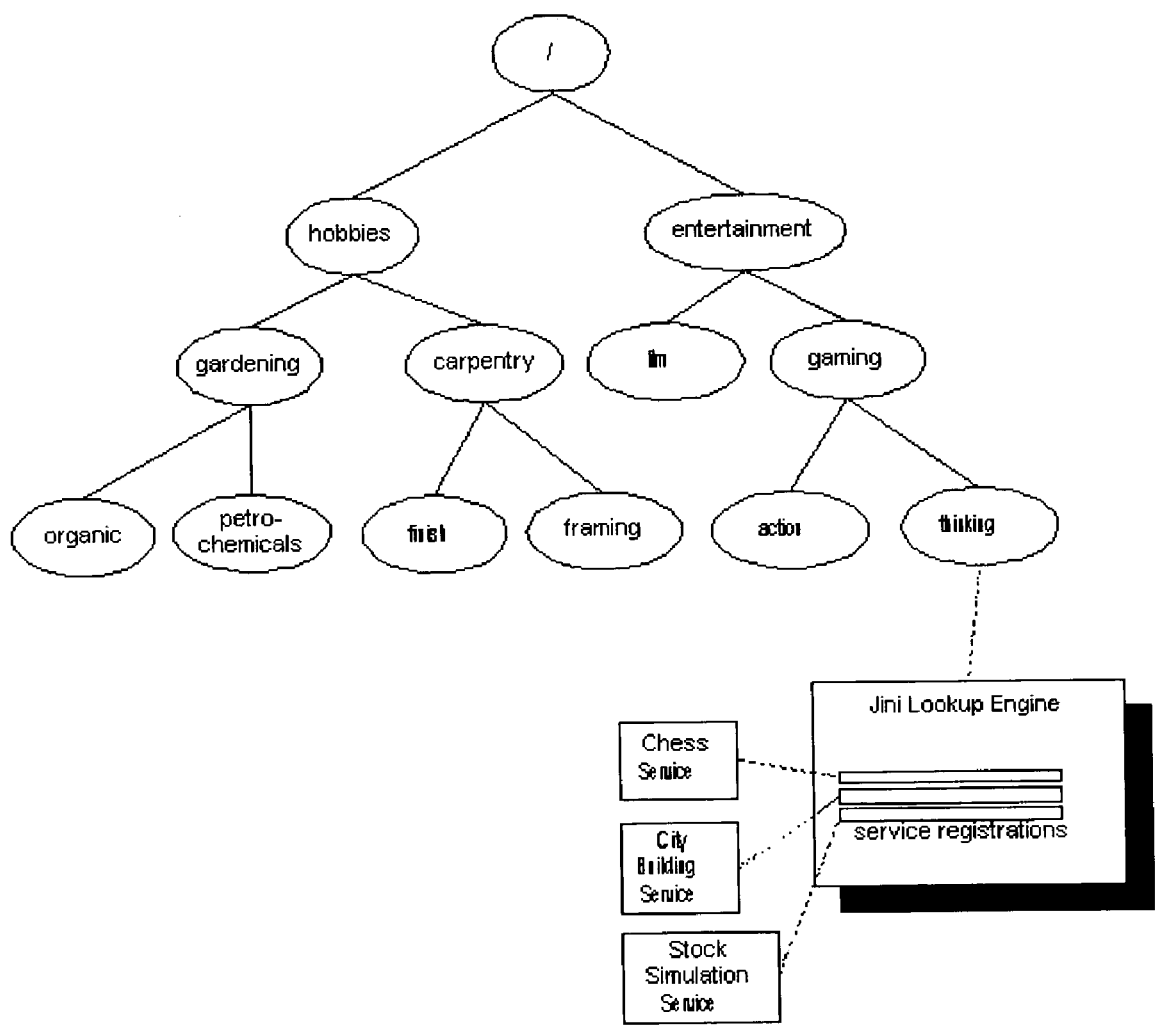
FIG. 21 show at a logical level the concept of the hierarchical topic space of dSHIP's global directory, and shows the notion of a Jini Lookup engine being bound to a node in the topic tree, with several services registered in that Lookup in accordance with an exemplary embodiment of the present invention.

FIG. 21 depicts the logical, hierarchical nature of the directory tree or topic space tree. Note that the depicted nodes do not necessarily correspond to physical process nodes in a distributed system. The logical topic nodes could well be realized by the internal data structures in the database or other storage that is used to implement the directory tree. However, in some potential implementations where the tree is partitioned and distributed, various sub-trees comprising the full tree might well be implemented on different distributed hardware systems. FIG. 21 illustrates several topic nodes in the tree. For one of the topic nodes, we depict, schematically, the notion that there is a Jini Lookup engine (somewhere out there in one of the dSHIP hosting centers) that has been bound to the node. The figure also illustrates the notion that there are a number of specific Jini services that have registered themselves with that Jini Lookup engine, and can thus be discovered by a consumer who navigates the topic tree to the shown/entertainment/gaming/thinking topic.

Service consumers can navigate the topic tree (just as one explores the file system on a PC) to desired topic nodes (e.g. /hobbies/gardening/organic), then look up services in Jini Lookup matching specified criteria. They can use any existing Jini Lookup interfaces for browsing services that are registered in any Jini Lookups that are "discovered" in the directory tree. This approach of tree navigation followed by lookup is very much analogous to exploring a Microsoft DOS file system with the command "cd" and seeing what's in a directory node with the command "dir".

Figure 22:
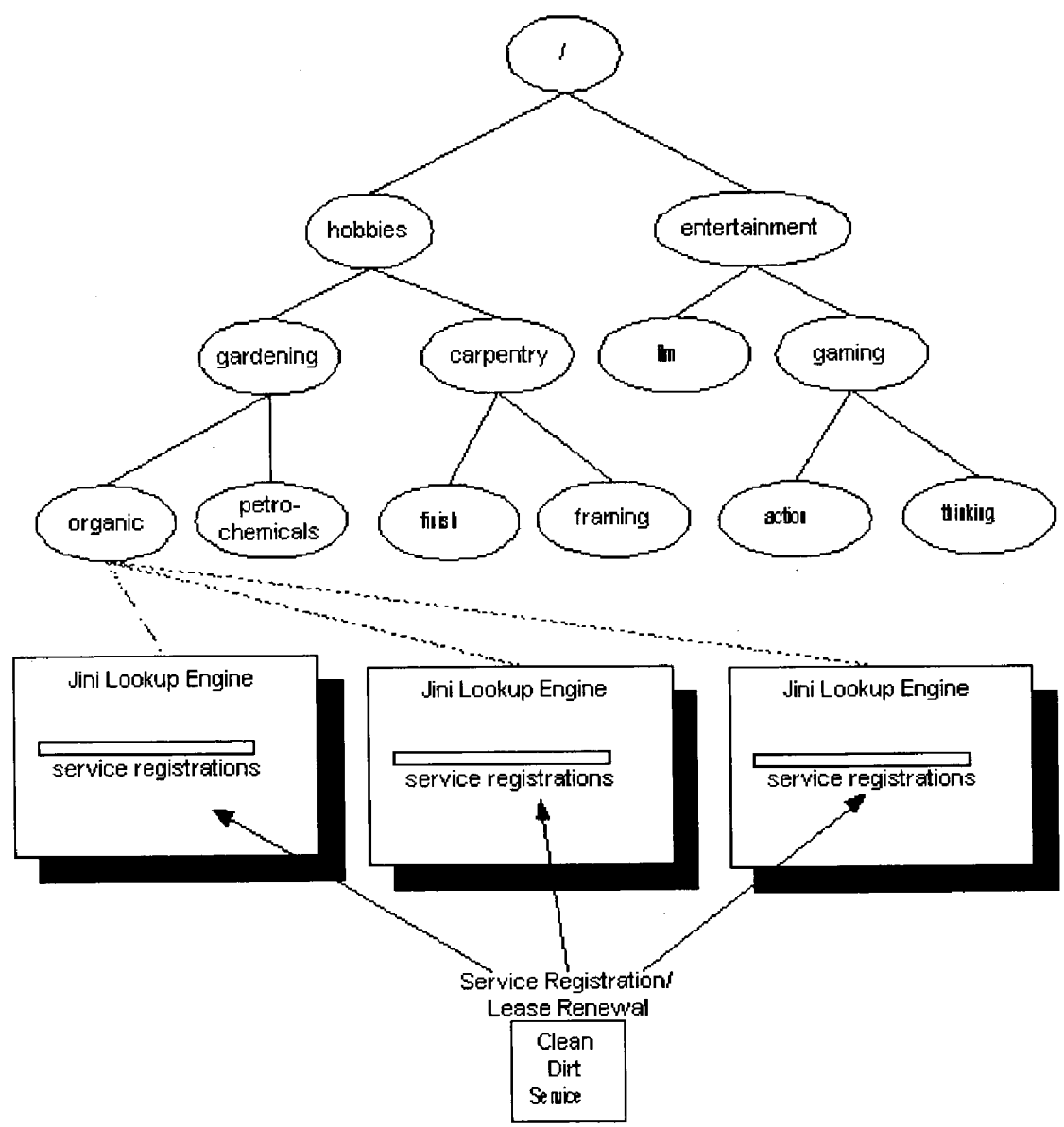
FIG. 22 illustrates the fact that several Jini Lookup services may be bound to a single topic node in the directory in order to achieve load balancing, and that a service scoped to a given topic node should register and do lease renewal with all such bound Lookup services in accordance with an exemplary embodiment of the present invention.
Figure 23:
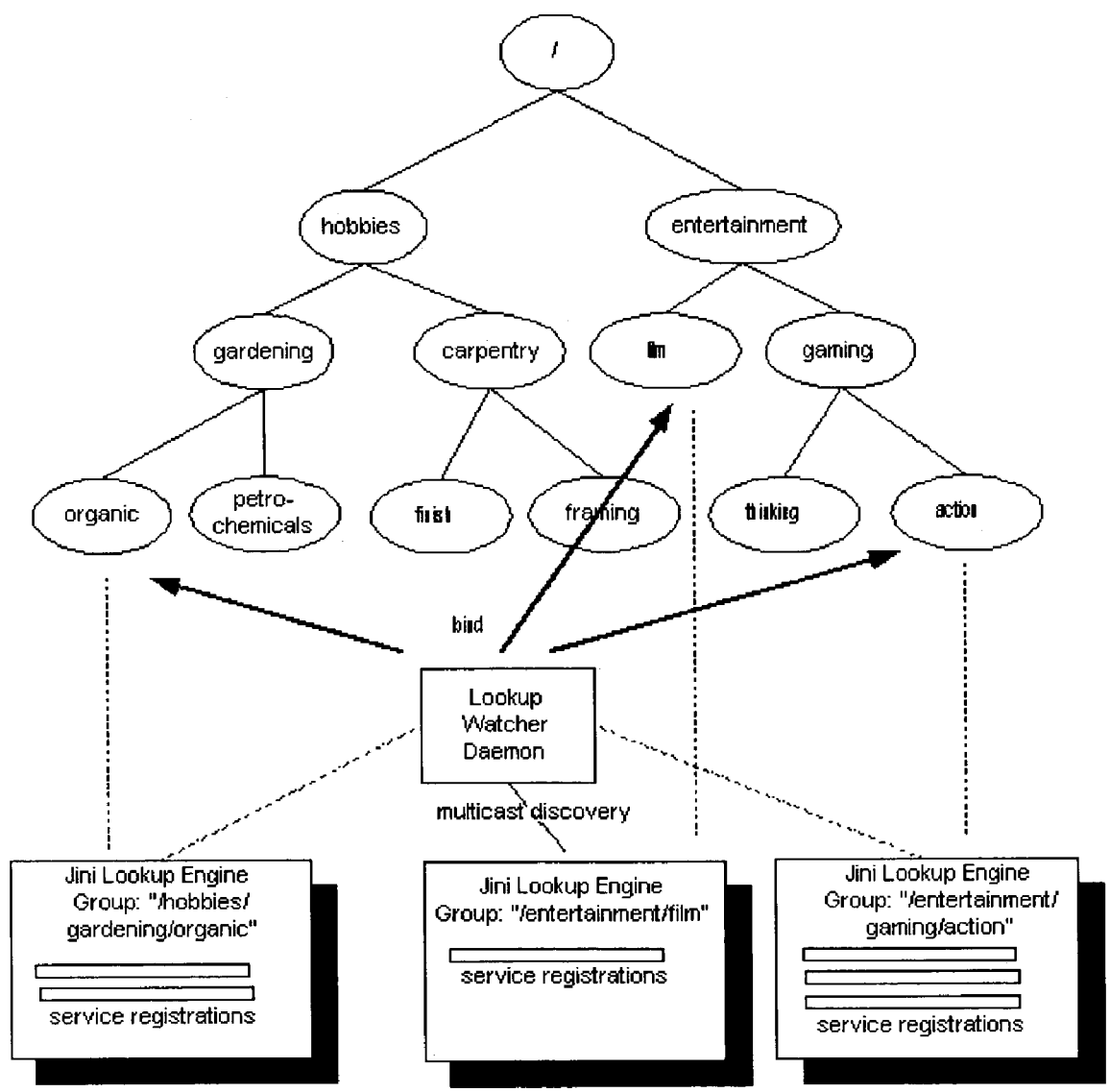
FIG. 23 illustrates how a watcher process in the hosting environment remains at all times aware of running Jini Lookup engines in the environment (via multicast discovery), deduces the correct topic node from the Lookup group, and binds each discovered Lookup engine to the correct node in the topic tree in accordance with an exemplary embodiment of the present invention.

Also note that deployed dSHIP services will also access the directory tree to "discover" all the Jini Lookup engines bound to the topic node in which the service wishes to register itself. The service will connect directly to each such discovered Jini Lookup and register itself in each, maintaining each lease on an ongoing basis. FIG. 22 conveys the situation where three different Jini Lookup services have been bound to a specific topic node. A service that wishes to be visible in the context of this topic node looks up the URLs of the three Lookup services bound to this topic node, registers itself with each of these Lookups, and continues renewing its lease with each on an ongoing basis:

The directory of topics in the dSHIP system should implement leasing semantics. Just as a service should periodically renew its lease in the Jini Lookup services in which it has registered itself, so too should the Jini Lookup services renew their leases in the directory tree to ensure that they remain bound to a desired topic node. If the Jini Lookup so bound fails to renew its lease, the binding will be automatically stricken from the record. If the directory is based upon commercial LDAP implementations that don't natively support leasing of entries placed in the directory, then the dSHIP implementer should supply some external adjunct to retrofit the commercial directory with leasing semantics. If the directory is built from scratch, lease management can be built in from the start, likely implemented with standard techniques based upon priority queues and lease management thread that sleeps and wakes up at times when leases at the head of priority queue are expected to expire. In practice, the dSHIP implementation would likely use a lease-renewal agent to periodically renew binding leases on behalf of Jini Lookup services that are bound to nodes in the directory. In each management domain, we deploy a special Lookup watcher daemon whose job it is to find all the existing Jini Lookup services in range and detect the launch of each new Jini Lookup service, using the standard Jini method of multicast Lookup discovery. For each Jini Lookup whose group designation follows an agreed-upon naming pattern (e.g. a slash-delimited path string like "/hobbies/gardening/organic"), the daemon will automatically bind the Jini Lookup service to the corresponding node in the directory tree, and manage the lease-renewal on an ongoing basis. FIG. 23 illustrates the Lookup watcher daemon that handles the responsibility of binding Jini Lookup services to the directory tree and maintaining the lease renewals, in accordance with an exemplary embodiment of the present invention. The daemon becomes aware of Jini Lookups via multicast discovery, notices that their group name pattern indicates that they are to be bound to the topic tree, then does the bindings of the Lookup URLs to the appropriate nodes in the tree (as well as maintaining the lease renewals on behalf of the Jini Lookups):

One logical directory tree is potentially seen by millions of online consumers. It needs to be highly scalable to handle potential access volumes. The commercial LDAP-based directory products might scale to the required levels. dSHIP may rather use a custom distributed directory that does massive replication among peer copies, with no central master. Every peer replicate would be connected to maybe three to five random peer replicates, forming a highly, randomly interconnected mesh. Changes to any replicate would spawn a change notification event that would propagate through this sort of "gossip chain". Unique event identifiers and a circularity resolution scheme would prevent events from traveling in cycles through the mesh. (This gossip chain event propagation mesh has been successfully prototyped.) A client (such as a consumer looking up services, or a Lookup watcher daemon doing bindings and lease renewals of Lookups in the directory tree, or a service implementer creating a new node in the topic tree) would connect to one of the replicates and then do all of its directory interaction with that single replicate. Most interaction with a directory (such as node navigation and reading the Lookup URLs bound to a node) will be read-only, so no further events need to be sent from the replicate across the mesh to its peers. Some operations on the directory, such as that of adding a new node, will need to be propagated as change events across the mesh. The act of binding a Jini Lookup service URL to a tree node will also be propagated across the mesh. In a very simple implementation, one might also maintain binding leases at all replicate sites and propagate lease renewal events across the mesh to ensure that leases are renewed across all replicates. However, this seems to carry the danger of spawning a huge amount of network traffic just propagating lease renewals across the mesh. A different approach is therefore taken. The Lookup watcher daemon that is doing the bindings and lease-renewal chores in a specific domain, will utilize a connection to one specific directory replicate. We'll call that its local replicate. Many other remote replicates will also exist out there. The daemon only does lease renewals with its local replicate. The lease renewals are not propagated across the mesh to the remote replicates. They do not maintain a lease on the binding which is not local to them. When a lease expires in the local replicate, the local replicate spawns an event across the mesh to tell all the replicates to remove the binding from their copy of the tree. Thus only one replicate is maintaining the lease for the binding; the others just respond to an expiration event in the local replicate. Of course the notion of local replicate versus remote replicate is all relative. Another daemon in another hosting center will consider a different replicate to be local to it. In this approach, we avoid excessive binding lease renewal traffic across the mesh, since only lease expiration events get propagated. There is one wrinkle with this approach. If the local replicate that is maintaining the lease management should crash, after recovery there will be stale bindings in all the remote replicates which will not get cleaned up. We therefore implement a second sort of lease, that we call a "long" lease in which all the remote replicates maintain a long time-scale lease (say 24 hours) on all the bindings that are not local to them. The replicate that has local bindings should, on this long time scale, send out lease renewals across the mesh to all the other replicates to keep the long leases current. With this dual-time-scale leasing model, we avoid excessive lease-renewal traffic across the mesh of directory replicates, but at the same time, are able to clean up stale binding entries whenever some replicate suffers a failure.

Figure 24:
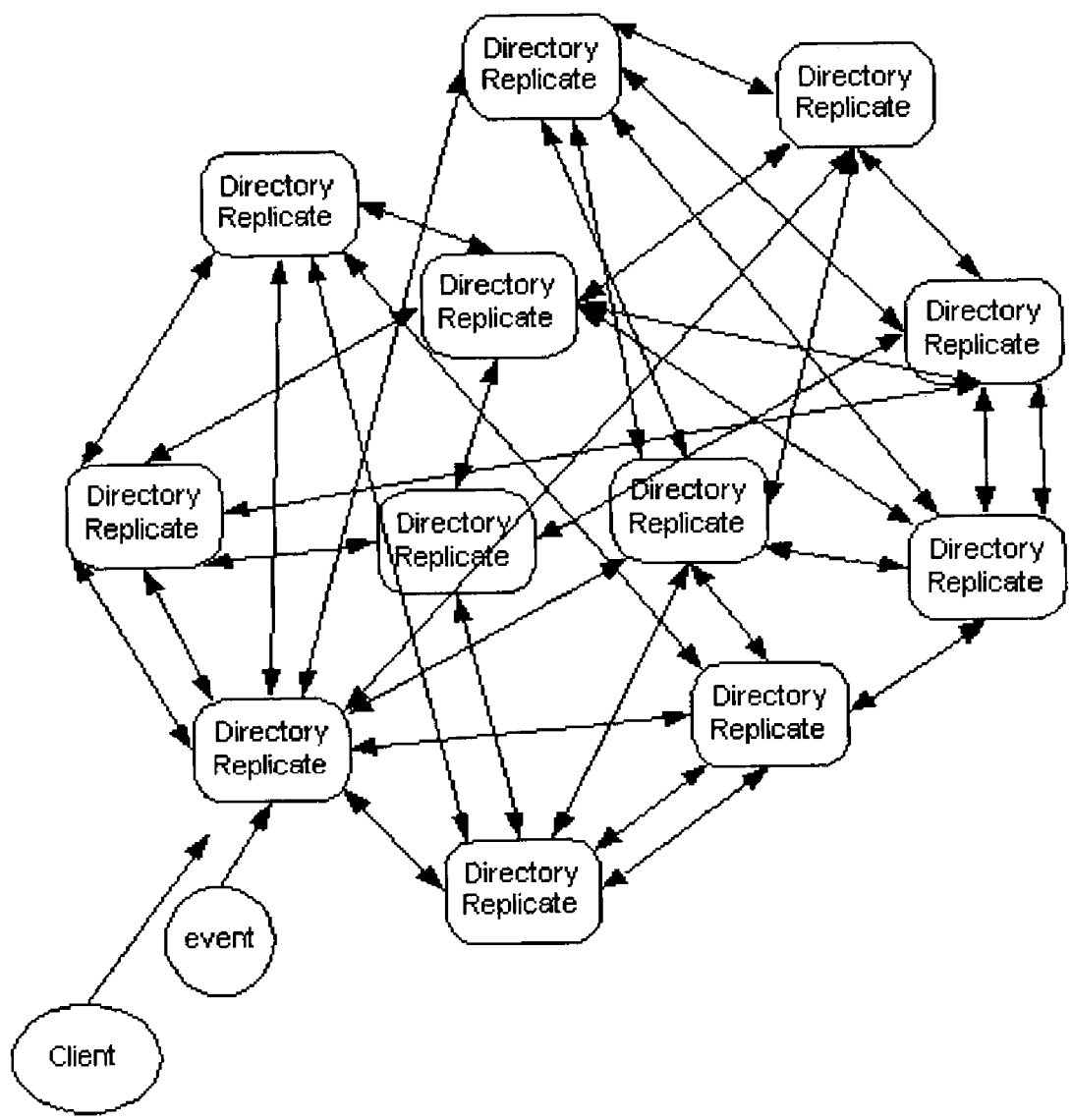
FIG. 24 illustrates how a mesh of peer replicates is used to replicate the dSHIP topic space directory across many distributed physical processes and update events are propagated from replicate to replicate, and eventually span the mesh by means of every replicate that is launched connecting to three random existing replicates in accordance with an exemplary embodiment of the present invention.

FIG. 24 illustrates the concept of connecting peer replicates of the directory tree together into a highly interconnected mesh, and propagating change events across the mesh in accordance with an exemplary embodiment of the present invention. In the figure, twelve directory replicates (scattered geographically) are interconnected randomly. If each replicate, as it comes online, establishes a peer relation with three randomly chosen replicates that are already running, then on average, the number, n, of peer connections that each replicate has with others remain constant (namely 6). When a client spawns a change event on the replicate to which it is connected, that replicate will forward the change event to all of the peers it is connected to. These will forward the event to their peers, and so on. Each replicate will maintain bookkeeping on the identity of change events it has received so far. Each change event carries a unique id. When a replicate receives a change event from a peer, it checks the bookkeeping to see whether it has seen that event before. If it has, then the event is ignored. This prevents events from endlessly propagating in cycles through the mesh:

Note that this approach to implementing a scalable directory infrastructure for dSHIP is simply one possible implementation approach for realizing a scalable directory. Other approaches could be used without changing the logical behavior of the dSHIP system.

Once again, this logical topic tree, based upon a distributed, scalable directory service, replaces the multicast discovery of basic Jini as the primary mechanism in which services and service consumers "discover" Jini Lookup services. Discovery happens in logical topics in cyberspace, rather than on local networks in one's connected environment. In some dSHIP documents, this topic-based lookup discovery has been referred to as the "CyberDjinn" directory because the "CyberDjinn" directory places such a Djinn "community" into a logical area of cyberspace.

In accordance with another exemplary embodiment of the present invention, a second form of Internet lookup of Jini services uses the approach of front-ending the Jini Lookups with a coordinate-based directory—a so-called geodetic database. In this approach, Jini Lookup service engines may be bound (in the sense outlined above), not to a logical topic in cyberspace, but rather to a coordinate position in a virtual coordinate space. A Cartesian coordinate system or the longitude/latitude spherical coordinates of an Earth coordinate systems would be typical approaches. Other mathematical coordinate systems are also conceivable. Using Earth coordinates would, for example, facilitate Internet access to location-sensitive services. We use partitioning to achieve scaling of the geodetic database, dedicating separate processors and storage to different spatial regions of the virtual coordinate system. In other words, separate storage engines handle different "cells."

Figure 25:
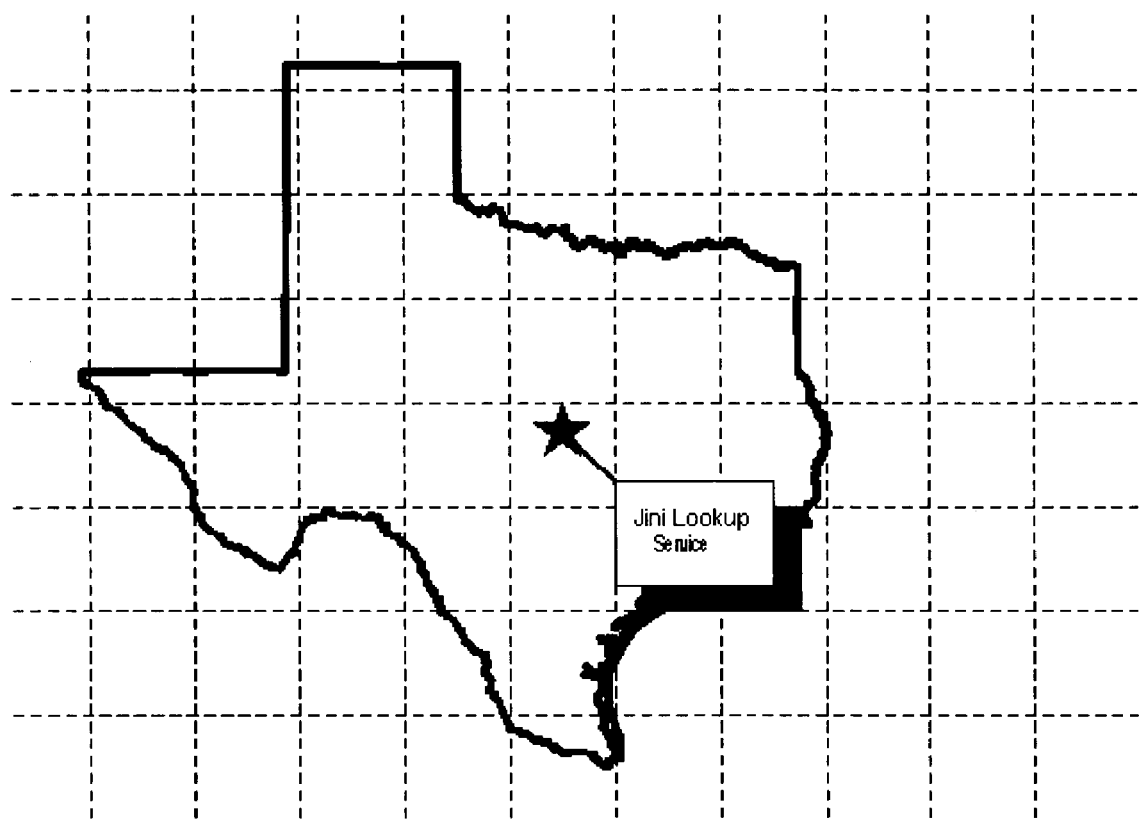
FIG. 25 illustrates the notion of binding a Jini Lookup service to a location in an Earth coordinate system, accomplished by storage in a database capable of coordinate-based keying in accordance with an exemplary embodiment of the present invention.

In accordance with one exemplary embodiment of the geodetic approach, a Jini Lookup engine is bound to some specific coordinate position. Many Jini Lookups could be bound to many different positions, much as cellular telephony stations are deployed around metropolitan areas and along highways. Any deployed service that wished to have visibility in a specific geographic region of the coordinate system would find an existing Jini Lookup engine bound in that approximate region (or create and bind a new Jini Lookup in that region); the service would then register itself in such a coordinate-bound Jini Lookup service. The service client, wishing to find services within a region in coordinate space, would first specify to the geodetic database a coordinate position (e.g. the consumer's GPS coordinates) and a bounding range (e.g. the radius of a bounding sphere) that fixes the search region. The geodetic database would return all the Jini Lookup services that had been bound to a coordinate location within that search range. The client could then query such "discovered" Jini Lookup engines to find desired services available in the region of interest. Such an approach may have applications in areas of mobile-commerce, travel and tourism, and so on. FIG. 25 below illustrates the notion of binding a Jini Lookup service to a coordinate position in an Earth coordinate system:

The above two approaches take discovery of Jini Lookup services beyond the basic multicast (network proximity) based approach of Sun to the alternatives of discovery in logical topic spaces and virtual coordinate systems.

The dSHIP system supplies ordinary web-based pages that allow new participants (users, service suppliers, whatever) to sign up and establish an identity and account. Usual credit-card billing allows participants to deposit a lump sum of money from the ordinary financial world into their dSHIP account or wallet. The participant may also withdraw money from their dSHIP wallet to recover real-world money. In an initial version, the choice to withdraw money from the dSHIP account would just be handled by the provider mailing the participant a check. In later versions, more sophisticated EFT methods might be added to facilitate transfer of money back and forth between the external financial world and the dSHIP microcosm economy. The monetary unit in dSHIP would be pegged to the U.S. dollar. It would not be allowed to float with respect to the dollar in order that no matter how great the eventual scale of economic activity within the dSHIP microcosm, dSHIP cannot be construed to be an independent currency system. The atomic unit of exchange in dSHIP would be taken to be 1 millionth of a dollar. Using 64-bit integer accounting, this allows a range from a millionth of a dollar into trillions, enough range to cover all circumstances. Eventually, dSHIP would support transfer of money in and out of the system in terms of various national currencies: conversion of dSHIP monetary units to various foreign currencies would be calculated according to standard exchange rates. A service charge would be applied to transfers in either direction between external financial world and the dSHIP world. This service charge is not primarily intended to be a profit center. The main motivation, rather, is to neutralize any attempts to do online currency speculation through moving money through dSHIP in and out of various foreign currencies.

The set of web pages that allow participants to sign up and do credit card deposits into their account also have a security related area that allows the user to set passwords. Passwords will be crucial to security and authorizing funds transfers in payment for services.

Most services will require consumers to supply payments. Additionally, service suppliers will lease resources from the platform provider (such as CPUs and storage). The interfaces for establishing and renewing leases will contain parameters for passing in funds in payment for leased resources. To enable the flow of money in payment for services and leasing of resources, The telco/network service provider supplies a core funds transfer service. This service, a sort of logically central bank, allows participants to authorize the transfer of funds from their accounts to other accounts. All participants in dSHIP, including end consumers, suppliers of services and the platform provider (i.e., The telco/network service provider), should have at least one identity and associated bank account or wallet. Participants are not allowed to make unsolicited direct deposits of finds into another participant's account. (Acceptance of payments needs the active participation and consent of the receiver—a politician might wish to refuse a bribe!) Rather, the funds transfer mechanism works much like the real-world system of making out checks payable to a receiving party. The funds transfer service API allows the consumer of a service or resource to request the creation of a funds transfer authorization object. For simplicity, we'll just refer to it as a "voucher." The voucher is made out in a specifically requested denomination for a specified recipient identity. The request method might look something like:

```
Voucher createVoucher (Identity callerId, Password callerPassword,
                      Identity recipientId,
                      Money transferAmmount)
          throws InsufficientFundsException;
```

Using encryption techniques, the voucher cannot be corrupted without detection. The central banking system also implements one-shot behavior to ensure that the voucher cannot be cashed in more than once, even if someone copies it and tries to "redeem" it a second time. By using an approach of direct account-to-account transfer, rather than using a medium of exchange like a real-world currency, we avoid the problematic feature of the digital world that enables exact duplicates of data to be made effortlessly. After receiving a funds transfer authorization in payment, a service or other participant can "cash in" the voucher with the central bank service. Cashing in causes the supplying and receiving accounts to be debited and credited as an atomic action. The method that the receiving service would use to redeem the voucher (and thereby complete the funds transfer) would look something like:

void cashInVoucher(Voucher voucher) throws BadVoucherException;

The voucher encapsulates full information regarding the amount to be transferred, and the sending and receiving accounts. It would do no good for an unscrupulous party to cash in someone else's voucher.

The distribution of the code that implements the access API to the funds transfer service (i.e. the central bank service) would probably use very conventional distribution techniques, rather than the usual Jini dynamic code loading. It is of utmost importance that there is no possibility of this code being corrupted to introduce spoofing schemes, since exercising the funds transfer API has absolute control over a participant's money.

The telco/network service provider would supply several other basic core services. These might include disk storage access services, database access services, messaging middleware services, shared tuple-spaces (e.g. JavaSpaces) access services, etc.

Another core service might be a trusted third party (TTP) security service. A TTP service would share a secret key with every participant (a different secret key for each participant). A party "A" could request the TTP to generate a session key for talking to another specific party "B". The TTP would pass to "A" the session key encrypted using "A"'s key, and another copy of the same session key encrypted with "B"'s key (in such a way that "A" can't do a comparison attack to discover "B"'s secret key). "A" can then send this encrypted session key to "B", and the two can handshake and set up a secure channel using the session key. This TTP approach is one approach to setting up secure communications at the service level. Jini services can use this approach without any underlying network layer support to set up secure sessions with clients. Ultimately, it would however be desirable to secure the dSHIP system against eavesdropping or data corruption using network layer security, especially IPSec. All access to dSHIP services are secured with, for example, an IPSec-based VPN.

Many of the dSHIP services will be exercised by other dSHIP services, possibly forming multi-layer value chains. Some dSHIP services will be accessed by end-user applications. In fact, Jini is such a flexible model, that GUI-based end-user desktop or palmtop applications can be distributed as Jini services. Thus, dSHIP Jini services can both encompass system-to-system interaction as well as human-to-system interaction. In fact, a familiar productivity application, like a spreadsheet or word processor, could be framed as a Jini service and delivered up to the consumer as a dSHIP service. Such end-user applications-oriented services can accomplish their work partly by calling other dSHIP services that provide behind-the-scenes plumbing, such as network-based storage.

To accommodate these application-oriented end-consumer services (and not just one dSHIP server talking to another) dSHIP supplies its own browser environment. (There is a wide range of exactly how to deliver this: standalone executable application, web browser plugin, applet, WebStart client app delivery environment, etc.) The dSHIIP browser would provide directory navigation through the topic space, and perhaps geodetic navigation. Even a command-line interface might be provided. It would allow browsing so-discovered Jini Lookup services and query for services matching criteria. The client browser would permit the "selection" and running of such found services. (At least those services that are application oriented and not the "plumbing" variety of service that is meant for access only by other services, not by humans.)

A special enhanced client browser or console would be provided to service suppliers. This would also include user interfaces for deploying services and doing service management tasks.

The client browser environment also has a built-in payment agent that acts on behalf of the user to automatically make payments to services that the consumer accesses, subject to policy-based controls in place. The browser will allow the consumer to fine-tune payment and stop-loss policies, setting thresholds and so on. When the end consumer accesses an application service, that application service (which has in effect been invited into the client's "space") can make requests for payment directly to the local payment agent acting on behalf of the consumer. The payment agent will access the core funds transfer service, described above, to produce vouchers that are passed to the service in payment. In essence, the service says to the payment agent "Give me money" and the payment agent "writes a check" and gives it to the service on demand. Based on policy in effect, such payment requests may be denied by the payment agent. Or the system may prompt the user for confirmation and permission before proceeding with the payment. Most consumers would tune the policy settings so that minimal payment requests are honored without annoying prompts, but the user is alerted when their average spend rates exceed specified thresholds. Note that by going through the intermediary of the payment agent, the "foreign" application service, which the consumer has invited into their processor space, never has direct access to the consumer's password information or any direct access to the consumer's bank account. The application service just talks to the consumer's payment agent and requests payment from the payment agent. The payment agent is the one that is privy to the consumer's password and can request funds transfer authorizations (vouchers) from the central bank on behalf of the consumer. After the payment agent passes a payment voucher to the requesting application service running in the consumer's process space, that application service can cash in the voucher with the central bank and proceed to offer capabilities of value to the consumer.

Figure 26:
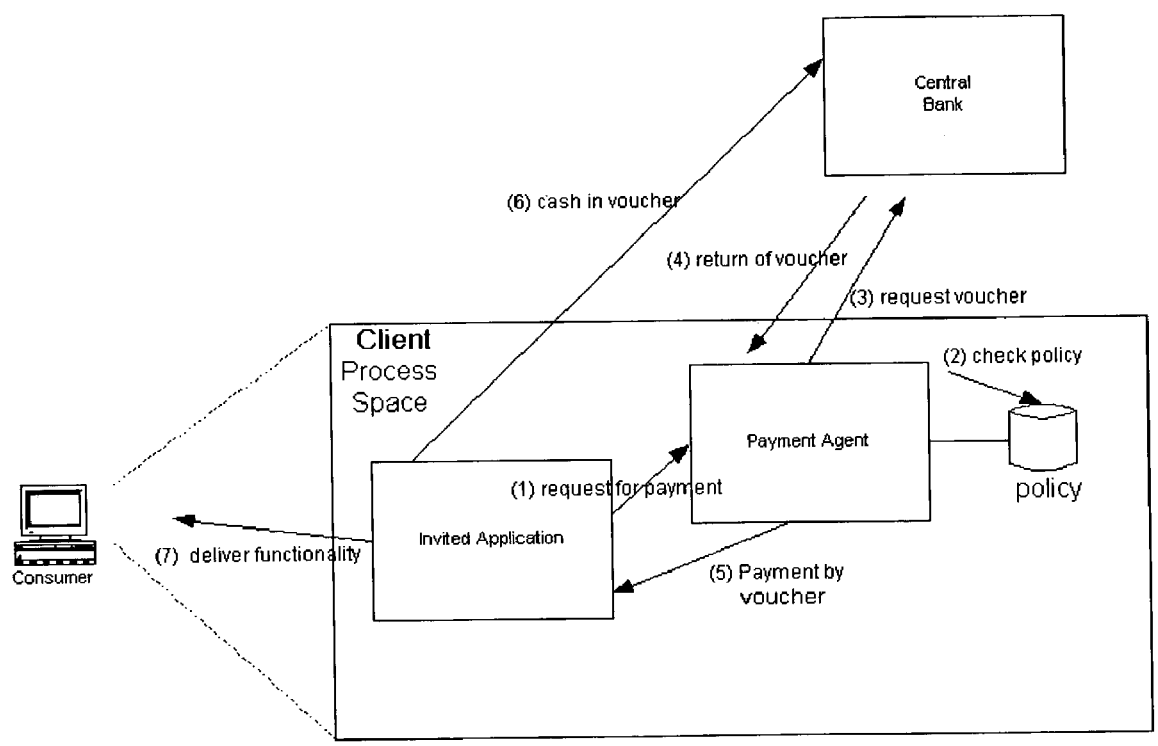
FIG. 26 shows the sequence of steps involved when a dSHIP service loaded by a consumer makes a request for payment to the consumer's personal payment agent. The payment agent checks for policy violations, then creates a voucher and passes it to the service, which can then cash it in with the bank in accordance with an exemplary embodiment of the present invention.

FIG. 26 illustrates the concept of application-oriented services, invited into the client process space, asking the client's payment agent for payments for services, and the payment agent making these payments, subject to policy rules in accordance with an exemplary embodiment of the present invention.

As discussed above, a few ordinary web pages are provided to allow a participant to sign up, establish an identity and do some funds deposits into their account. Outside of these chores, nearly all access into the dSHIP world is bootstrapped through accessing the dSHIP topic-node directory. The topic node directory is essentially the window into the whole dSHIP world. The client browser and the developer browser provide a graphical view into this world. Once a participant has access to the directory, the topic space can be navigated. Jini Lookup services can be discovered in different subject areas, online dSHIP services in the context of different topics can then be looked up via ordinary Jini Lookup, such services can then be exercised, and among these services are core services that allow service deployers to launch services, and so on. The one missing link in this chain thus far is the basic bootstrapping step of establishing a connection to the directory service. Since the directory is a distributed, replicated, virtual directory, not one single process, it isn't trivial how we connect to it to start the service discovery ball rolling. Behind the scenes, the GUI browser or dSHIP access bootstrap API will hit a well-known URL. This might resolve to a Servlet deployed using ordinary web server/application server infrastructure. Some combination of DNS address cycling, fanning out requests from a proxy server to many web servers, or built-in scaling capabilities of application servers can provide the scaling (we assume) to handle all the millions of daily requests to this basic bootstrap service URL. The job of this bootstrap Servlet is just to generate a second URL, RMI connection or whatever which accesses one of the multitude of directory service replicate processes. The Servlet passes the URL or other form of handle back to the client, who can then proceed with session calls to a specific directory service replicate process among the many that are deployed around the world. With some knowledge of the participant's location (or some clever real time sleuthing) the selected replicate could be intelligently chosen to be "close" to the participant in a router-hop sense, so that we don't do something dumb like connecting a user in Peoria to a directory replicate in Tokyo.

Figure 27:
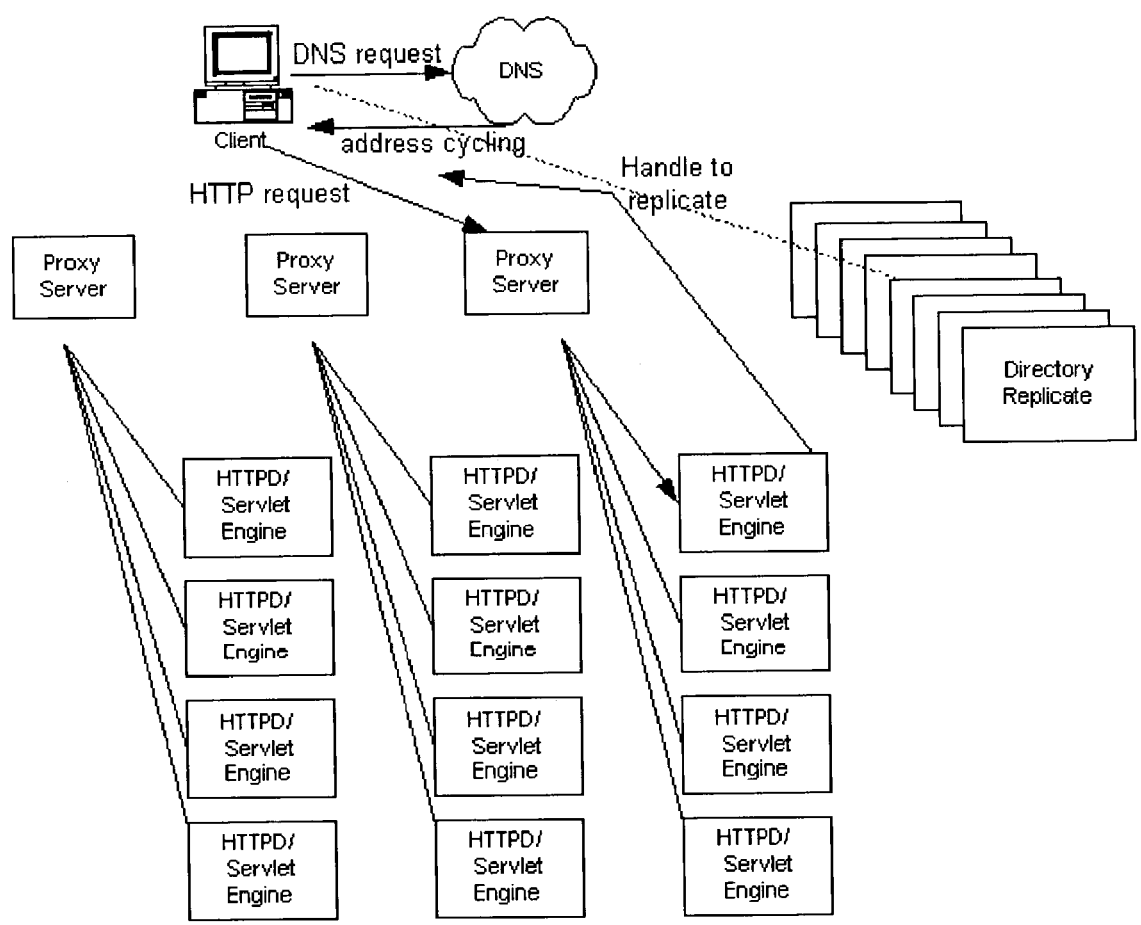
FIG. 27 shows multi-level scaling of access to directory service replicates. DNS address cycling, multiple proxy servers, many Servlet engines are staged in a fanout to allow millions of consumers to connect to a large number of directory replicates in accordance with an exemplary embodiment of the present invention.

In this way, the client out there on the Internet establishes a connection to one of the many directory replicates. They can then navigate the topic space, discover Jini Lookup engines and make use of all the services registered within the dSHIP universe. FIG. 27 illustrates the client access into the dSHIP universe of services, and sketches how multiple stages of fan-out (using DNS address cycling, proxy servers and multiple Servlet engines) can scale the client bootstrap access, and establish a session between a client and one of the many directory service replicates in accordance with an exemplary embodiment of the present invention. In the figure, DNS address cycling is used to map DNS host resolution onto several different proxy servers. A client HTTP request to such a cyclically-resolved proxy server gets further fanned out by the proxy server to one of several actual HTTPD web servers and Servlet engines that handle the HTTP request. The Servlet's sole job is to choose one Directory replicate process from among the many that are running, and pass a handle to that replicate back to the client. The client then uses this handle (e.g. a URL or RMI remote object connection) to accomplish all session interaction with the directory service. Using this multi-stage fan-out and many replicates of the directory tree information, dSHIP hopes to scale up to the very large access volumes to the directory that could occur in a system such as this that exposes network services to consumers on the public Internet.

Other Possible Uses:

The dSHIP concept of service lookup based on proximity within a mathematical coordinate system (e.g. longitude/latitude of Earth coordinates), which we refer to as "geodetic lookup", can be applied to lookup of services that are not based upon Jini network service technology, in accordance with other exemplary embodiments of the present invention. One example would be to supply a geodetic directory service with visibility on the public Internet serving the purpose of looking up Web Services that are based upon XML and SOAP protocols. Such a geodetic Web Services directory would function as a coordinate-based alternative to lookup of Web Services in the category-based UDDI directory that has been spear-headed by IBM and Microsoft.

Similarly, some of the other concepts in dSHIP, such as policy based payment agents that shell out payments for services on behalf of the consumer, could be applied to other network service systems, for example those based upon XML/SOAP Web Services. Such techniques are not inherently limited to a service architecture based upon Jini services but may instead utilized other types of service in accordance with an exemplary embodiment of the present invention.

On the dark side, the funds transfer mechanism in dSHTP could be abused for purposes like money laundering and illegal transactions. Mechanisms need to be in place, such as reporting of transfers exceeding $10,000, to help deter such abuses. Logging of money transfers can also aid law enforcement activities.

dSHIP can potentially make online, distributed computing and network-based services safer and more secure than present approaches. The dSHIP system is built with sufficient safeguards (including hardening all channels over the public Internet with IPSec-based VPNs, extensive logging of activity, requirement for identification and authentication in nearly all transactions, payment requirements for nearly all activity, great attention paid to policy safeguards in consumer and server sandbox environments, closing off all direct access to such things as file resources except through dSHTP service APIs, and so on) to provide a safe environment for doing enterprise, business-to-business, productivity and consumer/entertainment computing, with much lower incidence of cyber-crime than the more wide-open approach of the Internet at large. In a sense, the goal is to leverage VPNs and a tightly-controlled deployment environment on the network to extend the ideals of Sun's original client "sandbox" environment to an entire world-wide, distributed computational and communications platform.

dSHIP is in the combination of a specific combination of features and approaches into a coherent platform for distributed computing and communications. The features contributing to the mix include: use of Jini service architecture or similar architecture as the basis of network-based service; central importance of Java as opposed to a language-neutral approach; extensions to Jini to provide global visibility to Jini services from any device with a sufficiently capable JVM and a connection to the Internet; use of a hierarchical topic space to organize service lookup domains into logical topic areas; use of highly replicated directories with leasing semantics to implement the logical topic space; offering of alternative approaches to information organization to allow service discovery along lines different than topic category, specifically the use of a coordinate-based (geodetic) approach to service discovery based upon location in an abstract space or Earth-based coordinate system; use of a managed hosting model supporting deployment of third-party services onto leased, managed computer, storage and network resources; exposing of APIs that allow leasing of such managed hosting resources and real-time deployment of services onto those resource through API calls, rather than usual human-oriented negotiations; using the same "frictionless" APIs to allow deployed services to dynamically scale to growing capacities by leasing of more resources; use of NewWave Angel management agents and techniques to keep the whole vast system healthy; leveraging of Jini and Java code-mobility to offer services with greater potential power than primitive remote-call approaches of WebServices and CORBA architectures; requirement of identity and accounts for all participants in the system, be they service suppliers or service consumers; offering of a simple API that allows flow of money from account to account in complex value chains, placing the whole system on a sound economic footing; support for payments down to extremely small denominations (millionth of a U.S. dollar); use of VPNs to harden the system against attack; necessity for identity to participate in any way on this somewhat closed, "hermetically sealed" system; offering of a client browser application and special developer consoles as an entry window into the dSHIP universe; placement of payment agents on client browser platform to make online exercising of any available services as convenient as possible, avoiding the restrictions and locking of subscription packages, and avoiding irritating prompts for authorizing every tiny micro-payment for services rendered; enablement of fine-tuning of policy safeguards in the client payment agent to ensure that consumers are protected from catastrophic loss or exceeding spend-rates that they feel comfortable with. While a number of existing or proposed systems have offered features sharing some similarity with some of the features listed above, no known system combining this novel set is out there.

Aside from the above-mentioned bundling of features, the following dSHIP features also are significant in view of the prior art methodologies, these include:

Use of a geodetic (coordinate based) system for discovery of modern network services (like Jini or Web Services) in an abstract spatial context;

Use of a randomly, highly interconnected mesh of peer replicates to implement a highly scalable directory service implementation;

Direct incorporation of leasing semantics into a directory service;

Offering of a publicly-visible directory on the Internet to enable discovery of Jini services by any suitably capable device possessing an Internet connection;

Offering of Jini service container processes in a hosting environment on the Internet to allow third parties to upload their services into hosting facilities resources;

Use of NewWave Angel management techniques in the context of hosted services visible on the Internet, outside of an enterprise context;

Offering of a funds-transfer service to allow micro-transfers of monetary units from account to account in real-time as services and resources are utilized; and Provision of a policy-based client payment agent in the client environment to facilitate ongoing payment for services exercised by a consumer, while safeguarding the consumer from excessive expenditures.

dSHIP Client Payment Agent

The following section presents some of the motivation behind the invention of the policy-based payment agent. This section helps to explain why the funds transfer protocol (supporting micro-funds transfers on the Internet) alone is not really sufficient to provide funds flow chains all the way back to the end-consumer, at least not practically speaking. The policy-based payment agent is the lynch-pin that makes the revenue flow system really work for fine-grain payments in a pay-as-you-go approach.

The dSHIP model offers a central banking service that allows all participants to have an account containing monetary units. A funds transfer API allows all participants to securely create a funds transfer authorization (voucher), made out to a specific recipient in a specific amount. The voucher can be passed over the network in the course of utilizing a service or leasing a resource. The provider of the service or resource can then cash in the voucher, which causes the central bank to transfer monetary units from account to account in accordance with an exemplary embodiment of the present invention. This approach is analogous to the system of writing personal checks in the everyday world.

Figure 28:
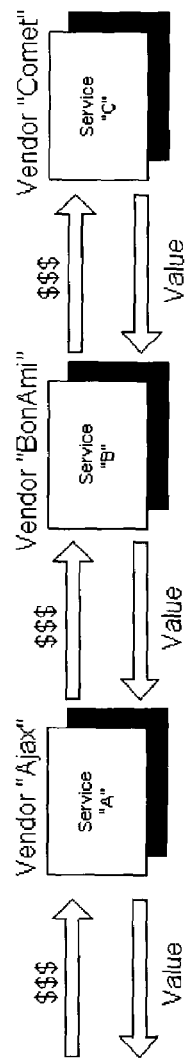
FIG. 28 illustrates the notion of a value chain, with a service "A" making invocations to a service "B", and "B", in turn making calls to a service "C" in accordance with an exemplary embodiment of the present invention.

This single simple mechanism enables money to flow through a micro-economy as participants pay for services rendered. As described, dSHIP is a service economy where money and return value flows through supply chains. One service may call other services in the course of carrying out its own value-add services. Calling a service may result in activity that is a composite of services supplied by multiple vendors. FIG. 28 illustrate the notion of a value chain, with a service "A" making invocations to a service "B", and "B", in turn making calls to a service "C". In this example, the three services are supplied by vendors "Ajax", "BonAmi" and "Comet". As the figure suggests, value flows from Comet to BonAmi to Ajax and on to the consumer who requests the service that Ajax offers. Money flows in the opposite direction, from the consumer to Ajax to BonAmi and finally to Comet:

With the two simple funds transfer API calls described in invention disclosure, we can literally make this money flow happen. The Service "B" program, for example, will request funds transfer authorizations from the central bank, made out to Comet's identity, and will pass such vouchers to Service "C" in the API calls of Service "C". The programs implementing Service "C" will make the "cashIn-Vouchero( )" call to the central bank to cash in the vouchers it receives from Service "B". This will complete the transfer of monetary units from BonAmi's account to Comet's account.

Figure 29:
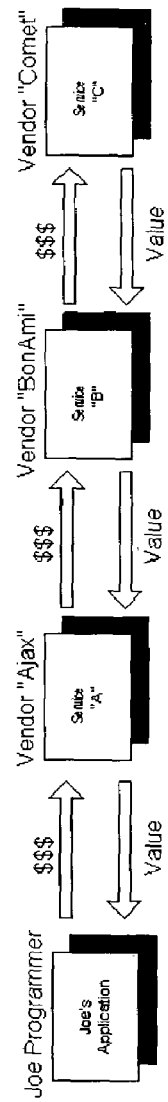
FIG. 29 illustrates the flow of a program that makes calls to Service "A", where the programmer has inserted into the code the calls to the central bank (supplying his password for authentication) to request vouchers in accordance with an exemplary embodiment of the present invention.

Now suppose Joe Programmer comes along and decides that he wants to utilize Service "A" from vendor Ajax. So he writes a program that makes calls to Service "A", and programs into his code the calls to the central bank (supplying his password for authentication) to request vouchers. Joe's code passes these vouchers to Ajax in the course of exercising the interface of "A". Again, this is straightforward and is depicted in the flow of FIG. 29.

So far, with the two simple central bank API calls, which create vouchers and cash in vouchers, we have all we need to move money through an entire supply chain, from end consumer to "retail" services and on to "wholesale" services further upstream.

Figure 30:
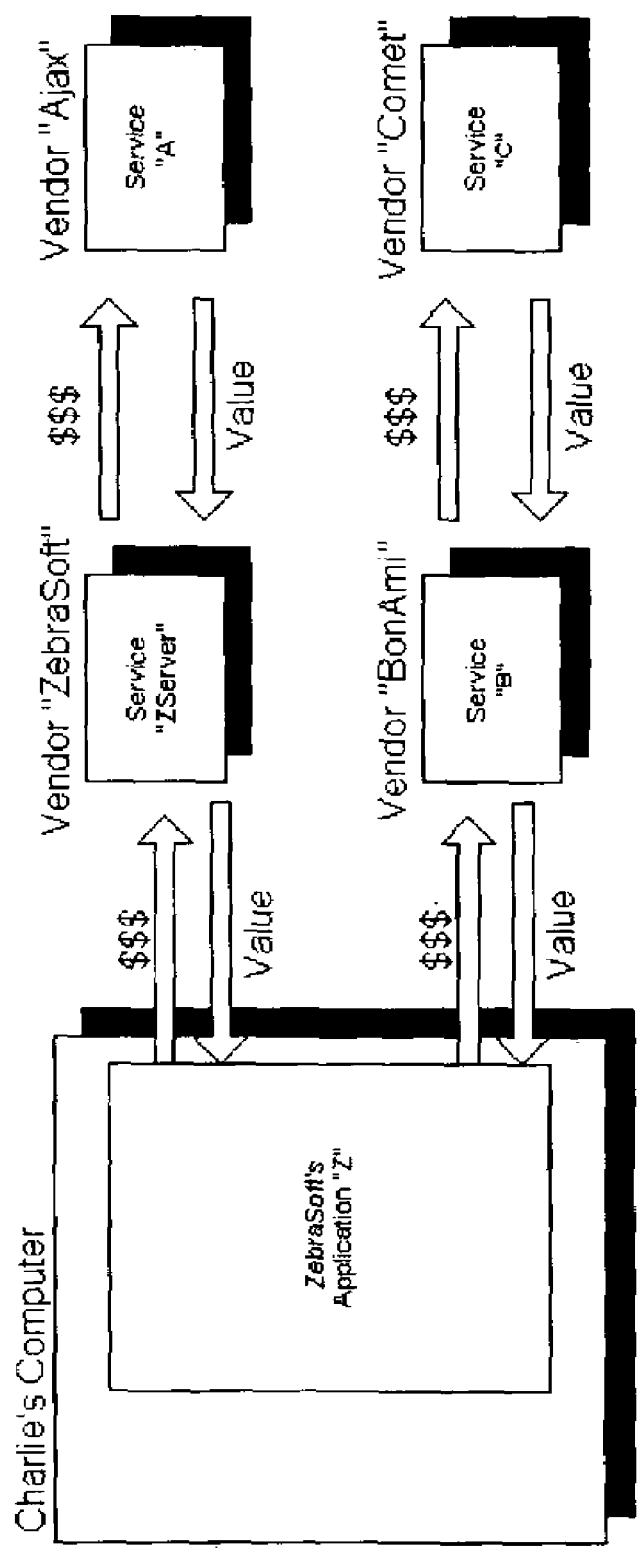
FIG. 30 illustrates The following drawing illustrates the scenario where an application "Z" from vendor ZebraSoft is running on Charlie's machine in accordance with an exemplary embodiment of the present invention.
Figure 31:
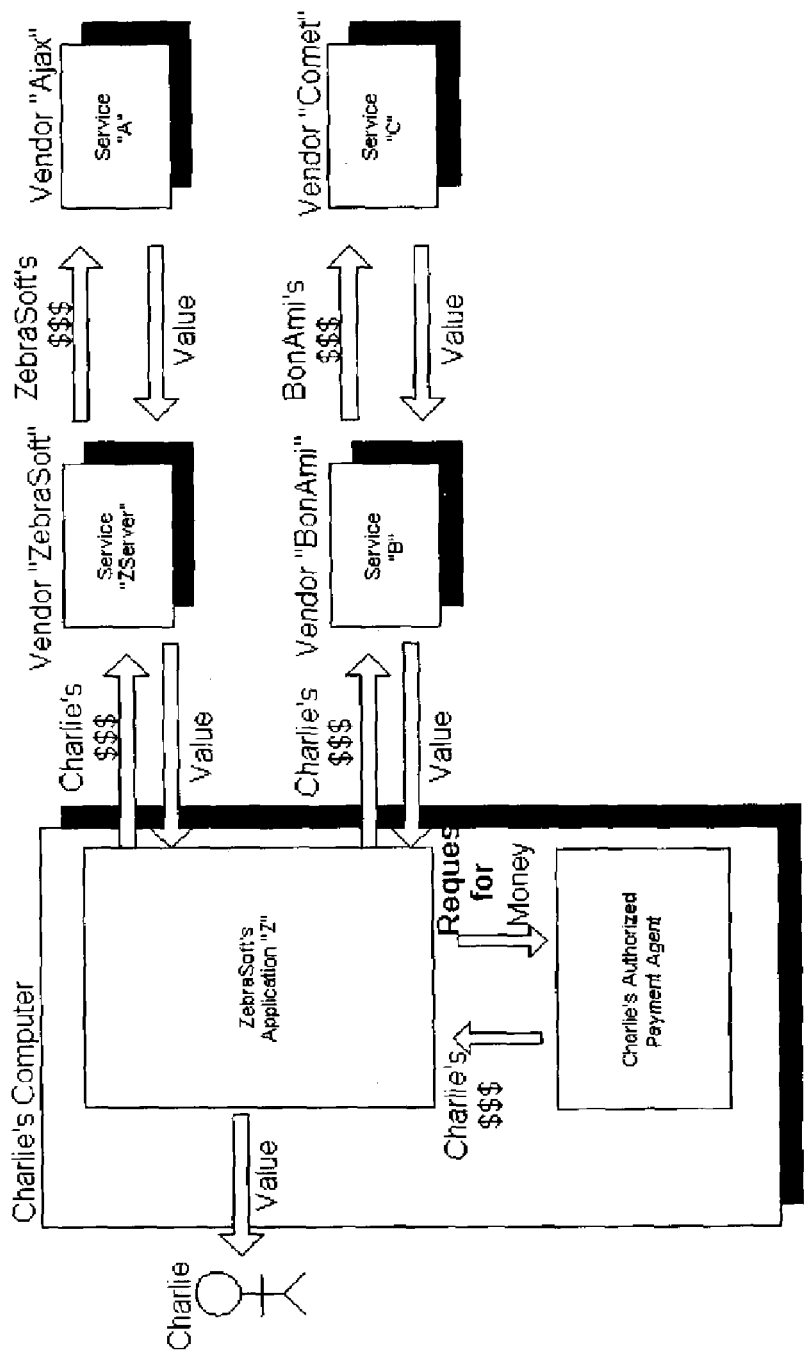
FIG. 31 illustrates the process described in the previous figure with an explicit description of whose money is flowing in each of the dollar flow arrows in accordance with an exemplary embodiment of the present invention.

The wrinkle with this picture is the fact that most people out there are not programmers and will not be writing Java programs that directly make calls to dSHIP services out there. In most situations, Charlie Consumer will be running an application supplied by a software company. It is the application that is making calls to online dSHIP services, and which should pass payments to the various online services that it accesses. The application may delivered using any number of different delivery mechanisms: it might be bought at a store and installed onto a PC from a CD; or the application might itself be a dSHIP service that is downloaded on the fly over the Internet to the consumer's access device. In either case, the application that Charlie uses has in effect been invited by Charlie into his process space. FIG. 30 illustrates the scenario where an application "Z" from vendor ZebraSoft is running on Charlie's machine. Application "Z" is accessing a backend service "ZServer" that is also supplied by vendor ZebraSoft, and this service is accessing Service "A" from vendor Ajax. Application "Z" is also directly accessing Service "B" from vendor BonAmi.

Now we run into a strange situation that we haven't seen before. In the discussion up to now, a service such as Service "A" was running in an environment essentially "owned" by Ajax, the supplier of the service. But in the case of Application "Z", the situation is different. Application "Z" is written by vendor ZebraSoft, but is being run not by ZebraSoft on ZebraSoft facilities, but by Charlie on Charlie's computer. In previous examples when we drew a dollar flow arrow from Service "B" to Service "C", it was implied that BonAmi was paying Comet. But now, in the case of the application running on Charlie's machine, we need to be more precise about who is paying whom. The dollar flow arrows from Application "Z" to Service "B" or to Service "ZServer" should somehow represent payments from Charlie to ZebraSoft and BonAmi. Somehow, we basically need to accommodate a program supplied by company ZebraSoft to safely pass Charlie's money to ZebraSoft's and BonAmi's accounts. This capability (or the functional equivalent) should be supported without compromising the security of Charlie's password or subjecting Charlie to risk of financial loss. In the previous example of Joe Programmer, since the application was Joe's own code, he could safely wire in or type in his password into his own program, and that program could safely make central banking calls to accomplish the funds transfers in payment for vendor services. Now the situation is different. Charlie can't trust ZebraSoft enough to reveal his password to ZebraSoft's "Z" application. So how can we accomplish the flow of Charlie's money from Application "Z" to the service vendors' accounts? Beyond wishing to accomplish this securely and safely, we also have the goal of making the process as painless and convenient for the consumer as possible.

The solution to all of these demands which I came up with was the policy-based client payment agent. On the consumer access device (PC, handheld, whatever), we provide a payment agent in the runtime environment. This payment agent is essentially a check-writer who makes out checks to service vendors on behalf of the consumer. It is the consumer's agent, much as well-heeled person might have a human or institutional agent that is authorized to make payment's on their behalf. The payment agent is in possession of the secret password of the consumer, and can thus carry out the voucher creation calls to the central bank in order to create funds transfer vouchers to pay vendors with. The following illustration shows our approach to consumers paying for the end-user services that they consume. This is our way of filling in the last missing piece of the chain of money flow through the system—the ultimate source of money flowing into the dSHIP micro-economy. FIG. 32 illustrates, explicitly describes whose money is flowing in each of the dollar flow arrows.

Of course, as we have explained previously, each of these "dollar flows" illustrated by arrows with $$$ signs are actually accomplished by passing funds transfer authorization (voucher) objects from process to process. The actual movement of monetary units from account to account only happens when the party receiving a voucher cashes it in with the central banking service. The flow of money in the illustrations is thus quite analogous to the passing of checks from person to person.

With the above approach to consumer payment for online services, an application invited into the consumer's device basically from time to time says to the consumer's payment agent, "Give me money". And the payment agent obliges and hands the application vouchers made out to that application's supplier and/or the supplier's of other online services that the application makes us of. We have one final problem with the approach, as described thus far: namely, an unscrupulous application could make excessive demands for payment and drain the consumer's account. This leads us to the approach of having a policy-based agent that is wired with rules for deciding when requests for payment are reasonable, and when they are not reasonable . . . or at least when they are questionable. The consumer can set several threshold parameters in the configuration of the payment agent in order to set the criteria for when the agent can freely release funds and when the agent should first ask the user for confirmation. This approach can prevent large losses due to a service that demands payments that are larger than the consumer wishes to make. Tuning the policy allows the consumer to also set caps on their average spending rates over the course of a month, a week, a day, an hour . . . even a minute or second. So it isn't just guarding against malicious applications, but also safeguarding the consumer from their own excesses of consumption.

This policy based approach allows the consumer to freely, conveniently use any services they desire that are offered on the dSHIP platform, without worry of excessive losses, and without needing to keep looking at a ticking meter. The approach would allow "little" services to be consumed that extract very small fractions of a cent payment: the payment agent will just pay out on demand for these tiny amounts. But whenever a sizable payment is required, a pop-up panel will require user confirmation before proceeding with payment. And if average spend rates are exceeded, the user can be reminded that they are exceeding their desired high-water mark. The consumer might even configure policy to be more assertive, and completely bar all payments if average spending exceeds a second higher water mark. I'm sure further refinements of the policy model will emerge as we drill down further into the problem.

With this approach, the market is encouraged to provide lots of small services that charge fractional dollar or fractional cent amounts. The consumer can make use of them without giving a second thought to their cost or being hassled with prompts. But at the same time, the vendor can potentially make a sizable profit if millions of consumers make use of the service. This approach thus gets around an impasse that has been a part of the Internet and World Wide Web so far, wherein services that might be of value, but for which consumers would not be willing to spend credit-card sized fees of a few dollars (or go through the hassle of payment forms), should of necessity be given away.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    receiving a first service request that specifies a service of multiple distributed services to be deployed;
    creating an affiliation between the specified service and a first management agent that will supervise the specified service;
    selecting a first host among a plurality of distributed hosts;
    deploying the first management agent at the selected first host;
    identifying an expiration of the created affiliation between the specified service and the first management agent, wherein identifying the expiration of the created affiliation comprises:
        identifying a failure of the first management agent to renew the affiliation;
    selecting a second host among the plurality of distributed hosts;
    deploying a replacement management agent to the selected second host that will supervise the specified service;
    receiving an affiliation renewal indication from the first management agent; and
    sending an affiliation renewal exception to the first management agent indicating that it has been replaced by the replacement management agent.

2. The method of claim 1, further comprising:
    creating a record in response to the service request the record describing the service.

3. The method of claim 2, wherein the record comprises information required to create the service.

4. The method of claim 3, wherein the information comprises a uniform resource locator (URL) of class codebase, class name and initialization information.

5. The method of claim 2, wherein the record further specifies the first management agent.

6. The method of claim 1, wherein selecting the first host among the plurality of distributed hosts comprises:
    publishing a solicitation to the plurality of distributed hosts;
    receiving volunteer responses from a subset of the plurality of distributed hosts in response to the published solicitation; and selecting the first host from among the subset of the plurality of distributed hosts by applying a selection policy.

7. The method of claim 6, wherein the selection policy comprises one of a random choice or a round-robin selection policy.

8. The method of claim 1, further comprising:
receiving registrations from hosts of the plurality of distributed hosts; and
storing the registered hosts in a list as known hosts.

9. The method of claim 8, further comprising:
selecting the first host from the list of known hosts.

10. A method, comprising:
deploying management agents at distributed locations in a network;
affiliating each of the management agents with a service of multiple distributed services;
assessing a health, at each of the management agents, of a corresponding affiliated service of the multiple distributed services;
storing each affiliation of a management agent and a service of the multiple distributed services as a lease entry in a database; and
storing each lease entry in a priority queue based on a time associated with a creation of the affiliation between the management agent and the service.

11. The method of claim 10, further comprising:
expiring a lease entry from a head of the the priority queue based on a time associated with the creation of the affiliation.

12. The method of claim 10, further comprising:
determining if the management agent associated with the lease agent has renewed its affiliation with the corresponding service; and
if the affiliation has been renewed, storing an updated version of the lease entry in the priority queue based on a time associated with the affiliation renewal.

13. The method of claim 12, further comprising:
if the affiliation has not been renewed, identifying a replacement management agent to replace the management agent associated with the expired lease entry.

14. The method of claim 13, further comprising:
creating an affiliation between the replacement management agent and the corresponding service;
storing the affiliation as a lease entry in the database; and
storing the lease entry in the priority queue based on a time associated with the creation of the affiliation.

15. The method of claim 13, further comprising:
maintaining a resource pool of unaffiliated management agents; and
identifying the replacement agent from the resource pool of unaffiliated management agents.

16. The method of claim 10, wherein assessing a health of a corresponding affiliated service comprises:
determining whether the corresponding affiliated service is failing; and
further comprising:
terminating the corresponding affiliated service if it is determined to be failing.

17. The method of claim 16, further comprising:
launching a replacement service, if the corresponding affiliated service is failing, to replace the affiliated service.

18. The method of claim 10, wherein assessing a health of a corresponding affiliated service comprises:
determining whether the corresponding affiliated service is reaching capacity.

19. The method of claim 18, further comprising:
launching multiple redundant copies of the corresponding affiliated service, based on the determination, to effect at least one of load balancing or scaling.

20. A method, comprising:
affiliating a shared service of multiple shared services with a management object;
deploying the management object to monitor the affiliated shared service, the shared service being deployed in a service container of multiple distributed service containers;
storing the affiliation of the management object and the shared service of the multiple shared services as a lease entry in a database;
storing the lease entry in a priority queue based on a time associated with a creation of the affiliation between the management object and the shared service;
monitoring the affiliated shared service to determine if it is reaching capacity; and
launching one or more redundant copies of the affiliated shared service to other service containers of the multiple distributed service containers to effect at least one of load-balancing or scaling.

* * * * *